(12) United States Patent
Sato

(10) Patent No.: US 11,051,016 B2
(45) Date of Patent: Jun. 29, 2021

(54) IMAGE PROCESSING DEVICE AND METHOD

(71) Applicant: SONY CORPORATION, Tokyo (JP)

(72) Inventor: Kazushi Sato, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/138,301

(22) Filed: Sep. 21, 2018

(65) Prior Publication Data

US 2019/0028704 A1 Jan. 24, 2019

Related U.S. Application Data

(63) Continuation of application No. 13/516,856, filed as application No. PCT/JP2010/072735 on Dec. 17, 2010, now abandoned.

(30) Foreign Application Priority Data

Dec. 25, 2009 (JP) ................................. 2009-295783
Jan. 7, 2010 (JP) ................................. 2010-001745

(51) Int. Cl.
*H04N 19/117* (2014.01)
*H04N 19/176* (2014.01)
(Continued)

(52) U.S. Cl.
CPC ......... *H04N 19/117* (2014.11); *H04N 19/134* (2014.11); *H04N 19/14* (2014.11);
(Continued)

(58) Field of Classification Search
CPC .... H04N 19/117; H04N 19/134; H04N 19/14; H04N 19/176; H04N 19/82; H04N 19/86
See application file for complete search history.

(56) References Cited

U.S. PATENT DOCUMENTS 5,446,501 A    8/1995  Takemoto et al.
5,625,714 A    4/1997  Fukuda
(Continued)

FOREIGN PATENT DOCUMENTS

CN      1198638 A     11/1998
CN    101589624 A     11/2009
(Continued)

OTHER PUBLICATIONS

Office Action issued in Korean Patent Application No. 10-2016-7028913 dated May 29, 2017 with English translation.
(Continued)

*Primary Examiner* — Joseph W Becker
(74) *Attorney, Agent, or Firm* — Xsensus LLP

(57) ABSTRACT

An image processing device and method capable of improving image quality of a decoded image and of an image to be referenced from now on with motion compensation. A mosquito noise filter is provided within a motion compensation loop including at least a computing unit, an orthogonal transform unit, a quantization unit, an inverse quantization unit, an inverse orthogonal transform unit, a computing unit, a frame memory, a switch, a motion prediction/compensation unit, and a prediction image selecting unit. The mosquito noise filter uses information from the orthogonal transform unit, quantization unit, and a lossless encoding unit to determine whether to perform filter processing for removing mosquito noise. The device and method may be applied to an image encoding device for performing encoding with H.264/AVC format, for example.

19 Claims, 27 Drawing Sheets

(51) Int. Cl.
    *H04N 19/134*      (2014.01)
    *H04N 19/14*      (2014.01)
    *H04N 19/82*      (2014.01)
    *H04N 19/86*      (2014.01)

(52) U.S. Cl.
    CPC .......... *H04N 19/176* (2014.11); *H04N 19/82* (2014.11); *H04N 19/86* (2014.11)

(56) References Cited

U.S. PATENT DOCUMENTS

| | | |
|---|---|---|
| 2005/0271142 A1 | 12/2005 | Lee et al. |
| 2008/0199090 A1 | 8/2008 | Tasaka et al. |
| 2008/0260025 A1 | 10/2008 | Wada et al. |
| 2009/0028244 A1* | 1/2009 | Winger ............... H04N 19/577 375/240.16 |
| 2010/0128803 A1 | 5/2010 | Escoda et al. |
| 2010/0142835 A1 | 6/2010 | Nakagami et al. |
| 2010/0220931 A1 | 9/2010 | Zhou |
| 2010/0272191 A1 | 10/2010 | Dorea et al. |
| 2011/0090963 A1 | 4/2011 | Po et al. |
| 2011/0142136 A1 | 6/2011 | Liu et al. |
| 2012/0141037 A1 | 6/2012 | Sato |

FOREIGN PATENT DOCUMENTS

| | | |
|---|---|---|
| JP | 05 227518 | 9/1991 |
| JP | 7-143483 | 6/2005 |
| JP | 2006 229411 | 8/2006 |
| WO | 2009 110559 | 9/2009 |
| WO | 2008 153856 | 12/2009 |

OTHER PUBLICATIONS

Office Action dated Nov. 25, 2016 in Korean Patent Application No. 10-2016-7028913 (with English translation}.

Office Action dated Jan. 30, 2016 in KR Application No. 10-2012-7015504 (with English translation), 7 pages.

Takeshi, C., et al., "Blocked-based Adaptive Loop Filter," ITU-Telecommunications Standardization Sector, VCEG-A 118, Study Group 16, Question 6, total 6 pages, (Dec. 25, 2009).

ITU-Telecommunication Standardization Sector, "Video Coding Using Extended Block Sizes," Qualcomm, Inc., COM 16-C123-E, total 6 pages, (Jan. 2009).

Takeshi, C., et al., "Blocked-based Adaptive Loop Filter," ITU-Telecommunications Standardization Sector, VCEG-A 118, Study Group 16, Question 6, total 6 pages, (Jan. 7, 2010).

International Search Report dated Mar. 8, 2011 in PCT/JP10/72735 Filed Dec. 17, 2010.

Combined Chinese Office Action and Search Report dated Apr. 28, 2014, in Chinese Patent Application No. 201080058937.4 with English translation of category of cited documents.

* cited by examiner

FIG. 8

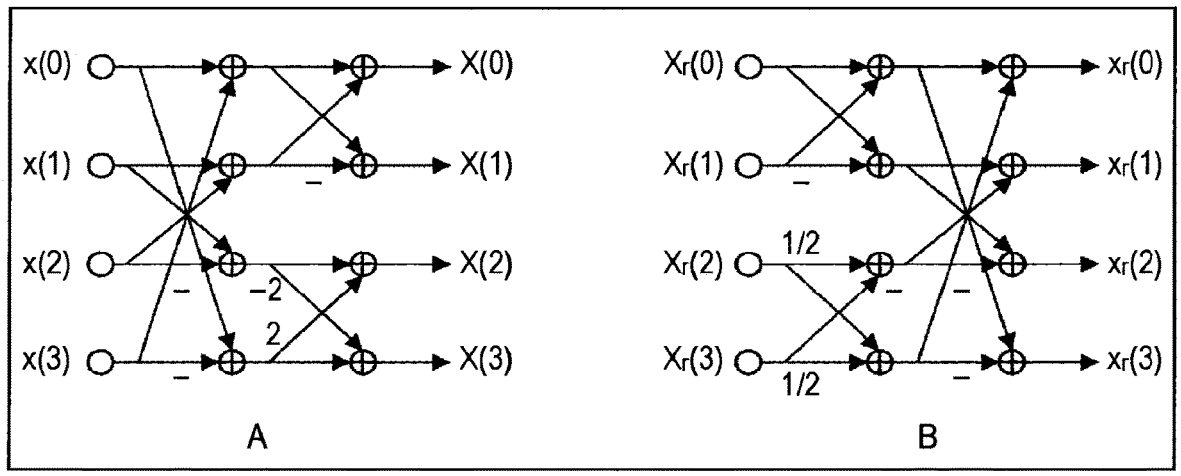

FIG. 9

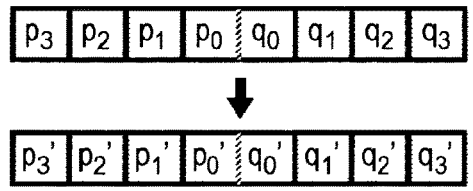

FIG. 10

| ONE OF p OR q BELONGS TO AN INTRA MACROBLOCK, AND ALSO IS SITUATED AT A BOUNDARY OF THE MACROBLOCK. | Bs = 4 (Strongest Filtering) |
|---|---|
| ONE OF p OR q BELONGS TO AN INTRA MACROBLOCK, BUT IS NOT SITUATED AT A BOUNDARY OF THE MACROBLOCK. | Bs = 3 |
| NEITHER p NOR q BELONGS TO AN INTRA MACROBLOCK, AND ALSO ONE HAS A TRANSFORM COEFFICIENT. | Bs = 2 |
| NEITHER p NOR q BELONGS TO AN INTRA MACROBLOCK, NOR DOES EITHER HAVE A TRANSFORM COEFFICIENT; BUT THE REFERENCE FRAMES DIFFER, OR THE NUMBER OF REFERENCE FRAMES DIFFER, OR THE mv VALUE DIFFERS. | Bs = 1 |
| NEITHER p NOR q BELONGS TO AN INTRA MACROBLOCK, NOR DOES EITHER HAVE A TRANSFORM COEFFICIENT, AND THE REFERENCE FRAMES AND mv VALUE ARE THE SAME. | Bs = 0 (No Filtering) |

| indexA (for α) or indexB (for β) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| α | 0 | 0 | 0 | 0 | 0 | 0 | 0 | 0 | 0 | 0 | 0 | 0 | 0 | 0 | 0 | 0 | 4 | 4 | 5 | 6 | 7 | 8 | 9 | 10 | 12 | 13 |
| β | 0 | 0 | 0 | 0 | 0 | 0 | 0 | 0 | 0 | 0 | 0 | 0 | 0 | 0 | 0 | 0 | 2 | 2 | 2 | 3 | 3 | 3 | 3 | 4 | 4 | 4 |

B

| indexA (for α) or indexB (for β) | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|---|---|---|---|---|---|---|---|---|
| α | 15 | 17 | 20 | 22 | 25 | 28 | 32 | 36 | 40 | 45 | 50 | 56 | 63 | 71 | 80 | 90 | 101 | 113 | 127 | 144 | 162 | 182 | 203 | 226 | 255 | 255 |
| β | 6 | 6 | 7 | 7 | 8 | 8 | 9 | 9 | 10 | 10 | 11 | 11 | 12 | 12 | 13 | 13 | 14 | 14 | 15 | 15 | 16 | 16 | 17 | 17 | 18 | 18 |

FIG. 13

| indexA | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| bs=1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | — | — | — |
| bs=2 | 0 | 0 | 0 | 0 | 0 | 0 | 0 | 0 | 0 | 0 | 0 | 0 | 0 | 0 | 0 | 0 | 0 | 0 | 0 | 0 | 0 | — | — | — | — | — |
| bs=3 | 0 | 0 | 0 | 0 | 0 | 0 | 0 | 0 | 0 | 0 | 0 | 0 | 0 | 0 | 0 | 0 | 0 | — | — | — | — | — | — | — | — | — |

A

| indexA | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|---|---|---|---|---|---|---|---|---|
| bs=1 | 1 | 1 | 1 | 1 | 1 | 1 | 1 | 2 | 2 | 2 | 2 | 3 | 3 | 3 | 4 | 4 | 4 | 5 | 6 | 6 | 7 | 8 | 9 | 10 | 11 | 13 |
| bs=2 | 1 | 1 | 1 | 1 | 1 | 2 | 2 | 2 | 2 | 3 | 3 | 3 | 4 | 4 | 5 | 5 | 6 | 7 | 8 | 8 | 10 | 11 | 12 | 13 | 15 | 17 |
| bs=3 | 1 | 2 | 2 | 2 | 2 | 3 | 3 | 3 | 4 | 4 | 4 | 5 | 6 | 6 | 7 | 8 | 9 | 10 | 11 | 13 | 14 | 16 | 18 | 20 | 23 | 25 |

B

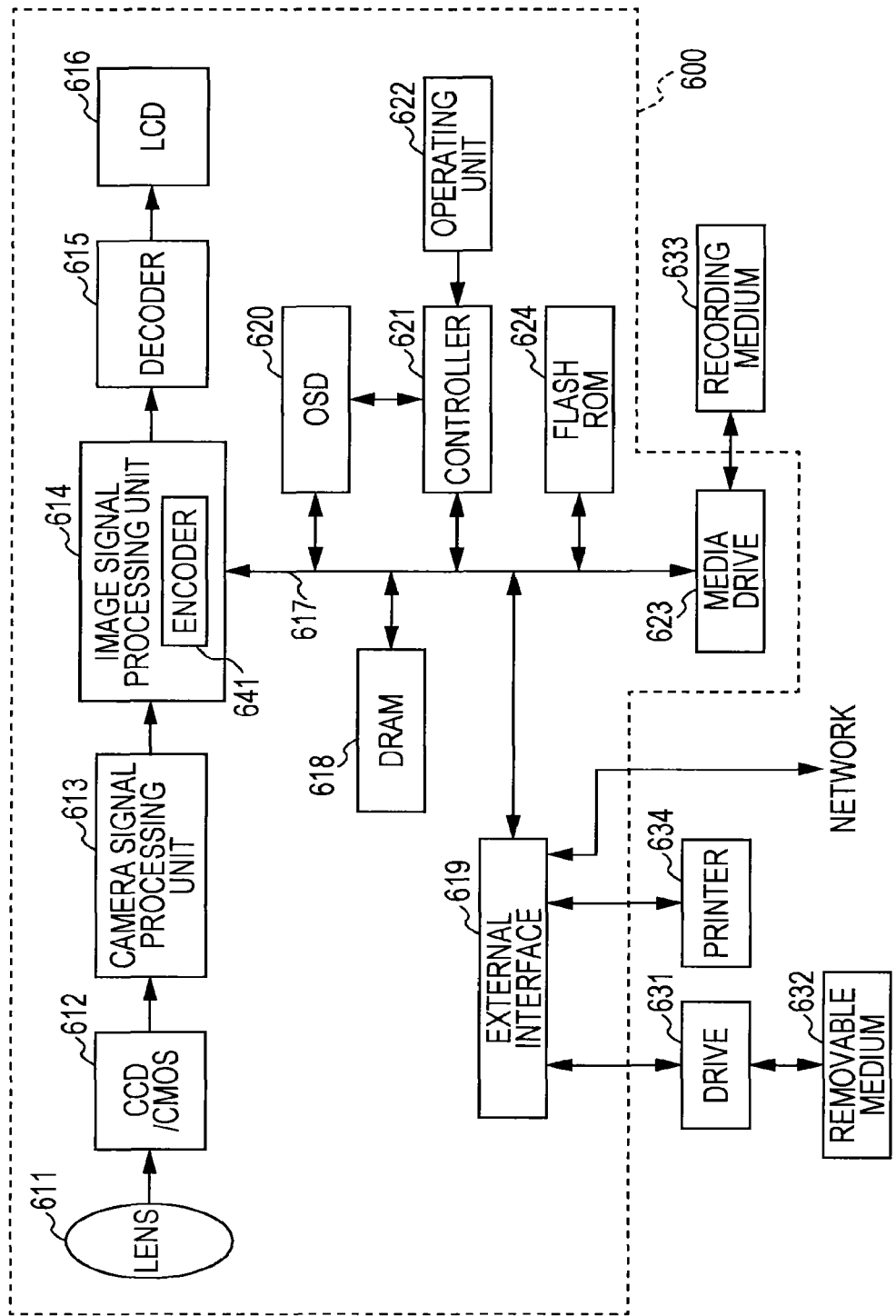

IMAGE PROCESSING DEVICE AND METHOD

CROSS-REFERENCE TO RELATED APPLICATIONS

This application is a Continuation of National Stage application Ser. No. 13/516,856 filed Jun. 18, 2012, which is a National Stage Entry of International Patent Application No. PCT/JP2010/072735 filed Dec. 17, 2010, claiming priority to Japanese Patent Application No. 2009-295783 filed Dec. 25, 2009 and Japanese Patent Application No. 2010-001745 filed Jan. 7, 2010, all of which are herein incorporated by reference in their entirety.

TECHNICAL FIELD

The present invention relates to an image processing device and method, and specifically relates to an image processing device and method which improves encoding efficiency by removing mosquito noise.

BACKGROUND ART

In recent years, there have come into widespread use devices which subject an image to compression encoding by employing an encoding format handling image information as digital signals, and at this time compress the image by orthogonal transform such as discrete cosine transform or the like and motion compensation, taking advantage of redundancy peculiar to the image information, in order to perform highly effective information transmission and storage at that time. Examples of this encoding method include MPEG (Moving Picture Expert Group) and so forth.

In particular, MPEG2 (ISO/IEC 13818-2) is defined as a general-purpose image encoding format, and is a standard encompassing both of interlaced scanning images and sequential-scanning images, and standard resolution images and high definition images. For example, MPEG2 has widely been employed now by broad range of applications for professional usage and for consumer usage. By employing the MPEG2 compression format, a code amount (bit rate) of 4 through 8 Mbps is allocated in the event of an interlaced scanning image of standard resolution having 720×480 pixels, for example. Also, by employing the MPEG2 compression format, a code amount (bit rate) of 18 through 22 Mbps is allocated in the event of an interlaced scanning image of high resolution having 1920×1088 pixels, for example. Thus, a high compression rate and excellent image quality can be realized.

With MPEG2, high image quality encoding adapted to broadcasting usage is principally taken as an object, but a lower code amount (bit rate) than the code amount of MPEG1, i.e., an encoding format having a higher compression rate is not handled. According to spread of personal digital assistants, it has been expected that needs for such an encoding format will be increased from now on, and in response to this, standardization of the MPEG4 encoding format has been performed. With regard to an image encoding format, the specification thereof was confirmed as an international standard as ISO/IEC 14496-2 in December in 1998.

Further, in recent years, standardization of a standard called H.26L (ITU-T Q6/16 VCEG) has progressed, originally intended for image encoding for videoconferencing usage. With H.26L, it has been known that as compared to a conventional encoding format such as MPEG2 or MPEG4, though greater computation amount is requested for encoding and decoding thereof, higher encoding efficiency is realized. Also, currently, as part of activity of MPEG4, standardization for also taking advantage of functions not supported by H.26L with this H.26L taken as a base, to realize higher encoding efficiency, has been performed as Joint Model of Enhanced-Compression Video Coding. As a schedule of standardization, H.264 and MPEG-4 Part 10 (Advanced Video Coding, hereafter, referred to as 264/AVC) become an international standard in March, 2003.

FIG. 1 is a block diagram illustrating a configuration example of an image encoding device with a compressed image based on H.264/AVC as output.

With the example in FIG. 1, the image encoding device 1 has an A/D conversion unit 11, a screen rearranging buffer 12, a computing unit 13, an orthogonal transform unit 14, a quantization unit 15, a lossless encoding unit 16, and a storage buffer 17, an inverse quantization unit 18, an inverse orthogonal transform unit 19, a computing unit 20, a deblocking filter 21, frame memory 22, a switch 23, an intra prediction unit 24, a motion prediction/compensation unit 25, a prediction image selecting unit 26, and a rate control unit 27.

The A/D conversion unit 11 performs A/D conversion of an input image, and outputs to the screen rearranging buffer 12 and stores. The screen rearranging buffer 12 rearranges the images of frames in the stored order for display into the order of frames for encoding according to GOP (Group of Picture).

The computing unit 13 subtracts, from the image read out from the screen rearranging buffer 12, the prediction image from the intra prediction unit 24 or the prediction image from the motion prediction/compensation unit 25, selected by the prediction image selecting unit 26, and outputs difference information thereof to the orthogonal transform unit 14. The orthogonal transform unit 14 subjects the difference information from the computing unit 13 to orthogonal transform, such as discrete cosine transform, Karhunen-Loéve transform, or the like, and outputs a transform coefficient thereof. The quantization unit 15 quantizes the transform coefficient that the orthogonal transform unit 14 outputs.

The quantized transform coefficient serving as the output of the quantization unit 15 is input to the lossless encoding unit 16, and subjected to lossless encoding, such as variable length coding, arithmetic coding, or the like, and thus compressed.

The lossless encoding unit 16 obtains information indicating intra prediction from the intra prediction unit 24, and obtains information indicating an inter prediction mode, and so forth from the motion prediction/compensation unit 25. Note that the information indicating intra prediction, and the information indicating inter prediction will also be referred to as intra prediction mode information and inter prediction mode information, respectively, hereinafter.

The lossless encoding unit 16 encodes the quantized transform coefficient, and also encodes the information indicating intra prediction, information indicating inter prediction mode, and so forth, and takes these as part of header information in a compressed image. The lossless encoding unit 16 supplies the encoded data to the storage buffer 17 for storing.

For example, with the lossless encoding unit 16, lossless encoding processing, such as variable length coding, arithmetic coding, or the like, is performed. Examples of the variable length coding include CAVLC (Context-Adaptive Variable Length Coding) stipulated by the H.264/AVC format. Examples of the arithmetic coding include CABAC (Context-Adaptive Binary Arithmetic Coding).

The storage buffer 17 outputs the data supplied from the lossless encoding unit 16 to a decoding side, for example, such as a recording device or transmission path or the like downstream not shown in the drawing, as a compressed image encoded by the H.264/AVC format.

Also, the quantized transform coefficient output from the quantization unit 15 is also input to the inverse quantization unit 18, inversely quantized, and then further subjected to inverse orthogonal transform at the inverse orthogonal transform unit 19. The output subjected to inverse orthogonal transform is added to the prediction image supplied from the prediction image selecting unit 26 by the computing unit 20, and becomes a locally decoded image. The deblocking filter 21 removes block noise of the decoded image, and then supplies to the frame memory 22 for storing. An image prior to being subjected to deblocking filter processing by the deblocking filter 21 is also supplied to the frame memory 22 for storing.

The switch 23 outputs a reference image stored in the frame memory 22 to the motion prediction/compensation unit 25 or intra prediction unit 24.

With this image encoding device 1, for example, the I picture, B picture, and P picture from the screen rearranging buffer 12 are supplied to the intra prediction unit 24 as an image to be subjected to intra prediction (also referred to as intra processing). Also, the B picture and P picture read out from the screen rearranging buffer 12 are supplied to the motion prediction/compensation unit 25 as an image subjected to inter prediction (also referred to as inter processing).

The intra prediction unit 24 performs intra prediction processing of all of the candidate intra prediction modes based on the image to be subjected to intra prediction read out from the screen rearranging buffer 12, and the reference image supplied from the frame memory 22, to generate a prediction image.

At that time, the intra prediction unit 24 calculates a cost function value as to all of the candidate intra prediction modes, and selects an intra prediction mode wherein the calculated cost function value provides the minimum value, as the optimal intra prediction mode.

The intra prediction unit 24 supplies the prediction image generated in the optimal intra prediction mode, and the cost function value thereof to the prediction image selecting unit 26. In the event that the prediction image generated in the optimal intra prediction mode has been selected by the prediction image selecting unit 26, the intra prediction unit 24 supplies information indicating the optimal intra prediction mode to the lossless encoding unit 16. The lossless encoding unit 16 encodes this information, and takes this as part of the header information in the compressed image.

The image subjected to inter processing read out from the screen rearranging buffer 12, and the reference image are supplied from the frame memory 22 to the motion prediction/compensation unit 25 via the switch 23. The motion prediction/compensation unit 25 performs motion prediction of a block in all of the candidate inter prediction modes to generate the motion vector of each block.

The motion prediction/compensation unit 25 uses the predicted motion vector of each block to calculate a cost function value as to all of the candidate inter prediction modes. The motion prediction/compensation unit 25 determines, of the calculated cost function values, the prediction mode of a block that provides the minimum value as the optimal inter prediction mode.

The motion prediction/compensation unit 25 supplies the prediction image of a block to be processed of the determined optimal inter prediction mode, and the cost function value thereof to the prediction image selecting unit 26. In the event that the prediction image of the block to be processed of the optimal inter prediction mode has been selected by the prediction image selecting unit 26, the motion prediction/compensation unit 25 outputs information indicating the optimal inter prediction mode (inter prediction mode information) to the lossless encoding unit 16.

At this time, the motion vector information, reference frame information, and so forth are also output to the lossless encoding unit 16. The lossless encoding unit 16 also subjects the information from the motion prediction/compensation unit 25 to lossless encoding processing such as variable length coding, arithmetic coding, or the like, and inserts into the header portion of the compressed image.

The prediction image selecting unit 26 determines the optimal prediction mode out of the optimal intra prediction mode and optimal inter prediction mode based on each cost function value output from the intra prediction unit 24 or motion prediction/compensation unit 25. The prediction image selecting unit 26 then selects the prediction image of the determined optimal prediction mode, and supplies to the computing units 13 and 20. At this time, the prediction image selecting unit 26 supplies selection information of the prediction image to the intra prediction unit 24 or motion prediction/compensation unit 25.

The rate control unit 27 controls a rate of the quantization operation of the quantization unit 15 based on the compressed image stored in the storage buffer 17 so as not to cause overflow nor underflow.

FIG. 2 is a block diagram illustrating a configuration example of an image decoding device corresponding to the image encoding device in FIG. 1.

With the example in FIG. 2, the image decoding device 31 is configured of a storage buffer 41, a lossless decoding unit 42, an inverse quantization unit 43, an inverse orthogonal transform unit 44, a computing unit 45, a deblocking filter 46, a screen rearranging buffer 47, a D/A conversion unit 48, frame memory 49, a switch 50, an intra prediction unit 51, a motion compensation unit 52, and a switch 53.

The storage buffer 41 stores the transmitted compressed image. The inverse decoding unit 42 decodes information encoded by the lossless encoding unit 16 in FIG. 1 supplied from the storage buffer 41 with a format corresponding to the encoding format of the lossless encoding unit 16. The inverse quantization unit 43 inversely quantizes the image decoded by the lossless decoding unit 42 with a format corresponding to the quantization format of the quantization unit 15 in FIG. 1. The inverse orthogonal transform unit 44 subjects to inverse orthogonal transform the output of the inverse quantization unit 43 with a format corresponding to the orthogonal transform format of the orthogonal transform unit 14 in FIG. 1.

The output subjected to inverse orthogonal transform is added to the prediction image supplied from the switch 53 from the computing unit 45 and decoded. The deblocking filter 46 removes block noise of the decoded image, then supplies to the frame memory 49 for storing, and also outputs to the screen rearranging buffer 47.

The screen rearranging buffer 47 performs rearranging of images. Specifically, the order of frames rearranged for encoding order by the screen rearranging buffer 12 in FIG. 1 is rearranged into the original display order. The D/A conversion unit 48 subjects the image supplied from the screen rearranging buffer 47 to D/A conversion, output to an unshown display for display.

The switch 50 reads out an image to be subjected to inter processing, and an image to be referenced from the frame memory 49, outputs to the motion compensation unit 52, and also reads out an image to be subjected to intra prediction from the frame memory 49, and supplies to the intra prediction unit 51.

Information indicating the intra prediction mode obtained by decoding the header information is supplied from the lossless decoding unit 42 to the intra prediction unit 51. The intra prediction unit 51 generates a prediction image based on this information, and outputs the generated prediction image to the switch 53.

Of the information obtained by decoding the header information, the inter prediction mode information, motion vector information, reference frame information, and so forth are supplied from the lossless decoding unit 42 to the motion compensation unit 52. The inter prediction mode information is transmitted for each macroblock. The motion vector information and reference frame information is transmitted for each block to be processed.

The motion compensation unit 52 uses the motion vector information, reference frame information, and so forth supplied from the lossless decoding unit 42 in the prediction mode that the inter prediction mode information supplied for the lossless decoding unit 42 indicates to generate pixel values of the prediction image corresponding to the block to be processed. The generated pixel values of the prediction image are supplied to the computing unit 45 via the switch 53.

The switch 53 selects the prediction image generated by the motion compensation unit 52 or intra prediction unit 51, and supplies to the computing unit 45.

Further, as an extension of this H.264/AVC, standardization of FRExt (Fidelity Range Extension) including a coding tool necessary for business use such as RGB, 4:2:2, or 4:4:4, 8×8DCT and quantization matrix stipulated by MPEG-2 has been completed in February in 2005. Thus, H.264/AVC can be used as an encoding format capable of suitably expressing even film noise included in movies, and has come to be employed for wide ranging applications such as Blu-Ray Disc (registered trademark) and so forth.

However, nowadays, needs for further high-compression encoding have been increased, such as intending to compress an image having around 4000×2000 pixels, which is quadruple of a high-vision image, or alternatively, needs for further high-compression encoding have been increased, such as intending to distribute a high-vision image within an environment with limited transmission capacity like the Internet. Therefore, with the above-mentioned VCEG (=Video Coding Expert Group) under the control of ITU-T, studies relating to improvement of encoding efficiency have continuously been performed.

As a technique for improving such encoding efficiency, a technique called an adaptive loop filter (ALF (Adaptive Loop Filter)) has been proposed in PTL 1.

FIG. 3 is a block diagram illustrating a configuration example of an image encoding device to which an adaptive loop filter has been applied. Note that, with the example in FIG. 3, for convenience of description, the A/D conversion unit 11, screen rearranging buffer 12, storage buffer 17, switch 23, intra prediction unit 24, prediction image selecting unit 26, and rate control unit 27 in FIG. 1 are omitted. Also, an arrow and so forth are also omitted. Accordingly, in the case of the example in FIG. 3, the reference image from the frame memory 22 is directly input to the motion prediction/compensation unit 25, and the prediction image from the motion prediction/compensation unit 25 is directly output to the computing units 13 and 20.

Specifically, the image encoding device 61 in FIG. 3 differs from the image encoding device 1 in FIG. 1 only in that an adaptive loop filter 71 is added between the deblocking filter 21 and frame memory 22.

The adaptive loop filter 71 perform calculation of an adaptive loop filter coefficient so as to minimize residual error with the original image from the screen rearranging buffer 12 (drawing is omitted), and uses this adaptive loop filter coefficient to perform filter processing on the decoded image from the deblocking filter 21. As for this filter, a Wiener filter (Wiener Filter) is employed, for example.

Also, the adaptive loop filter 71 transmits the calculated adaptive loop filter coefficient to the lossless encoding unit 16. The lossless encoding unit 16 performs lossless encoding processing such as variable length coding, arithmetic coding, or the like on this adaptive loop filter coefficient, and inserts into the header portion of the compressed image.

FIG. 4 is a block diagram illustrating a configuration example of an image decoding device corresponding to the image encoding device in FIG. 3. Note that, with the example in FIG. 4, for convenience of description, the storage buffer 41, screen rearranging buffer 47, D/A conversion unit 48, switch 50, intra prediction unit 51, and switch 53 in FIG. 2 are omitted. Also, an arrow and so forth are also omitted. Accordingly, in the case of the example in FIG. 4, the reference image from the frame memory 49 is directly input to the motion compensation unit 52, and the prediction image from the motion compensation unit 52 is directly output to the computing unit 45.

Specifically, the image decoding device 81 in FIG. 4 differs from the image decoding device 31 in FIG. 2 only in that an adaptive loop filter 91 is added between the deblocking filter 46 and frame memory 49.

An adaptive loop filter coefficient decoded at the lossless decoding unit 42 and extracted from the header is supplied to the adaptive loop filter 91. The adaptive loop filter 91 uses the supplied filter coefficient to perform filter processing on the decoded image from the deblocking filter 46. As for this filter, a wiener filter is employed, for example.

Thus, the image quality of a decoded image can be improved, and further the image quality of a reference image can also be improved.

Now, with the above H.264/AVC format, the macroblock size is 16×16 pixels. However, the macroblock size of 16×16 pixels is not optimal for large image frames such as UHD (Ultra High Definition; 4000×2000 pixels) which will be handled by next-generation encoding formats.

Therefore, with NPL 2 and so forth, there has been proposed enlarging the macroblock size to a size of such as 32×32 pixels, for example.

CITATION LIST

Non Patent Literature

NPL 1: Takeshi. Chujoh, et al., "Block-based Adaptive Loop Filter" ITU-T SG16 Q6 VCEG Contribution, AI18, Germany, July, 2008

NPL 2: "Video Coding Using Extended Block Sizes", VCEG-AD09, ITU-Telecommunications Standardization Sector STUDY GROUP Question 16—Contribution 123, January 2009.

SUMMARY OF INVENTION

Technical Problem

Now, as image quality deterioration that may be caused at the time of performing encoding of block basis such as MPEG, mosquito noise (distortion) can be referenced as well as block noise (distortion). With the image encoding device 1 in FIG. 1 and the image decoding device 31 in FIG. 2, though block noise can be removed within a motion compensation loop by the deblocking filter 21, it is difficult to remove mosquito noise.

Further, as described in NPL 2, with a macroblock having a greater size than the conventional H.264/AVC format such as 32×32 pixels, 64×64 pixels, or the like, for example, in the event of orthogonal transform in 16×16 pixel increments being employed, this mosquito noise may occur more markedly with regard to image quality.

The present invention has been made in the light of such a situation, and according to the present invention, encoding efficiency can be improved by removing mosquito noise.

Solution to Problem

An image processing device according to a first aspect of the present invention includes: filter processing means configured to perform, within a motion compensation loop of an image, filter processing for removing mosquito noise on a macroblock to be processed in the image under control according to an orthogonal transform size and syntax elements in encoding information of the macroblock; and encoding means configured to encode the image and the encoding information.

The syntax elements in the encoding information may include the generated code amount and quantization scale as to the macroblock.

The filter processing means may include: threshold determining means configured to determine a threshold according to the orthogonal transform size of the macroblock; difficulty level parameter calculating means configured to calculate a difficulty level parameter of the macroblock using information relating to the generated code amount and quantization scale as to the macroblock; and filter processing control means configured to perform control so as to perform the filter processing on the macroblock in the case that the difficulty level parameter calculated by the difficulty level parameter calculating means is greater than the threshold determined by the threshold determining means.

The threshold may include an offset value that a user can set.

The filter processing means may use generation bits as information relating to the generated code amount.

The filter processing means may use a generation bit or generation bin as information relating to the generated code amount in the case that CABAC is used as a lossless encoding format.

The syntax elements in the encoding information may include a quantization parameter in the macroblock, and the number of non-zero orthogonal transform coefficients after quantization.

The filter processing means may include: threshold determining means configured to determine a threshold according to the orthogonal transform size and quantization parameter of the macroblock; and filter processing control means configured to perform control so as to perform the filter processing on the macroblock in the case that the number of non-zero orthogonal transform coefficients after quantization in the macroblock is greater than the threshold determined by the threshold determining means.

The threshold may include an offset value that a user can set.

The syntax elements in the encoding information may include motion vector information as to the macroblock.

The filter processing means may perform smoothing processing using a two-dimensional filter having a predetermined window size with a pixel to be processed as the center regarding a pixel value included in the macroblock as the filter processing.

An image processing method according to the first aspect of the present invention includes the steps of: performing, with filter processing means of an image processing device, within a motion compensation loop of an image, filter processing for removing mosquito noise on a macroblock to be processed in the image under control according to an orthogonal transform size and syntax elements in encoding information of the macroblock; and encoding, with encoding means, the image and the encoding information.

With the first aspect of the present invention, within a motion compensation loop of an image, filter processing for removing mosquito noise is performed on a macroblock to be processed in the image under control according to the orthogonal transform size of the macroblock, and the image and the encoding information are encoded.

An image processing device according to a second aspect of the present invention includes: filter processing means configured to perform, within a motion compensation loop of an image, filter processing for removing mosquito noise on a macroblock to be processed in the image under control according to an orthogonal transform size and syntax elements in encoding information of the macroblock; and decoding means configured to decode the image and the encoding information that have been encoded.

An image processing method according to the second aspect of the present invention includes the steps of: performing, with filter processing means of an image processing device, within a motion compensation loop of an image, filter processing for removing mosquito noise on a macroblock to be processed in the image under control according to an orthogonal transform size and syntax elements in encoding information of the macroblock; and decoding, with decoding means, the image and the encoding information that have been encoded.

With the second aspect of the present invention, within a motion compensation loop of an image, filter processing for removing mosquito noise is performed on a macroblock to be processed in the image under control according to the orthogonal transform size of the macroblock, and the encoded image and the encoded encoding information are decoded.

Note that the above image processing devices may be a standalone device or internal block making up one image encoding device or image decoding device.

Advantageous Effects of Invention

According to the present invention, mosquito noise can be removed. Also, according to the present invention, the image qualities of decoded images and reference images can be improved. Thus, encoding efficiency can be improved.

BRIEF DESCRIPTION OF DRAWINGS

FIG. 8 is a diagram illustrating a method for realizing integer transform and inverse integer transform by butterfly computation.

FIG. 9 is a diagram for describing an operating principle of a deblocking filter.

FIG. 10 is a diagram for describing a method of defining Bs.

FIG. 12 is a diagram illustrating an example of correlation between indexA and indexB, and the values of $\alpha$ and $\beta$.

FIG. 13 is a diagram illustrating an example of correlation between Bs, indexA, and tCO.

FIG. 29 is a block diagram illustrating a principal configuration example of a camera to which the present invention has been applied.

DESCRIPTION OF EMBODIMENTS

Hereinafter, embodiments of the present invention will be described with reference to the drawings.

[Configuration Example of Image Encoding Device]

Figure 5:
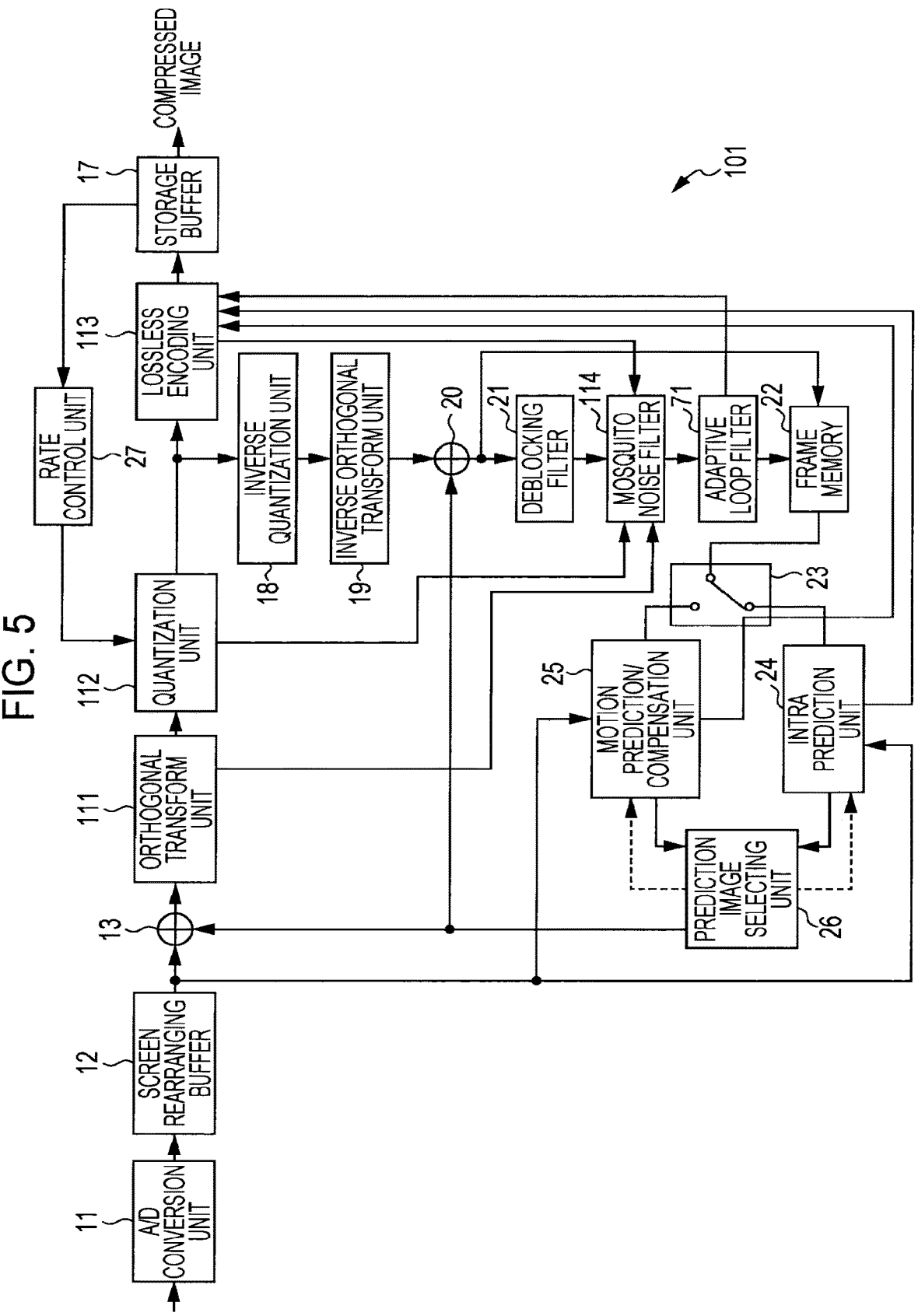
FIG. 5 is a block diagram illustrating the configuration of an embodiment of an image encoding device to which the present invention has been applied.

FIG. 5 represents the configuration of an embodiment of an image encoding device serving as an image processing device to which the present invention has been applied.

Figure 1:
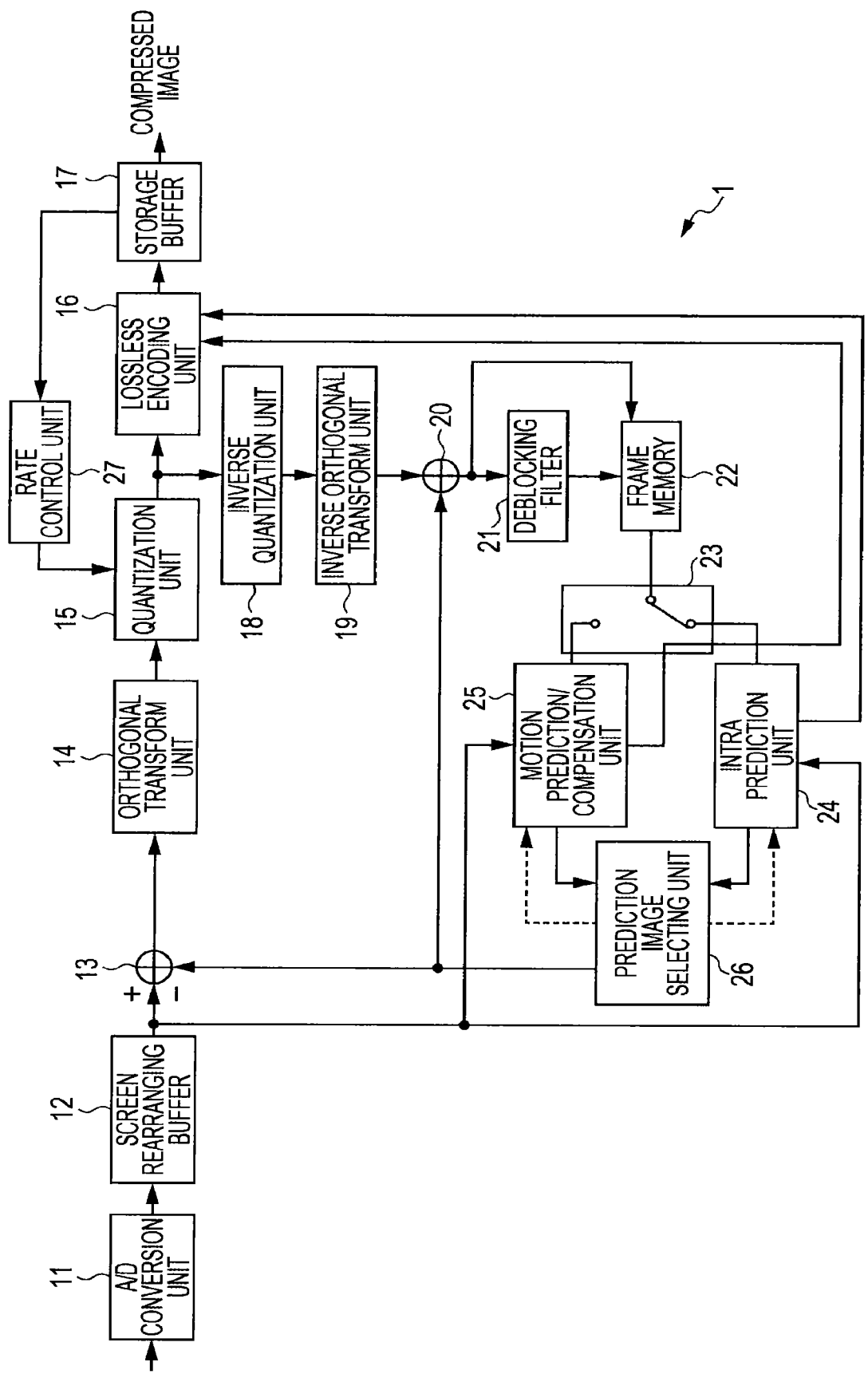
FIG. 1 is a block diagram illustrating a configuration example of an image encoding device employing the H.264/AVC format.

An image encoding device 101 in FIG. 5 is the same as the image encoding device 1 in FIG. 1 in that there are provided the A/D conversion unit 11, screen rearranging buffer 12, computing unit 13, storage buffer 17, inverse quantization unit 18, inverse orthogonal transform unit 19, computing unit 20, deblocking filter 21, frame memory 22, switch 23, intra prediction unit 24, motion prediction/compensation unit 25, prediction image selecting unit 26, and rate control unit 27.

Figure 3:
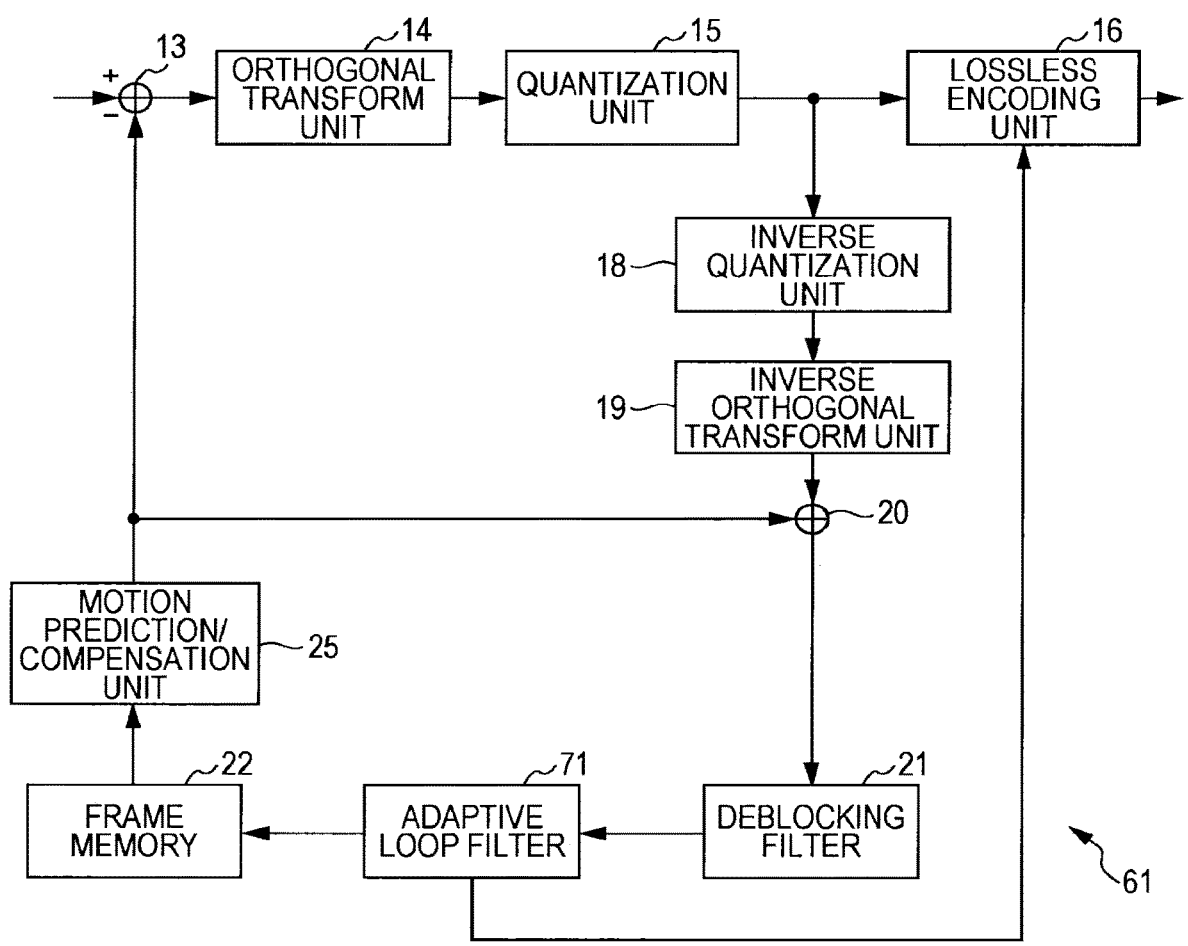
FIG. 3 is a block diagram illustrating a configuration example of an image encoding device to which an adaptive loop filter has been applied.

Also, the image encoding device 101 in FIG. 5 differs from the imaged encoding device 1 in FIG. 1 in that the orthogonal transform unit 14, quantization unit 15, and lossless encoding unit 16 are replaced with an orthogonal transform unit 111, a quantization unit 112, and a lossless encoding unit 113 respectively, and also in that the adaptive loop filter 71 in FIG. 3, and a mosquito noise filter 114 are added.

Specifically, the orthogonal transform unit 111 subjects, in the same way as with the orthogonal transform unit 14 in FIG. 1, the difference information from the computing unit 13 to orthogonal transform, such as discrete cosine transform, Karhunen-Loéve transform, or the like, and supplies a transform coefficient thereof to the quantization unit 112. The orthogonal transform unit 111 also supplies, in contrast to the orthogonal transform unit 14 in FIG. 1, information relating to which of 4×4 orthogonal transform and 8×8 orthogonal transform has been applied to each macroblock (orthogonal transform size) to the mosquito noise filter 114.

The quantization unit 112 quantizes, in the same way as with the quantization unit 15 in FIG. 1, the transform coefficient that the orthogonal transform unit 111 outputs, and supplies the quantized transform coefficient to the lossless encoding unit 113. Also, the quantization unit 112 supplies, in contrast to the quantization unit 15 in FIG. 1, a quantization value relating to each macroblock to the mosquito noise filter 114.

The lossless encoding unit 113 encodes, in the same way as with the lossless encoding unit 16 in FIG. 1, the quantized transform coefficient, and also encodes information indicating intra prediction, information indicating an inter prediction mode, and so forth to take these as part of the header information in the compressed image, and supplies the encoded data to the storage buffer 17 for storing. Note that, at this time, the lossless encoding unit 113 also encodes, such as the case in FIG. 3, the filter coefficient calculated by the adaptive loop filter 71 to take this as part of the header information in the compressed image.

Also, the lossless encoding unit 113 supplies, in contrast to the lossless encoding unit 16 in FIG. 1, information relating to the generated code amount of each macroblock to the mosquito noise filter 114.

The mosquito noise filter 114 is provided before the adaptive loop filter 71 after the deblocking filter 21. Specifically, the mosquito noise filter 114 is provided within a motion compensation loop made up of the computing unit 13, orthogonal transform unit 111, quantization unit 112, inverse quantization unit 18, inverse orthogonal transform unit 19, computing unit 20, deblocking filter 21, adaptive loop filter 71, frame memory 22, switch 23, motion prediction/compensation unit 25, and prediction image selecting unit 26. That is to say, an image is used by loop within the motion compensation loop.

The mosquito noise filter 114 uses the information from the orthogonal transform unit 111, quantization unit 112, and lossless encoding unit 113 to determine whether to perform filter processing for mosquito noise removal.

In the case of performing the filter processing, the mosquito noise filter 114 subjects a decoded image after the deblocking filter 21 to the filter processing for mosquito noise removal, and outputs the image subjected to the filter processing to the adaptive loop filter 71. In the case of performing no filter processing, the mosquito noise filter 114 outputs the decoded image after the deblocking filter 21 to the adaptive loop filter 71 without change. [Description of Orthogonal Transform]

Next, each processing described above will be described in detail. First, orthogonal transform will be described with reference to FIG. 6.

With the MPEG2 encoding format, processing for orthogonal transform has been performed with 8×8 pixels as an increment. On the other hand, the image encoding device 101 which performs orthogonal transform in the same as with the AVC encoding format performs orthogonal transform with 4×4 pixels as an increment in Baseline Profile, Main Profile, and Extended Profile. Also, in High Profile or higher, the image encoding device 101 is capable of switching between orthogonal transform in increments of 4×4 pixels shown in A in FIG. 6 and orthogonal transform in increments of 8×8 pixels shown in B in FIG. 6, in increments of macroblocks. [4×4 Orthogonal Transform]

First, the 4×4 orthogonal transform format will be described. Orthogonal transform in increments of 4×4 pixels has the following features.

A first feature is that with the MPEG2 encoding format, the computing precision for transform may be set freely as to each encoding format within a certain range, so there has been the necessity to implement measures for mismatch in inverse transform, but with the present method, both transform and inverse transform are stipulated in the standard, so there is no need to implement such measures for mismatch.

A second feature is that implementation with a 16-bit register is enabled, such that the computation is realizable with low-power-consumption type digital signal processors (DSP (Digital Signal Processor)) such as used with portable terminals or the like.

A third feature is that while mosquito noise due to quantization error at high-frequency coefficients has been observed with encoding methods using orthogonal transform in increments of 8×8 pixels, such as MPEG2 and the like, such mosquito noise is not readably observed with the present method.

Figure 7:
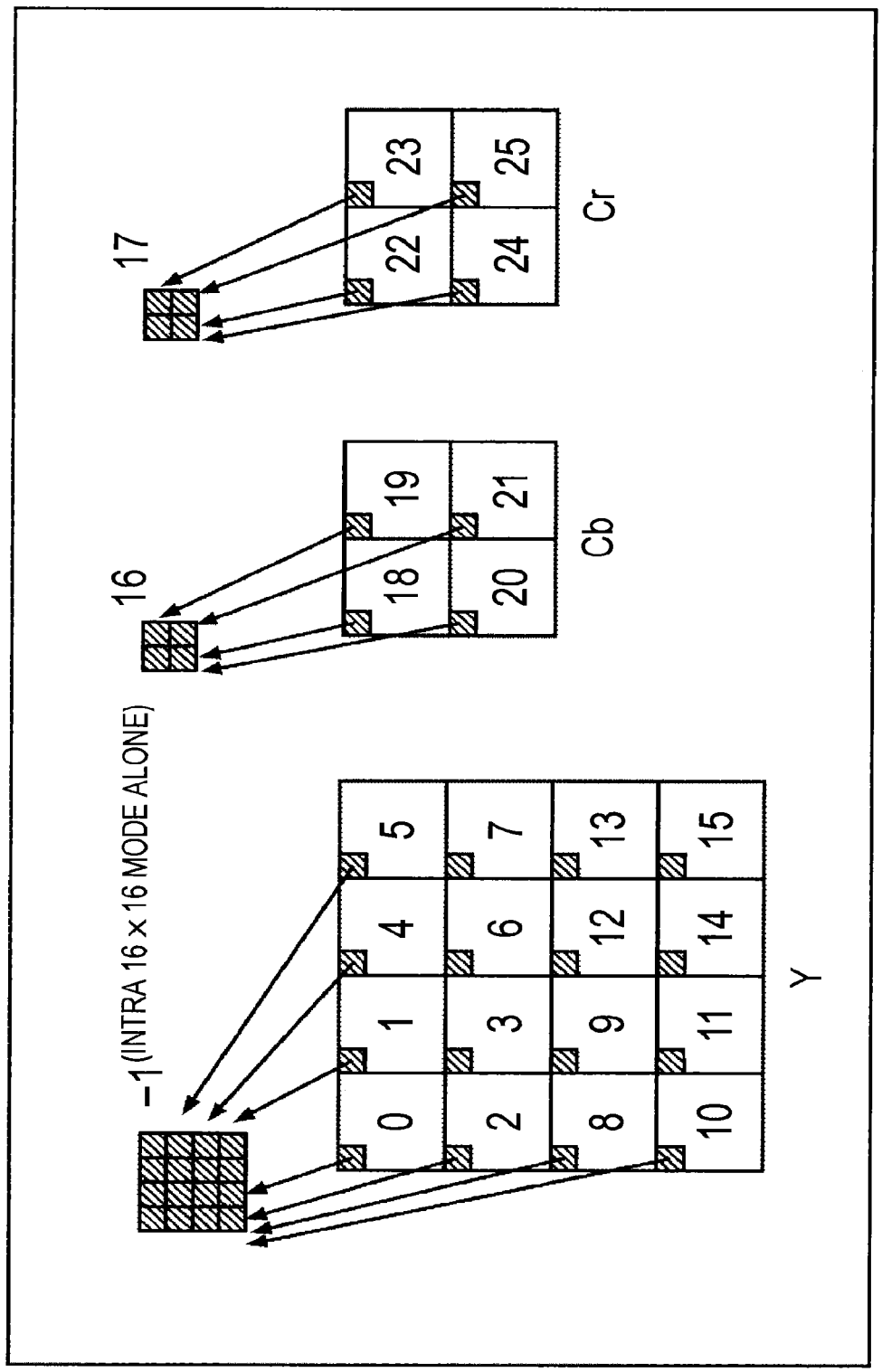
FIG. 7 is a diagram for describing processing in a macroblock where 4×4 orthogonal transform is performed.

FIG. 7 illustrates an overview of orthogonal transform and quantization processing. That is to say, 16×16 pixels of luminance signals and 8×8 pixels of color difference signals included in one macroblock are each divided into 4×4 pixel blocks as shown in FIG. 7, and each is subjected to integer transform processing and quantization processing. Further, with regard to color difference signals, as shown in FIG. 7, 2×2 matrices collecting only the DC component are generated, and these are subjected to Hadamard transform of the order 2 and quantization processing.

Also, in the event that the current macroblock is intra 16×16 mode, as shown in FIG. 7, 4×4 matrices collecting only the DC component are generated, and these are subjected to Hadamard transform of the order 4 and quantization.

Orthogonal transform processing of the order 4 can be described as in the following Expression (1).

[Mathematical Expression 1]

$$[Y] = [A][X][A]^T \quad (1)$$

$$= \begin{bmatrix} a & a & a & a \\ b & c & -c & -b \\ a & -a & -a & a \\ c & -b & b & -c \end{bmatrix}[X]$$

$$\begin{bmatrix} a & b & a & c \\ a & c & -a & -b \\ a & -c & -a & b \\ a & -b & a & -c \end{bmatrix}$$

where $a = \frac{1}{2}, b = \sqrt{\frac{1}{2}} \cos\left(\frac{\pi}{8}\right), c = \sqrt{\frac{1}{2}} \cos\left(\frac{3\pi}{8}\right)$ The following Expression (2) is a variant which can be made of this Expression (1).

[Mathematical Expression 2]

$$[Y] = ([C][X][C]^T) \otimes [E] \quad (2)$$

$$= \left( \begin{bmatrix} 1 & 1 & 1 & 1 \\ 1 & d & -d & -1 \\ 1 & -1 & -1 & 1 \\ d & -1 & 1 & -d \end{bmatrix}[X] \begin{bmatrix} 1 & 1 & 1 & d \\ 1 & d & -1 & -1 \\ 1 & -d & -1 & 1 \\ 1 & -1 & 1 & -d \end{bmatrix} \right) \otimes$$

$$\begin{bmatrix} a^2 & ab & a^2 & ab \\ ab & b^2 & ab & b^2 \\ a^2 & ab & a^2 & ab \\ ab & b^2 & ab & b^2 \end{bmatrix}$$

where $a = \frac{1}{2}, b = \sqrt{\frac{2}{5}}, d = \frac{1}{2}$

The following Expression (3) is a further variant which can be made of this Expression (2).

[Mathematical Expression 3]

$$[Y] = ([C_f][X][C_f]^T) \otimes [E_f] \quad (3)$$

$$= \left( \begin{bmatrix} 1 & 1 & 1 & 1 \\ 2 & 1 & -1 & -2 \\ 1 & -1 & -1 & 1 \\ 1 & -2 & 2 & -1 \end{bmatrix}[X] \begin{bmatrix} 1 & 2 & 1 & 1 \\ 1 & 1 & -1 & -2 \\ 1 & -1 & -1 & 2 \\ 1 & -2 & 1 & -1 \end{bmatrix} \right) \otimes$$

$$\begin{bmatrix} a^2 & ab/2 & a^2 & ab/2 \\ ab & b^2/4 & ab & b^2/4 \\ a^2 & ab/2 & a^2 & ab/2 \\ ab/2 & b^2/4 & ab/2 & b^2/4 \end{bmatrix}$$

Accordingly, matrix $[C_f]$ can be expressed as the following Expression (4).

[Mathematical Expression 4]

$$[C_f] = \begin{bmatrix} 1 & 1 & 1 & 1 \\ 2 & 1 & -1 & -2 \\ 1 & -1 & -1 & 1 \\ 1 & -2 & 2 & -1 \end{bmatrix} \quad (4)$$

That is to say, the image encoding device 101 uses the matrix shown to the right-hand side in Expression (4) as an integer transform matrix.

Accordingly, integer transform can be realized by add (add-subtract) and shift (bit-shift).

Also, from Expression (3), matrix [$E_f$] can be expressed as the following Expression (5).

[Mathematical Expression 5]

$$[E_f] = \begin{bmatrix} a^2 & ab/2 & a^2 & ab/2 \\ ab & b^2/4 & ab & b^2/4 \\ a^2 & ab/2 & a^2 & ab/2 \\ ab/2 & b^2/4 & ab/2 & b^2/4 \end{bmatrix} \quad (5)$$

The term at the right-hand side of this Expression (5) is realized by the image encoding device 101 performing different quantization processing for each 4×4 component. In other words, the image encoding device 101 realizes orthogonal transform by combination of integer transform and quantization processing.

Also, inverse integer transform can be expressed as in the following Expression (6).

[Mathematical Expression 6]

$$[X'] = [C_i]^T([Y] \otimes [E_i])[C_i] \quad (6)$$

$$= \begin{bmatrix} 1 & 1 & 1 & 1/2 \\ 1 & 1/2 & -1 & -1 \\ 1 & -1/2 & -1 & 1 \\ 1 & -1 & 1 & -1/2 \end{bmatrix} \left( [Y] \otimes \begin{bmatrix} a^2 & ab & a^2 & ab \\ ab & b^2 & ab & b^2 \\ a^2 & ab & a^2 & ab \\ ab & b^2 & ab & b^2 \end{bmatrix} \right)$$

$$\begin{bmatrix} 1 & 1 & 1 & 1 \\ 1 & 1/2 & -1/2 & -1 \\ 1 & -1 & -1 & 1 \\ 1/2 & -1 & 1 & -1/2 \end{bmatrix}$$

Accordingly, the right-hand side of Expression (6) can be expressed as in the following Expression (7) and Expression (8).

[Mathematical Expression 7]

$$([Y] \otimes [E_i]) = \left( [Y] \otimes \begin{bmatrix} a^2 & ab & a^2 & ab \\ ab & b^2 & ab & b^2 \\ a^2 & ab & a^2 & ab \\ ab & b^2 & ab & b^2 \end{bmatrix} \right) \quad (7)$$

-continued

[Mathematical Expression 8]

$$[C_i] = \begin{bmatrix} 1 & 1 & 1 & 1 \\ 1 & 1/2 & -1/2 & -1 \\ 1 & -1 & -1 & 1 \\ 1/2 & -1 & 1 & -1/2 \end{bmatrix} \quad (8)$$

The matrix shown to the right-hand side in Expression (7) is a 4×4 matrix obtained as the result of inverse quantization, while a 4×4 matrix as to the decoded image is calculated by applying the inverse integer matrix shown to the right-hand side in Expression (8).

Inverse integer transform also can be realized by add (add-subtract) and shift (bit-shift) alone.

A in FIG. 8 and B in FIG. 8 illustrate a technique for realizing integer transform and inverse integer transform by butterfly computation.

[8×8 Orthogonal Transform]

Next, description will be made regarding 8×8 orthogonal transform which can be used with AVC High Profile and higher.

With the image encoding device 101, 8×8-orthogonal transform is defined as integer transform realized with only add-subtract and shift computation, the same as with the case of 4×4.

First, the image encoding device 101 performs calculation of orthogonal transform for eight points in the horizontal direction, and next performs transform for eight points in the vertical direction.

To simplify description, one-dimensional integer transform of order 8 will be described.

With input signals of {d0, d1, d2, d3, d4, d5, d6, d7}, first, calculation of the following Expression (9) through Expression (16) is performed.

$$e0 = d0 + d7 \quad (9)$$

$$e1 = d1 + d6 \quad (10)$$

$$e2 = d2 + d5 \quad (11)$$

$$e3 = d3 + d6 \quad (12)$$

$$e4 = d0 - d7 \quad (13)$$

$$e5 = d1 - d6 \quad (14)$$

$$e6 = d2 - d5 \quad (15)$$

$$e7 = d3 - d4 \quad (16)$$

Next, calculation of the following Expression (17) through Expression (24) is performed for {e0, e1, e2, e3, e4, e5, e6, e7}.

$$e'0 = e0 + e3 \quad (17)$$

$$e'1 = e1 + e2 \quad (18)$$

$$e'2 = e0 - e3 \quad (19)$$

$$e'3 = e1 - e2 \quad (20)$$

$$e'4 = e5 + e6 + (e4 >> 1 + e4) \quad (21)$$

$$e'5=e4-e7-(e6>>1+e6) \quad (22)$$

$$e'6=e4+e7-(e5>>1+e5) \quad (23)$$

$$e'7=e5-e6+(e7>>1+e7) \quad (24)$$

Further, calculation of the following Expression (25) through Expression (32) is performed for {e'0, e'1, e'2, e'3, e'4, e'5, e'6, e'7}, obtaining orthogonally transformed coefficients {D0, D1, D2, D3, D4, D5, D6, D7}.

$$D0=e'0+e'1 \quad (25)$$

$$D2=e'2+e'3>>1 \quad (26)$$

$$D4=e'0-e'1 \quad (27)$$

$$D6=e'2>>1-e'3 \quad (28)$$

$$D1=e'4+e'7>>2 \quad (29)$$

$$D3=e'5+e'6>>2 \quad (30)$$

$$D5=e'6-e'5>>2 \quad (31)$$

$$D7=-e'7+e'4>>2 \quad (32)$$

Inverse orthogonal transform from {D0, D1, D2, D3, D4, D5, D6, D7} to {d0, d1, d2, d3, d4, d5, d6, d7} is performed as follows.

That is to say, first, from {D0, D1, D2, D3, D4, D5, D6, D7} to {f0, f1, f2, f3, f4, f5, f6, f7} is calculated as with the following Expression (34) through Expression (40).

$$f0=D0+D4 \quad (33)$$

$$f1=-D3+D5-(D7+D7>>1) \quad (34)$$

$$f2=D0-D4 \quad (35)$$

$$f3=D1+D7-(D3+D3>>1) \quad (36)$$

$$f4=D2>>1-D6 \quad (37)$$

$$f5=-D1+D7+(D5+D5>>1) \quad (38)$$

$$f6=D2+D6>>1 \quad (39)$$

$$f7=D3+D5+(D1+D1>>1) \quad (40)$$

Next, from {f0, f1, f2, f3, f4, f5, f6, f7} to {f'0, f'1, f'2, f'3, f'4, f'S, f'6, f'7} is calculated as with the following Expression (41) through Expression (48).

$$f'0=f0+f6 \quad (41)$$

$$f'1=f1+f7>>2 \quad (42)$$

$$f'2=f2+f4 \quad (43)$$

$$f'3=f3+f5>>2 \quad (44)$$

$$f'4=f2-f4 \quad (45)$$

$$f'5=f3>>2-f5 \quad (46)$$

$$f'6=f0-f6 \quad (47)$$

$$f'7=f7-f1>>2 \quad (48)$$

Finally, from {f'0, f'1, f'2, f'3, f'4, f'S, f'6, f'7} to {d0, d1, d2, d3, d4, d5, d6, d7} is calculated as with the following Expression (49) through Expression (56).

$$d0=f'0+f'7 \quad (49)$$

$$d1=f'2+f'5 \quad (50)$$

$$d2=f'4+f'3 \quad (51)$$

$$d3=f'6+f'1 \quad (52)$$

$$d4=f'6-f'1 \quad (53)$$

$$d5=f'4-f'3 \quad (54)$$

$$d6=f'2-f'5 \quad (55)$$

$$d7=f'0-f'7 \quad (56)$$

[Deblocking Filter]

Next, the deblocking filter will be described. The deblocking filter 21 is included in the motion compensation loop, and removes block noise in decoded images. Accordingly, propagation of block noise to the image referenced by motion compensation processing is suppressed.

The following three methods of (a) through (c) for deblocking filter processing can be selected by the two parameters of deblocking_filter_control_present_flag included in Picture Parameter Set RBSP (Raw Byte Sequence Payload) and disable_deblocking_filter_idc included in the slice header (Slice Header), which are included in the encoded data.

(a) applied to block boundaries and macroblock boundaries (b) applied to just macroblock boundaries (c) not applied As for a quantization parameter QP, QPY is used in the case of applying the following processing to luminance signals, and QPC is used in the case of applying to color difference signals. Also, while pixel values belonging to different slices are processed as being "not available" in motion vector encoding, intra prediction, and entropy encoding (CAVLC/CABAC), with deblocking filter processing even pixel values belonging to different slices are processed as being "available" as long as they belong to the same picture.

In the following we will say that the pixel values before deblocking filter processing are p0 through p3 and q0 through q3, and the pixel values after deblocking filter processing are p0' through p3' and q0' through q3', as shown in FIG. 9.

First, prior to the deblocking filter processing, Bs (Boundary Strength) is defined for p and q in FIG. 9, as with the table shown in FIG. 10.

The (p2, p1, p0, q0, q1, q2) in FIG. 9 is subjected to deblocking filter processing only in the event that the conditions shown in the following Expression (57) and Expression (58) hold.

$$Bs>0 \quad (57)$$

$$|p0-q0|<\alpha; |p1-p0|<\beta; |q1-10|<\beta \quad (58)$$

Figure 11:
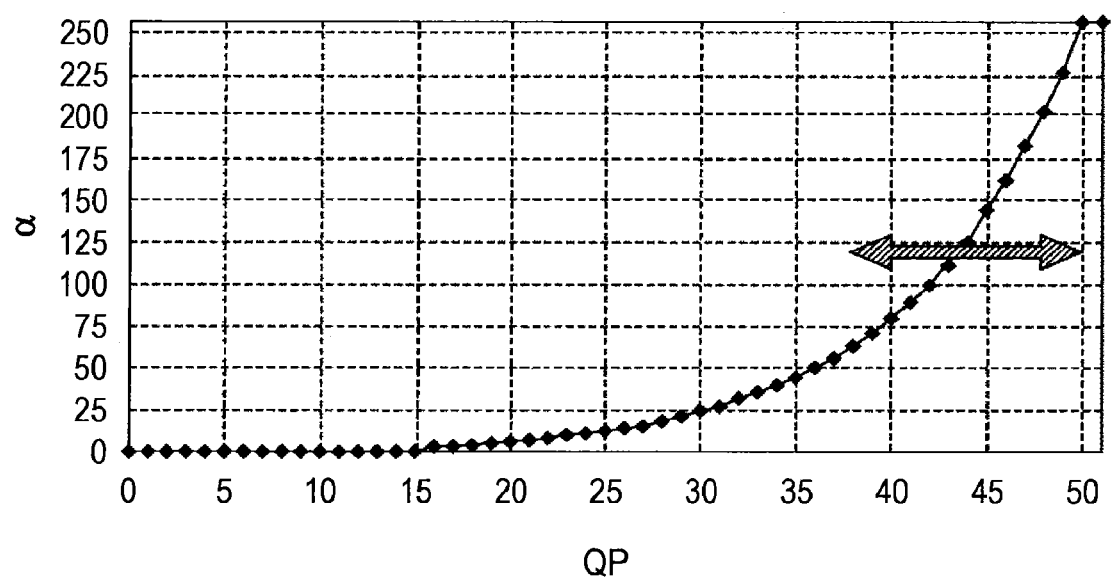
FIG. 11 is a diagram for describing an operating principle of a deblocking filter.

In the default state, α and β in Expression (58) have the values thereof determined in accordance with QP as shown below, but the user can adjust the intensities thereof as indicated by the arrows in the graph in FIG. 11, by the two parameters called slice_alpha_c0_offset_div2 and slice_beta_offset_div2 which are included in the slice header of the encoded data.

As shown in the table in FIG. 12, α is obtained from indexA. In the same way, β is obtained from indexB. These indexA and indexB are defined as with the following Expression (59) through Expression (61).

$$qP_{av}=(qP_p+qP_q+1)>>1 \quad (59)$$

$$\text{index}A=\text{Clip3}(0,51,qP_{av}+\text{FilterOffset}A) \quad (60)$$

$$\text{index}B=\text{Clip3}(0,51,qP_{av}+\text{FilterOffset}B) \quad (61)$$

In Expression (60) and Expression (61), FilterOffsetA and FilterOffsetB correspond to the amount of adjustment by the user.

With deblocking filter processing, mutually different methods are defined for the case of Bs<4 and the case of Bs=4, as will be described below. In the case of Bs<4, the pixel values p'0 and q'0 after deblocking filter processing are obtained as with the following Expression (62) through Expression (64).

$$\Delta=\text{Clip3}(-t_c,t_c,((((q0-p0)<<2)+(p1-q1)+4)>>3)) \quad (62)$$

$$p'0=\text{Clip1}(p0+\Delta) \quad (63)$$

$$q'0=\text{Clip1}(q0+\Delta) \quad (64)$$

Now, $t_c$ is calculated as with Expression (65) or Expression (66) below. That is to say, in the event that the value of chromaEdgeFlag is "0", $t_c$ is calculated as with the following Expression (65).

$$t_c=t_{c0}+((a_p<\beta)?1:0)+((a_p<\beta)?1:0) \quad (65)$$

Also, in the event that the value of chromaEdgeFlag is other than "0", $t_c$ is calculated as with the following Expression (66).

$$t_c=t_{c0}+1 \quad (66)$$

The value of $t_{c0}$ is defined as shown in the table in A in FIG. 13 and B in FIG. 13, in accordance with Bs and the value of indexA.

Also, the values of $a_p$ and $a_q$ in Expression (65) are calculated as with the following Expressions (67) and (68).

$$a_p=|p2-p0| \quad (67)$$

$$a_q=|q2-q0| \quad (68)$$

The pixel value p'1 following deblocking filter processing is obtained as follows. That is to say, in the event that the value of chromaEdgeFlag is "0" and also the value of $a_p$ is equal to or smaller than β, p'1 is obtained as with the following Expression (69).

$$p'1=p1+\text{Clip3}(-t_{c0},t_{c0},(p2+((p0+q0+1)>>1)-(p1<<1))>>1) \quad (69)$$

Also, in the event that Expression (69) does not hold, p'1 is obtained as with the following Expression (70).

$$p'1=p1 \quad (70)$$

The pixel value q'1 following deblocking filter processing is obtained as follows. That is to say, in the event that the value of chromaEdgeFlag is "0" and also the value of $a_q$ is equal to or smaller than β, q'1 is obtained as with the following Expression (71).

$$q'1=q1+\text{Clip3}(-t_{c0},t_{c0},(q2+((p0+q0+1)>>1)-(q1<<1))>>1) \quad (71)$$

Also, in the event that Expression (71) does not hold, q'1 is obtained as with the following Expression (72).

$$q'1=q1 \quad (72)$$

The values of p'2 and q'2 are unchanged from the values of p2 and q2 before Filtering. That is to say, p'2 is obtained as with the following Expression (73), and q'2 is obtained as with the following Expression (74).

$$p'2=p2 \quad (73)$$

$$q'2=q2 \quad (74)$$

In the case of Bs=4, the pixel values p'I (i=0 . . . 2) following deblocking filtering are obtained as follows. In the event that the value of chromaEdgeFlag is "0" and the conditions shown in the following Expression (75) hold, p'0, p'1, and p'2 are obtained as with the following Expression (76) through Expression (78).

$$ap<\beta\&\&|p0-q0|<((\alpha>>2)+2) \quad (75)$$

$$p'0=(p2+2\times p1+2\times p0+2\times q0+q1+4)>>3 \quad (76)$$

$$p'1=(p2+p1+p0+q0+2)>>2 \quad (77)$$

$$p'2=(2\times p3+3\times p2+p1+p0+q0+4)>>3 \quad (78)$$

Also, in the event that the conditions shown in Expression (75) do not hold, p'0, p'1, and p'2 are obtained as with the following Expressions (79) through (81).

$$p'0=(2\times p1+p0+q1+2)>>2 \quad (79)$$

$$p'1=p1 \quad (80)$$

$$p'2=p2 \quad (81)$$

The pixel values q'i (I=0 . . . 2) following deblocking filter processing are obtained as follows. That is, in the event that the value of chromaEdgeFlag is "0" and the conditions shown in the following Expression (82) hold, q'0, q'1, and q'2 are obtained as with the following Expressions (83) through (85).

$$aq<\beta\&\&|p0-q0|<((\alpha>>2)+2) \quad (82)$$

$$q'0=(p1+2\times p0+2\times q0+2\times q1+q2+4)>>3 \quad (83)$$

$$q'1=(p0+q0+q1+q2+2)>>2 \quad (84)$$

$$q'2=(2\times q3+3\times q2+q1+q0+p4+4)>>3 \quad (85)$$

Also, in the event that the conditions shown in Expression (82) do not hold, q'0, q'1, and q'2 are obtained as with the following Expressions (86) through (88).

$$q'0=(2\times q1+q0+p1+2)>>2 \quad (86)$$

$$q'1=q1 \quad (87)$$

$$q'2=q2 \quad (86)$$

[Example of Extended Macroblocks]

Also, making the macroblock size to be 16 pixels×16 pixels is not optimal for large image frames such as UHD (Ultra High Definition; 4000 pixels×2000 pixels) which serves the object of next-generation encoding formats. With the image encoding device 101, as illustrated in FIG. 14, it may be employed to make the macroblock size a size, for example, such as 32 pixels×32 pixels or 64×64 pixels.

Figure 14:
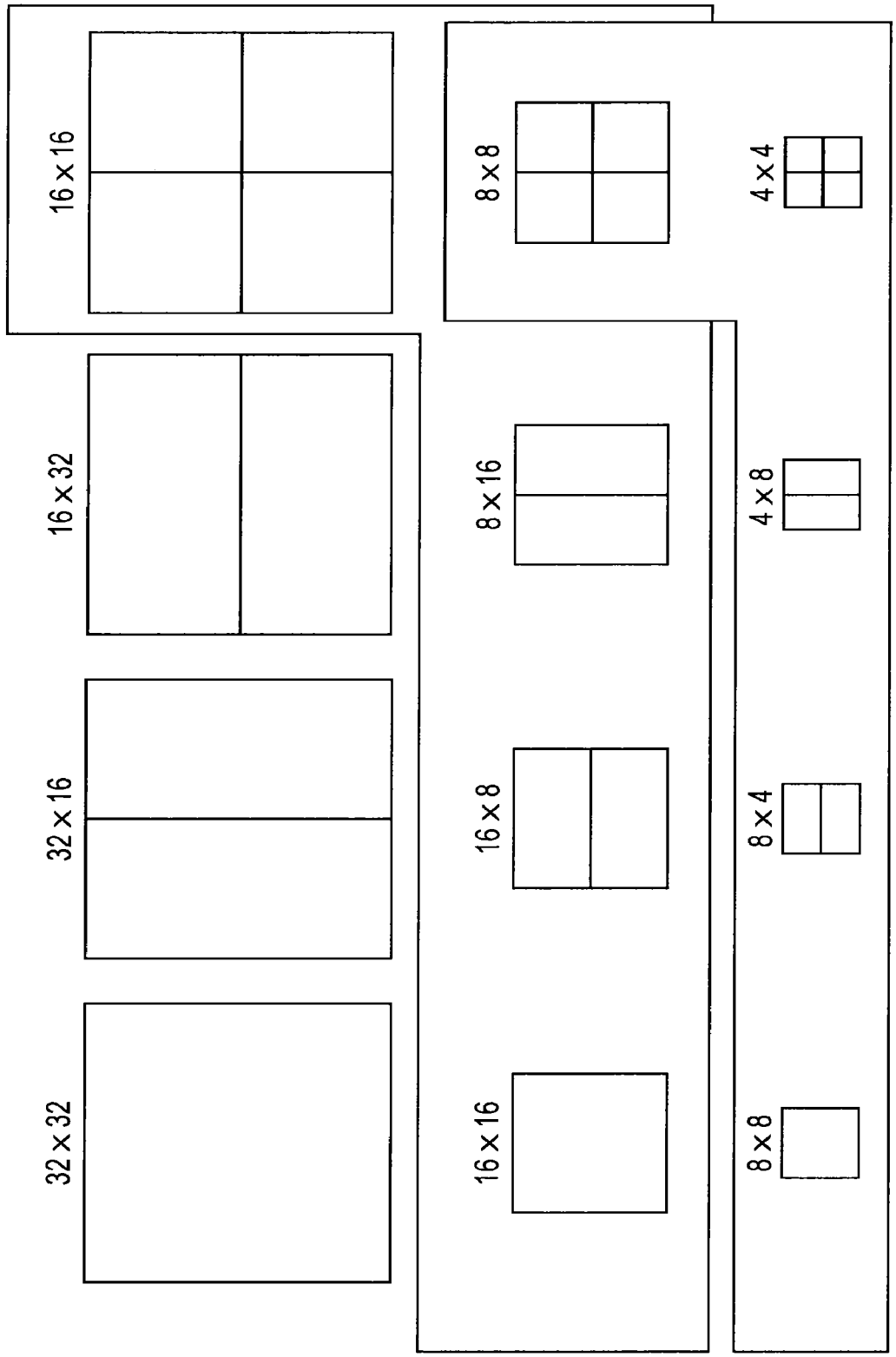
FIG. 14 is a diagram illustrating an example of macroblocks.

FIG. 14 is a diagram illustrating an example of a block size proposed in NPL 2. With NPL 2, the macroblock size is extended to 32×32 pixels.

With the upper tier in FIG. 14, macroblocks made up of 32×32 pixels divided into blocks (partitions) of 32×32 pixels, 32×16 pixels, 16×32 pixels, and 16×16 pixels are indicated in order from the left. With the middle tier in FIG. 14, blocks made up of 16×16 pixels divided into blocks of 16×16 pixels, 16×8 pixels, 8×16 pixels, and 8×8 pixels are indicated in order from the left. Also, with the lower tier in FIG. 14, blocks made up of 8×8 pixels divided into blocks of 8×8 pixels, 8×4 pixels, 4×8 pixels, and 4×4 pixels are indicated in order from the left.

That is to say, with the macroblock of 32×32 pixels, processing with blocks of 32×32 pixels, 32×16 pixels, 16×32 pixels, and 16×16 pixels indicated in the upper tier in FIG. 14 can be performed.

With the block of 16×16 pixels indicated on the right side in the upper tier, in the same way as with the H.264/AVC format, processing with blocks of 16×16 pixels, 16×8 pixels, 8×16 pixels, and 8×8 pixels indicated in the middle tier can be performed.

With the block of 8×8 pixels indicated on the right side in the middle tier, in the same way as with the H.264/AVC format, processing with blocks of 8×8 pixels, 8×4 pixels, 4×8 pixels, and 4×4 pixels indicated in the lower tier can be performed.

These blocks can be classified into the following three hierarchies. Specifically, the blocks of 32×32 pixels, 32×16 pixels, and 16×32 pixels indicated in the upper tier in FIG. 14 will be referred to as a first hierarchy. The block of 16×16 pixels indicated on the right side in the upper tier, and the blocks of 16×16 pixels, 16×8 pixels, 8×16 pixels indicated in the middle tier will be referred to as a second hierarchy. The block of 8×8 pixels indicated on the right side in the middle tier, and the blocks of 8×8 pixels, 8×4 pixels, 4×8 pixels, and 4×4 pixels indicated in the lower tier will be referred to as a third hierarchy.

A hierarchical structure such as FIG. 14 is employed, and accordingly, as for blocks equal to or smaller than the block of 16×16 pixels, while maintaining compatibility with the macro blocks in the current AVC, greater blocks are defined as super sets thereof.

[Selection of Prediction Mode]

Also, in order to achieve even higher encoding efficiency, selecting an appropriate prediction mode is important. For example, with the image encoding device 101, a method for selecting two mode determining methods of a High Complexity Mode and a Low Complexity Mode can be conceived. In the case of this method, with either, cost function values relating to each prediction mode Mode are calculated, and the prediction mode which makes this the smallest is selected as the optional mode for the current block through macroblock.

The cost function value with the High Complexity Mode can be obtained as with the following Expression (89).

$$\text{Cost(Mode} \in \Omega) = D + \lambda \times R \qquad (89)$$

In the Expression (89), $\Omega$ is the whole set of candidate modes for encoding the current block through macroblock. Also, D is difference energy between the decoded image and input image in the case of encoding with the current prediction mode Mode. Further, $\lambda$ is a Lagrange multiplier given as a function of a quantization parameter. Also, R is the total code amount in the case of encoding with the current mode Mode, including orthogonal transform coefficients.

That is to say, in order to perform encoding with the High Complexity Mode, there is the need to perform tentative encoding processing once by all candidate modes Mode in order to calculate the above parameters D and R, requiring a greater amount of computations.

On the other hand, the cost function value in the Low Complexity Mode can be obtained as shown in the following Expression (90).

$$\text{Cost(Mode} \in \Omega) = D + \text{QP2Quant(QP)} \times \text{HeaderBit} \qquad (90)$$

it is. In Expression (90), D is the difference energy between the prediction image and input image, unlike the case of the High Complexity Mode. Also, QP2Quant (QP) is given as a function of a quantization parameter QP. Further, HeaderBit is the code amount relating to information belonging to the Header not including orthogonal transform coefficients, such as motion vectors and mode.

That is to say, in the Low Complexity mode, prediction processing needs to be performed relating to each candidate mode Mode, but there is not need to perform all the way to a decoded image, so there is no need to perform all the way to decoding processing. Accordingly, realization with a smaller amount of computation as compared to the High Complexity Mode is enabled.

Figure 6:
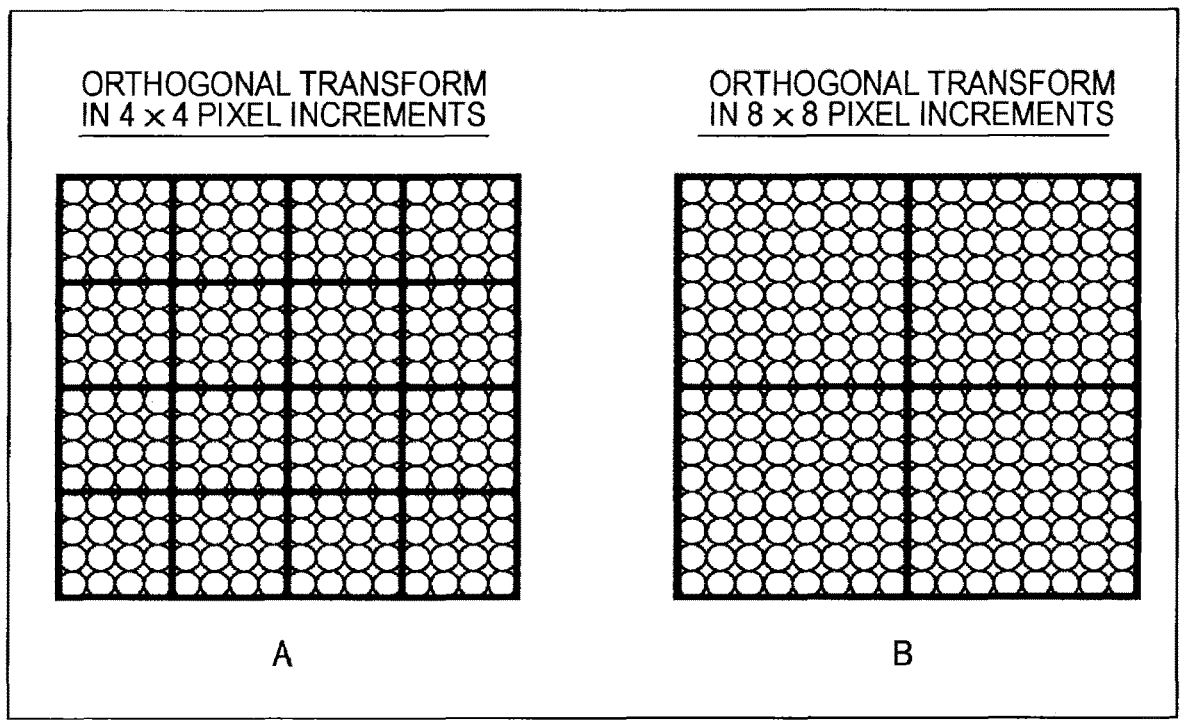
FIG. 6 is a diagram for describing an example of increments of orthogonal transform.

With High Profile, selection between 4×4 orthogonal transform and 8×8 orthogonal transform such as shown in FIG. 6 is also performed based on one of the above-described High Complexity Mode and Low Complexity Mode.

[Detailed Configuration Example]

With the above image encoding device 101, mosquito noise filter processing is applied to the image encoding processing. The image encoding device 101 includes a mosquito noise filter 114 within the motion prediction/compensation loop, and controls, according to the orthogonal transform size of each macroblock, filter processing as to the macro block thereof.

Hereafter, description will be made regarding details of the configuration of the mosquito noise filter 114. Mosquito noise is caused due to quantization error of orthogonal transform coefficients at high-frequency components.

With H.264/AVC, as described above, the orthogonal transform in 4×4 pixel increments illustrated in A in FIG. 6, and the orthogonal transform in 8×8 pixel increments illustrated in B in FIG. 6 can be employed by switching in increments of macroblocks in the case of equal to or greater than High Profile. Also, as described above with reference to FIG. 14, in the case that a size such as 32 pixels×32 pixels, or 64×64 pixels has been employed, it can further be conceived to introduce the orthogonal transform in 16×16 pixel increments. However, mosquito noise is readily caused with a macroblock to which a greater orthogonal transform size is applied.

Also, though in the case that texture included in the current macroblock is flat, mosquito noise is not readily caused, in the case that an edge is included in the current macroblock, mosquito noise is readily caused.

In this way, whether or not mosquito noise occurs as to the current macroblock depends on the texture information and orthogonal transform size of the current macroblock.

With the mosquito noise filter 114 in FIG. 5, control is performed by taking advantage of such a fact whether to perform or not to perform filter processing for mosquito noise removal. As for this filter processing control, there are two methods. Even with either method, at least the information of an orthogonal transform size is employed.

First, the first method will be described. With the first method, first, activity X serving as one of Complexity (difficulty level parameters) as to the current macroblock is calculated such as the following Expression (91) using a quantization scale Q and a generation bit B in the current macroblock.

$$X = Q \ast B \qquad (91)$$

Note that, in the case that the lossless encoding format is the CABAC format, the generation bin of the current macroblock may be employed instead of the generation bit.

When this activity value is high, an edge is included in the current macroblock, i.e., the current macroblock is conceived as a complicated texture, and when the activity value is low, the current macroblock is conceived as a flat region, i.e., as a simple texture.

In the event that the activity X calculated in this way, and a predetermined threshold $\Theta(T)$ are compared, when the following Expression (92) holds, the filter processing for mosquito noise removal is performed on a pixel value included in the current macroblock.

$$X > \Theta(T) + \Theta_{\mathit{offset}} \qquad (92)$$

Here, T represents the orthogonal transform size of the current macroblock size. That is to say, a threshold $\Theta$ is determined according to the orthogonal transform size. Also, $\Theta_{\mathit{offset}}$ is an offset value that the user can set, whereby the intensity of the mosquito noise filter can be set. Note that the offset value may be omitted.

As for the threshold $\Theta$, a smaller threshold is set as to a greater orthogonal transform size, whereby the mosquito noise filter can readily work. This is because mosquito noise readily occurs in the event that the orthogonal transform size is greater.

Next, the second method will be described. With the second method, first, the number of non-zero orthogonal transforms after quantization processing included in the current macroblock is counted. When this number is taken as N, and this N satisfies the following Expression (93) as to a predetermined threshold $\Theta(QP, T)$, the filter processing for mosquito noise removal is performed on the current macroblock.

$$N > \Theta(QP,T) + \Theta_{\mathit{offset}} \qquad (93)$$

With the Expression (93) as well, $\Theta_{\mathit{offset}}$ is an offset value that the user can set, whereby the intensity of the mosquito noise filter can be set. Note that the offset value may be omitted.

Also, as for the predetermined quantization parameter QP, the threshold $\Theta$ is set such as the following Expression (94).

$$\Theta(T=4\times4,QP) > \Theta(T=8\times8,QP) > \Theta(T=16\times16,QP) > \ldots \qquad (94)$$

That is to say, with regard to the same quantization parameter QP, a greater orthogonal transform size is set to a smaller threshold, and accordingly, the mosquito noise filter can readily work. This is because mosquito noise is readily caused in the event of a greater orthogonal transform size.

Also, with regard to a certain orthogonal transform size, in the event that two quantization parameters $qp_1$ and $qp_2$ are set so as to have a relation of $qp_1 < qp_2$, the threshold $\Theta$ is set such as the following Expression (95).

$$\Theta(T,qp_1) > \Theta(T,qp_2) \qquad (95)$$

That is to say, in the event that encoding has been performed with a higher quantization parameter, it can be conceived that more quantization noise is included, and mosquito noise is readily caused, and accordingly, the mosquito noise filter can readily work by the threshold being set low.

That is to say, in the case of the second method, when the orthogonal transform size is great, or the quantization parameter is high, the threshold is set smaller, and accordingly, the mosquito noise filter can readily work. On the other hand, when the orthogonal transform size is small, or the quantization parameter is low, the threshold is set greater, and accordingly, the mosquito noise filter is prevented from readily working.

As described above, with the image encoding device 101 in FIG. 5, encoding information such as the orthogonal transform coefficient, orthogonal transform size, quantization value, generated code amount, and so forth as to each macroblock is used, and it is controlled (determined) whether to perform the filter processing for mosquito noise removal on the current macroblock.

The encoding information mentioned here is information of a syntax element that is encoded and added to the header of a compressed image and transmitted to the decoding side by the lossless encoding unit 113.

Note that the scope of the present invention is not restricted to the above two methods. For example, another encoding information (syntax element) may be used for control of the mosquito noise filter. For example, as for a still region, mosquito noise is easily conspicuous, but as for a dynamic region, mosquito noise is not easily conspicuous, and accordingly, control of the mosquito noise filter can be performed by taking motion vector information to be searched by the motion prediction/compensation unit 25 into consideration.

As described above, in the event that it has been determined to perform the filter processing for mosquito noise removal on the current macroblock, all of the pixel values included in the determined macroblock are subjected to soothing processing by a two-dimensional filter having a predetermined window size with a pixel to be processed as the center as the filter processing for mosquito noise removal. Specifically, the smoothing processing is performed by a Gaussian filter having a 3×3 window size as indicated in the following Expression (96).

[Mathematical Expression 9]

$$\frac{1}{16}\begin{bmatrix} 1 & 2 & 1 \\ 2 & 4 & 2 \\ 1 & 2 & 1 \end{bmatrix} \qquad (96)$$

Note that, as for a filter coefficient for smoothing, for example, a variable filter coefficient such as an adaptive filter may be calculated and employed instead of a fixed filter coefficient such as the Expression (96). In this case, the calculated filter coefficient is added to the header of the compressed image and transmitted to the decoding side.

[Configuration Example of Mosquito Noise Filter]

Figure 15:
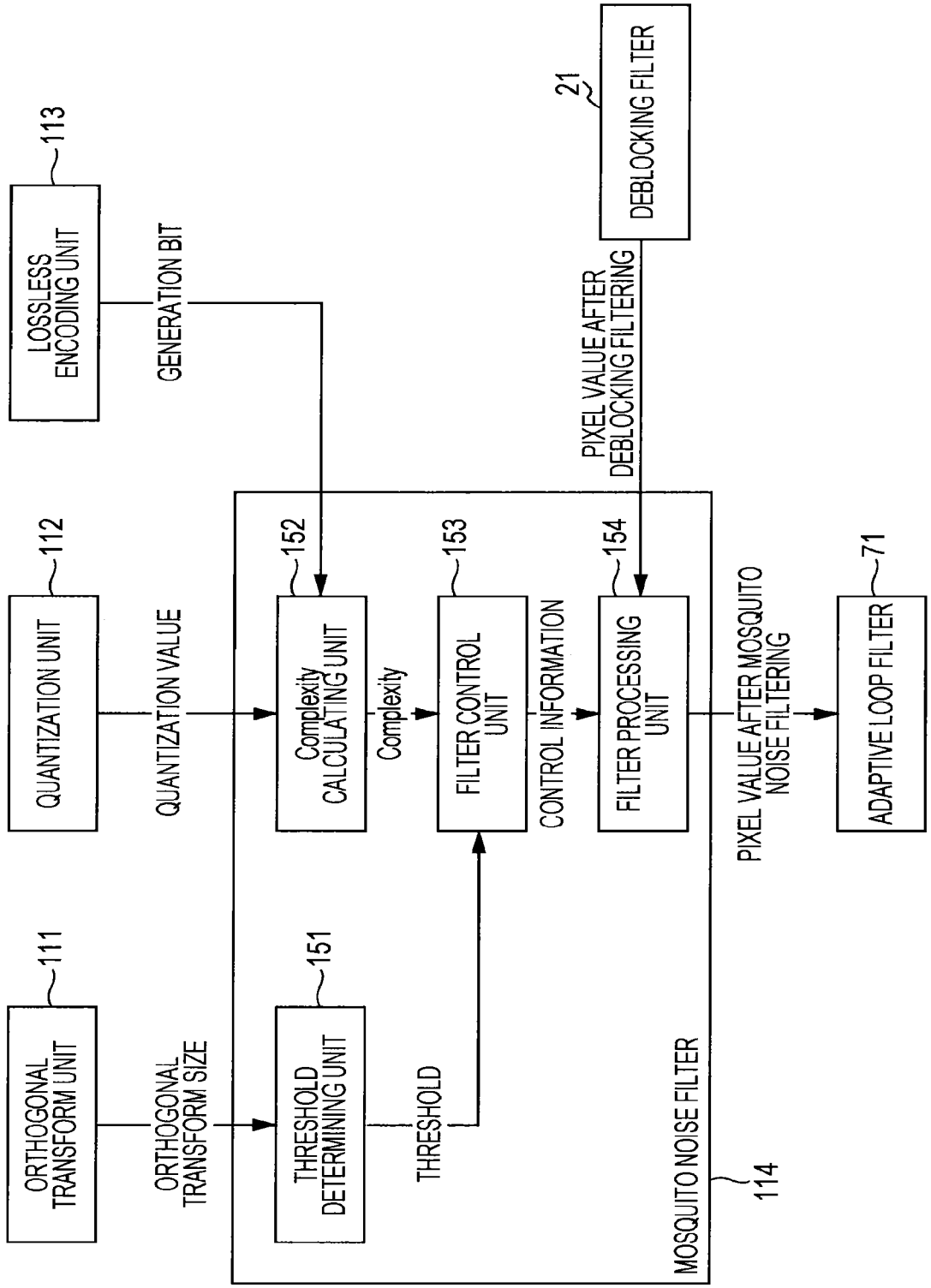
FIG. 15 is a block diagram illustrating a configuration example of the mosquito noise filter in FIG. 5.

FIG. 15 is a block diagram illustrating a configuration example of a mosquito noise filter for performing the first method.

With the example in FIG. 15, the mosquito noise filter 114 is configured of a threshold determining unit 151, a Complexity calculating unit 152, a filter control unit 153, and a filter processing unit 154.

Information relating to the orthogonal transform size of the current macroblock is supplied from the orthogonal transform unit 111 to the threshold determining unit 151. The threshold determining unit 151 determines a threshold $\Theta(T)$ for the filter processing for removing mosquito noise based on the orthogonal transform size of the current macroblock. The information of the determined $\Theta(T)$ is supplied to the filter control unit 153.

Information of a quantization value relating to the current macroblock is supplied from the quantization unit 112 to the Complexity calculating unit 152. Information relating to the generated code amount (generation bit) of the current macroblock is supplied from the lossless encoding unit 113 to the Complexity calculating unit 152. Note that, in the case of the CABAC method being employed as the lossless encoding method, a generation bin may be supplied instead of a generation bit.

The Complexity calculating unit 152 uses the above Expression (91) to calculate Complexity (activity in the case of Expression (91)) as to the current macroblock, and supplies the value of the calculated Complexity to the filter control unit 153.

The filter control unit 153 determines whether to perform the filter processing for mosquito noise removal on the current macroblock using the threshold determination processing of the above Expression (92), and supplies control information thereof to the filter processing unit 154.

Pixel values after deblocking filter processing serving as the output of the deblocking filter 21 are input to the filter processing unit 154 as well as the control information from the filter control unit 153. The filter processing unit 154 uses, for example, the filter coefficient of the Expression (96) to perform filter processing based on the control information from the filter control unit 153. The pixel values after the filter processing are output to the adaptive loop filter 71.

Figure 16:
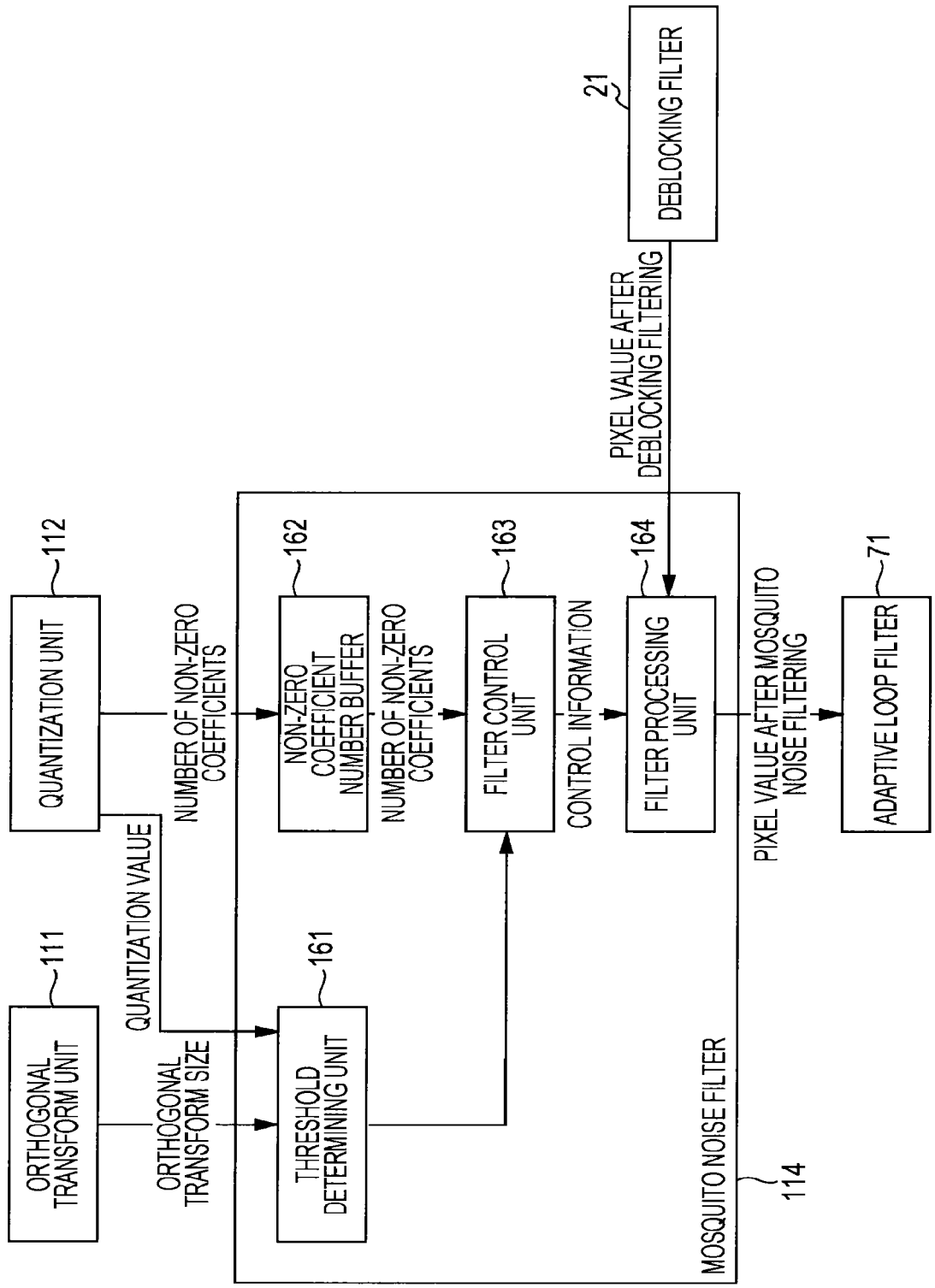
FIG. 16 is a block diagram illustrating another configuration example of the mosquito noise filter in FIG. 5.

FIG. 16 is a block diagram illustrating a configuration example of a mosquito noise filter for performing the second method.

With the example in FIG. 16, the mosquito noise filter 114 is configured of a threshold determining unit 161, a non-zero coefficient number buffer 162, a filter control unit 163, and a filter processing unit 164.

Information relating to the orthogonal transform size of the current macroblock from the orthogonal transform unit 111, and information of a quantization value regarding the current macroblock from the quantization unit 112 are supplied to the threshold determining unit 161. The threshold determining unit 161 determines a threshold Θ(QP, T) for the filter processing for removing mosquito noise based on the orthogonal transform size and quantization value of the current macroblock. Information of the determined threshold Θ(QP, T) is supplied to the filter control unit 163.

Information of the number of orthogonal transform coefficients after quantization regarding the current macroblock (non-zero coefficients) is supplied from the quantization unit 112 to the non-zero coefficient number buffer 162 for storing. Information of the non-zero coefficient number stored in the non-zero coefficient number buffer 162 is supplied to the filter control unit 163.

The filter control unit 163 determines whether to perform the filter processing for mosquito noise removal on the current macroblock from the information of the threshold Θ(QP, T) and the information of the non-zero coefficient number using the threshold determination processing of the above Expression (93), and supplies control information thereof to the filter processing unit 164.

The pixel values after the deblocking filter processing serving as the output of the deblocking filter 21 are input to the filter processing unit 164 as well as the control information from the filter control unit 163. The filter processing unit 164 uses the filter coefficient in the Expression (96) to perform the filter processing based on the control information from the filter control unit 163, for example. The pixel values after the filter processing are output to the adaptive loop filter 71.

[Description of Encoding Processing of Image Encoding Device]

Figure 17:
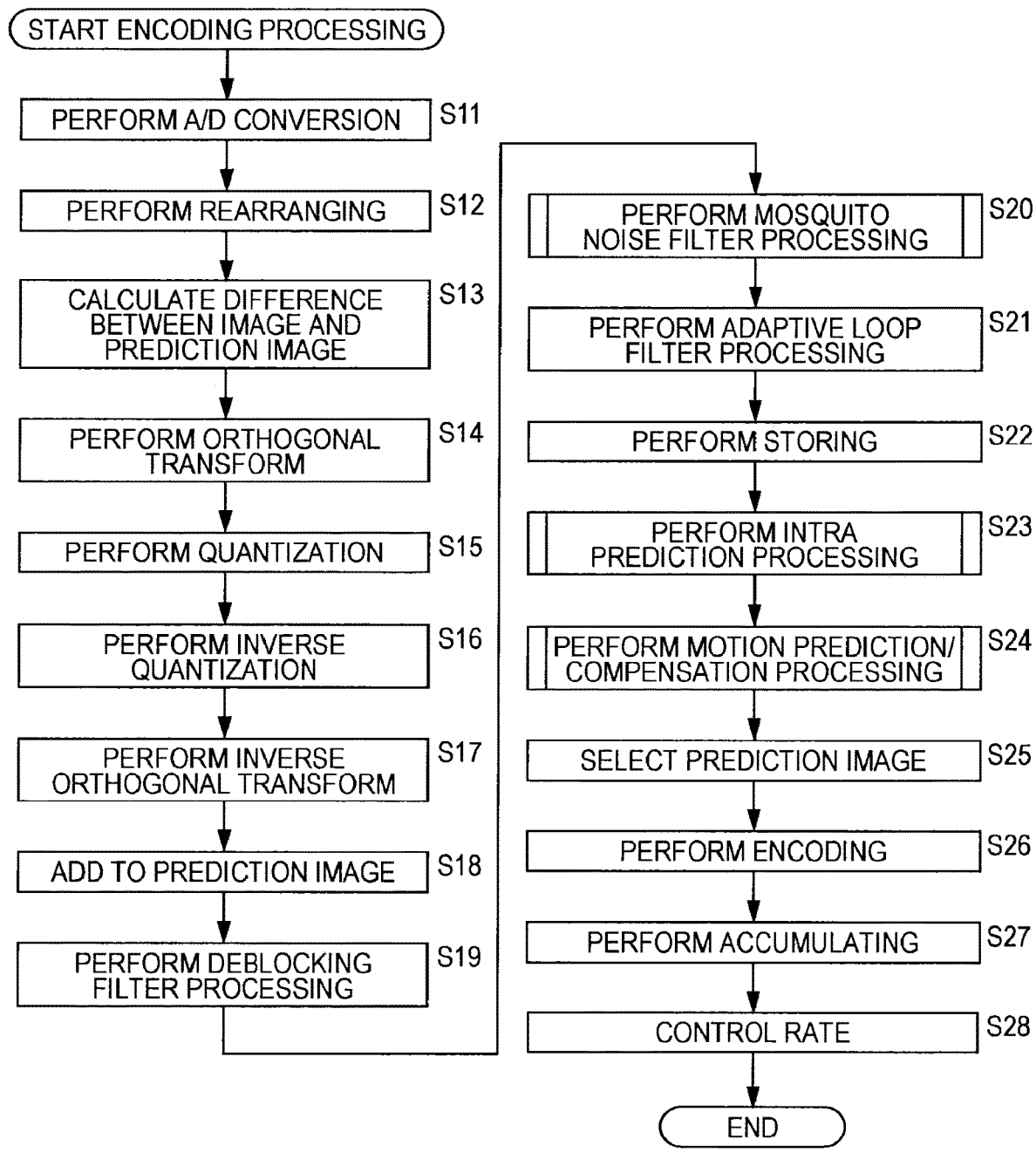
FIG. 17 is a flowchart describing encoding processing of the image encoding device in FIG. 5.

Next, encoding processing of the image encoding device 101 in FIG. 5 will be described with reference to the flowchart in FIG. 17.

In step S11, the A/D conversion unit 11 converts an input image from analog to digital. In step S12, the screen rearranging buffer 12 stores the image supplied from the A/D conversion unit 11, and performs rearranging from the sequence for displaying the pictures to the sequence for encoding.

In step S13, the computing unit 13 computes difference between an image rearranged by the processing in step S12 and the prediction image. The prediction image is supplied to the computing unit 13 from the motion prediction/compensation unit 25 in the event of performing inter prediction, and from the intra prediction unit 24 in the event of performing intra prediction, via the prediction image selecting unit 26, respectively.

The difference data is smaller in the data amount as compared to the original image data. Accordingly, the data amount can be compressed as compared to the case of encoding the original image without change.

In step S14, the orthogonal transform unit 111 subjects the difference information supplied from the computing unit 13 to orthogonal transform. Specifically, orthogonal transform, such as discrete cosine transform, Karhunen-Loéve transform, or the like, is performed, and a transform coefficient is output. At this time, the orthogonal transform unit 111 supplies information of the orthogonal transform size of each macroblock to the mosquito noise filter 114.

In step S15, the quantization unit 112 quantizes the transform coefficient. At this time, the quantization unit 112 supplies a quantization value relating to each macroblock to the mosquito noise filter 114. At the time of this quantization, a rate is controlled such as later-described processing in step S28.

The difference information thus quantized is locally decoded as follows. Specifically, in step S16, the inverse quantization unit 18 subjects the transform coefficient quantized by the quantization unit 112 to inverse quantization using a property corresponding to the property of the quantization unit 112. In step S17, the inverse orthogonal transform unit 19 subjects the transform coefficient subjected to inverse quantization by the inverse quantization unit 18 to inverse orthogonal transform using a property corresponding to the property of the orthogonal transform unit 111.

In step S18, the computing unit 20 adds the prediction image input via the prediction image selecting unit 26 to the locally decoded difference information, and generates a locally decoded image (the image corresponding to the input to the computing unit 13).

In step S19, the deblocking filter 21 subjects the image output from the computing unit 20 to deblocking filtering. Thus, block noise is removed. The decoded image from the deblocking filter 21 is output to the mosquito noise filter 114.

In step S20, the mosquito noise filer 114 subjects the decoded image after deblocking filtering to mosquito noise filtering. The details of this mosquito noise filtering will be described later with reference to FIG. 20 and FIG. 21. The image from the mosquito noise filter 114 is output to the adaptive loop filter 71.

In step S21, the adaptive loop filter 71 performs adaptive loop filtering. Specifically, the adaptive loop filter 71 performs calculation of an adaptive loop filter coefficient so as to minimize residual error between the original image from the screen rearranging buffer 12 and the image from the mosquito noise filter 114.

The adaptive loop filter 71 then uses this adaptive loop filter coefficient to perform filter processing on the decoded image from the mosquito noise filter 114. The decoded image after filter processing is output to the frame memory 22.

At this time, the adaptive loop filter 71 transmits the calculated adaptive loop filter coefficient to the lossless encoding unit 113. Information of the adaptive loop filter coefficient is encoded by the lossless encoding unit 113 in later-described step S26, and added to the header of the compressed image.

In step S22, the frame memory 22 stores the image subjected to filtering. Note that an image not subjected to filter processing by the deblocking filter 21 is also supplied from the computing unit 20 to the frame memory 22 for storing.

In the event that the image to be processed supplied from the screen rearranging buffer 12 is an image of a block to be subjected to intra processing, a decoded image to be referenced is read out from the frame memory 22, and supplied to the intra prediction unit 24 via the switch 23.

Based on these images, in step S23, the intra prediction unit 24 subjects pixels of a block to be processed to intra prediction in all of the intra prediction modes serving as candidates. Note that, as for a decoded pixel to be referenced, a pixel not subjected to deblocking filtering by the deblocking filter 21 is employed.

Figure 18:
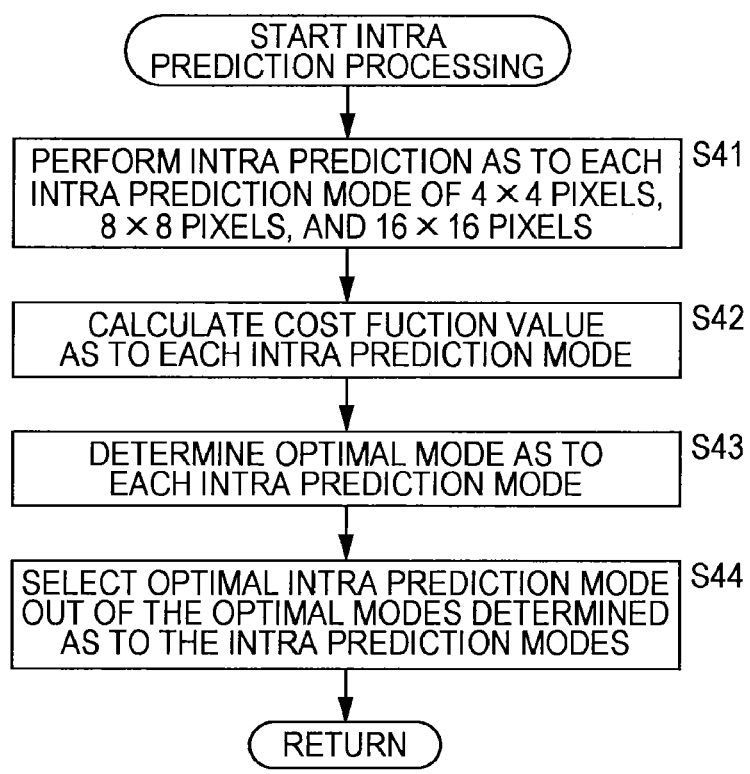
FIG. 18 is a flowchart describing intra prediction processing in step S23 in FIG. 17.

Though the details of the intra prediction processing in step S23 will be described later with reference to FIG. 18, according to this processing, intra prediction is performed in all of the intra prediction modes serving as candidates, and a cost function value is calculated as to all of the intra prediction modes serving as candidates. Based on the calculated cost function values, the optimal intra prediction mode is then selected, the prediction image generated by intra prediction of the optimal intra prediction mode, and the cost function value thereof are supplied to the prediction image selecting unit 26.

In the event that the image to be processed supplied from the screen rearranging buffer 12 is an image to be subjected to inter processing, an image to be referenced is read out from the frame memory 22, and supplied to the motion prediction/compensation unit 25 via the switch 23. Based on these images, in step S24, the motion prediction/compensation unit 25 performs motion prediction/compensation processing.

Figure 19:
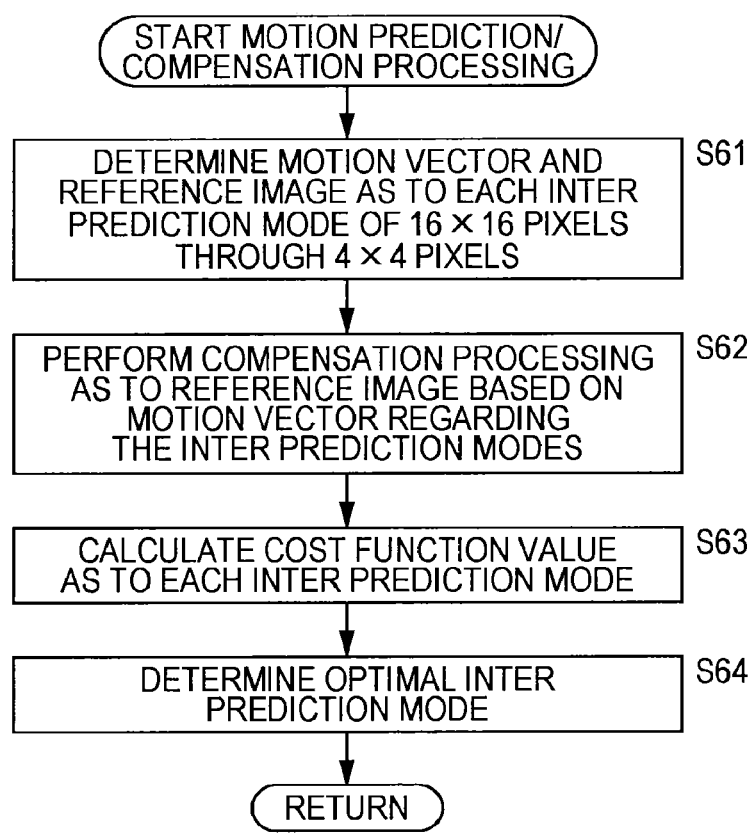
FIG. 19 is a flowchart describing motion prediction/compensation processing in step S24 in FIG. 17.

The details of the motion prediction/compensation processing in step S24 will be described later with reference to FIG. 19. According to this processing, motion prediction processing is performed in all of the inter prediction modes serving as candidates, a cost function value is calculated as to all of the inter prediction modes serving as candidates, and based on the calculated cost function values, the optimal inter prediction mode is determined. The prediction image generated by the optimal inter prediction mode, and the cost function value thereof are then supplied to the prediction image selecting unit 26.

In step S25, the prediction image selecting unit 26 determines one of the optimal intra prediction mode and the optimal inter prediction mode as the optimal prediction mode based on the cost function values output from the intra prediction unit 24 and motion prediction/compensation unit 25. The prediction image selecting unit 26 then selects the prediction image of the determined optimal prediction mode, and supplies to the computing units 13 and 20. This prediction image is used for the above computations in steps S13 and S18.

Note that selection information of this prediction image is supplied to the intra prediction unit 24 or motion prediction/ compensation unit 25. In the event that the prediction image of the optimal intra prediction mode has been selected, the intra prediction unit 24 supplies information indicating the optimal intra prediction mode (i.e., intra prediction mode information) to the lossless encoding unit 16.

In the event that the prediction image of the optimal inter prediction mode has been selected, the motion prediction/ compensation unit 25 outputs information indicating the optimal inter prediction mode, and further according to need, information according to the optimal inter prediction mode to the lossless encoding unit 113. Examples of the information according to the optimal inter prediction mode include motion vector information and reference frame information.

In step S26, the lossless encoding unit 113 encodes the quantized transform coefficient output from the quantization unit 112. Specifically, the difference image is subjected to lossless encoding such as variable length coding, arithmetic coding, or the like, and compressed. At this time, a generation bit of the current macroblock is supplied to the mosquito noise filter 114. Note that, in the event of the CABAC method being employed as a lossless encoding method, a generation bin may be supplied instead of a generation bit.

Also, at this time, the adaptive loop filter coefficient input to the lossless encoding unit 113 in the above step S21, and the intra prediction mode information from the intra prediction unit 24 input to the lossless encoding unit 113 in the above step S25 or the information according to the optimal inter prediction mode from the motion prediction/compensation unit 25, and so forth are also encoded and added to the header information.

For example, the information indicating the inter prediction mode is encoded for each macroblock. The motion vector information and reference frame information are encoded for each block to be processed. The adaptive loop filter coefficient is encoded for each slice.

In step S27, the storage buffer 17 stores the difference image as a compressed image. A compressed image stored in the storage buffer 17 is read out as appropriate, and transmitted to the decoding side via the transmission path.

In step S28, the rate control unit 27 controls a quantization operation rate of the quantization unit 15 based on a compressed image stored in the storage buffer 17 so as not to cause overflow or underflow.

[Description of Intra Prediction Processing]

Next, the intra prediction processing in step S23 in FIG. 17 will be described with reference to the flowchart in FIG. 18. Note that, with the example in FIG. 18, description will be made regarding a case of luminance signals as an example.

In step S41, the intra prediction unit 24 performs intra prediction on the intra prediction modes of 4×4 pixels, 8×8 pixels, and 16×16 pixels.

As for intra prediction modes of luminance signals, there are prediction modes of nine kinds of 4×4 pixel and 8×8 pixel block increments, and four kinds of 16×16 pixel macroblock increments, and as for intra prediction modes of color difference signals, there are prediction modes of four kinds of 8×8 pixel block increments. The intra prediction modes of color difference signals can be set independently of the intra prediction modes of luminance signals. With regard to the intra prediction modes of 4×4 pixels and 8×8 pixels of luminance signals, one intra prediction mode is defined for each block of 4×4 pixel and 8×8 pixel luminance signals. With regard to the intra prediction mode of 16×16 pixels of luminance signals, and the intra prediction modes of color difference signals, one prediction mode is defined as to one macroblock.

Specifically, the intra prediction unit 24 subjects the pixels of a block to be processed to intra prediction with reference to a decoded image read out from the frame memory 22 and supplied via the switch 23. This intra prediction processing is performed in each intra prediction mode, and accordingly, the prediction image in each intra prediction mode is generated. Note that, as for a decoded pixel to be referenced, a pixel not subjected to deblocking filtering by the deblocking filter 21 is employed.

In step S42, the intra prediction unit 24 calculates a cost function value as to each intra prediction mode of 4×4 pixels, 8×8 pixels, and 16×16 pixels. Here, as for a cost function for obtaining a cost function value, the cost function of the Expression (89) or Expression (90) is employed.

In step S43, the intra prediction unit 24 determines the corresponding optimal mode as to each intra prediction mode of 4×4 pixels, 8×8 pixels, and 16×16 pixels. That is to say, as described above, in the cases of the intra 4×4 prediction modes and intra 8×8 prediction modes, there are the nine kinds of prediction modes, and in the cases of the intra 16×16 prediction modes, there are the four kinds of prediction modes. Accordingly, the intra prediction unit 24 determines, based on the cost function values calculated in step S42, out of these, the optimal intra 4×4 prediction mode, optimal intra 8×8 prediction mode, and optimal 16×16 prediction mode.

In step S44, the intra prediction unit 24 selects, out of the optimal modes determined as to the intra prediction modes of 4×4 pixels, 8×8 pixels, and 16×16 pixels, the optimal intra prediction mode based on the cost function values calculated in step S42, i.e., selects, out of the optimal modes determined as to 4×4 pixels, 8×8 pixels, and 16×16 pixels, a mode of which the cost function value is the minimum as the optimal intra prediction mode. The intra prediction unit 24 then supplies the prediction image generated in the optimal intra prediction mode, and the cost function value thereof to the prediction image selecting unit 26.

[Description of Motion Prediction/Compensation Processing]

Next, the motion prediction/compensation processing in step S24 in FIG. 17 will be described with reference to the flowchart in FIG. 19.

In step S61, the motion prediction/compensation unit 25 determines a motion vector and a reference image as to eight kinds of inter prediction modes made up of 16×16 pixels through 4×4 pixels. That is to say, a motion vector and a reference image are each determined regarding the block to be processed of each inter prediction mode.

In step S62, the motion prediction/compensation unit 25 performs motion prediction and compensation processing on a reference image regarding eight kinds of inter prediction modes made up of 16×16 pixels through 4×4 pixels based on the motion vectors determined in step S61. According to this motion prediction and compensation processing, the prediction image in each inter prediction mode is generated.

In step S63, the motion prediction/compensation unit 25 calculates the cost function value indicated in the above Expression (89) or Expression (90) as to the eight kinds of inter prediction modes made up of 16×16 pixels through 4×4 pixels.

In step S64, the motion prediction/compensation unit 25 compares the cost function values as to the inter prediction modes calculated in step S63, and determines a prediction mode that provides the minimum value as the optimal inter prediction mode. The motion prediction/compensation unit 25 then supplies the prediction image generated in the optimal inter prediction mode and the cost function value thereof to the prediction image selecting unit 26.

[Description of Mosquito Noise Filter Processing]

Figure 20:
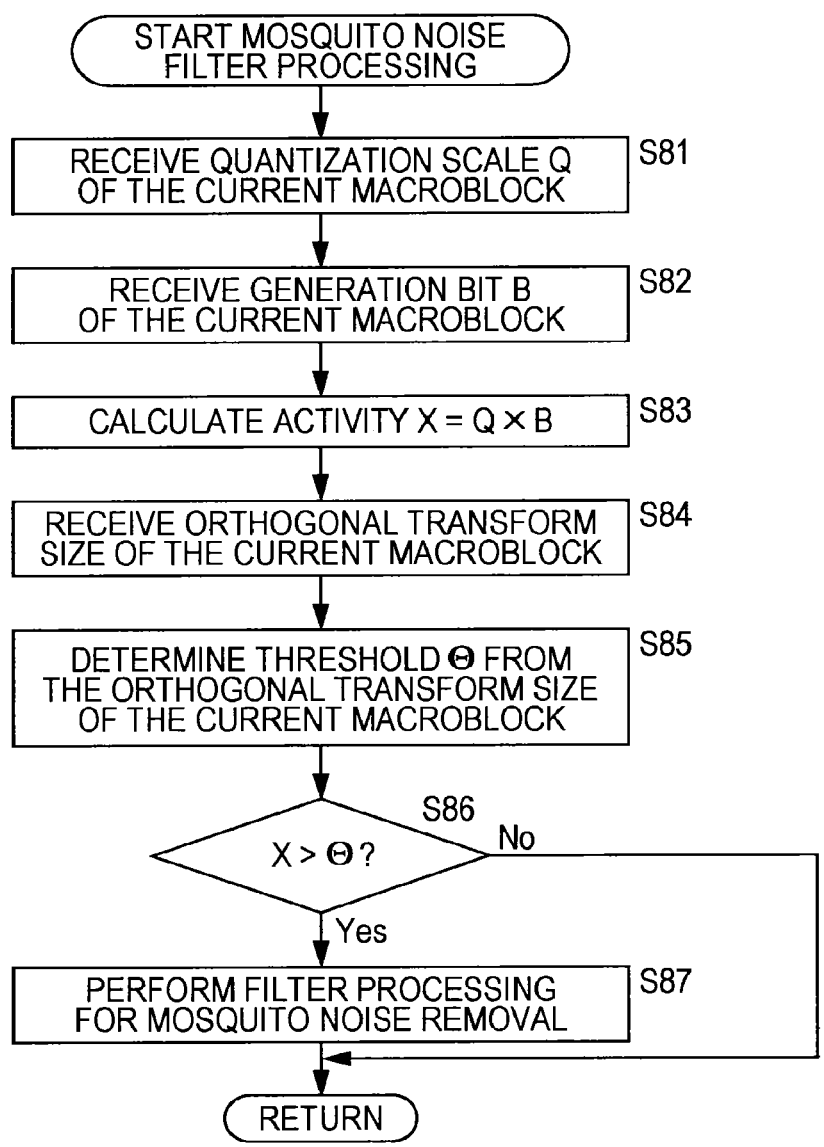
FIG. 20 is a flowchart describing an example of mosquito noise filter processing in step S20 in FIG. 17.

Next, the mosquito noise filter processing in step S20 in FIG. 12 will be described with reference to the flowchart in FIG. 20. Note that the mosquito noise filter processing in FIG. 20 is processing to be performed by the mosquito noise filter 114 in FIG. 15.

Information of the quantization value regarding the current macroblock is supplied from the quantization unit 112 to the Complexity calculating unit 152. Information relating to the generated code amount (generation bit) of the current macroblock is supplied from the lossless encoding unit 113 to the Complexity calculating unit 152.

In step S81, the Complexity calculating unit 152 receives a quantization scale Q as information of the quantization value regarding the current macroblock, and in step S82 receives a generation bit B as information regarding the generated code amount of the current macroblock. In step S83, the Complexity calculating unit 152 calculates activity serving as Complexity as to the current macroblock using the above Expression (91). The value of the calculated Complexity is supplied to the filter control unit 153.

Information relating to the orthogonal transform size of the current macroblock is supplied from the orthogonal transform unit 111 to the threshold determining unit 151. In step S84, the threshold determining unit 151 receives the orthogonal transform size of the current macroblock, and in step S85 determines a threshold $\Theta=\Theta(T)+\Theta_{offset}$ for the filter processing for removing mosquito noise, from the orthogonal transform size of the current macroblock. Information of the determined threshold $\Theta$ is supplied to the filter control unit 153.

In step S86, the filter control unit 153 determines whether or not the activity X from the Complexity calculating unit 152 is greater than the threshold $\Theta$ from the threshold determining unit 151. In step S86, in the event that the activity X is greater than the threshold $\Theta$, the processing proceeds to step S87.

In step S87, the filter processing unit 154 performs, based on the control information from the filter control unit 153, the filter processing for mosquito noise removal on the pixel values after the deblocking filter processing, for example, using the filter coefficient of the Expression (96), and outputs the pixel values after the filter processing to the adaptive loop filter 71.

On the other hand, in the event that determination is made in step S86 that the activity X is smaller than the threshold $\Theta$, step S87 is skipped. That is to say, the filter processing unit 154 does not perform the filter processing on the pixel values after the deblocking filter processing based on the control information from the filter control unit 153, and outputs to the adaptive loop filter 71 without change.

Figure 21:
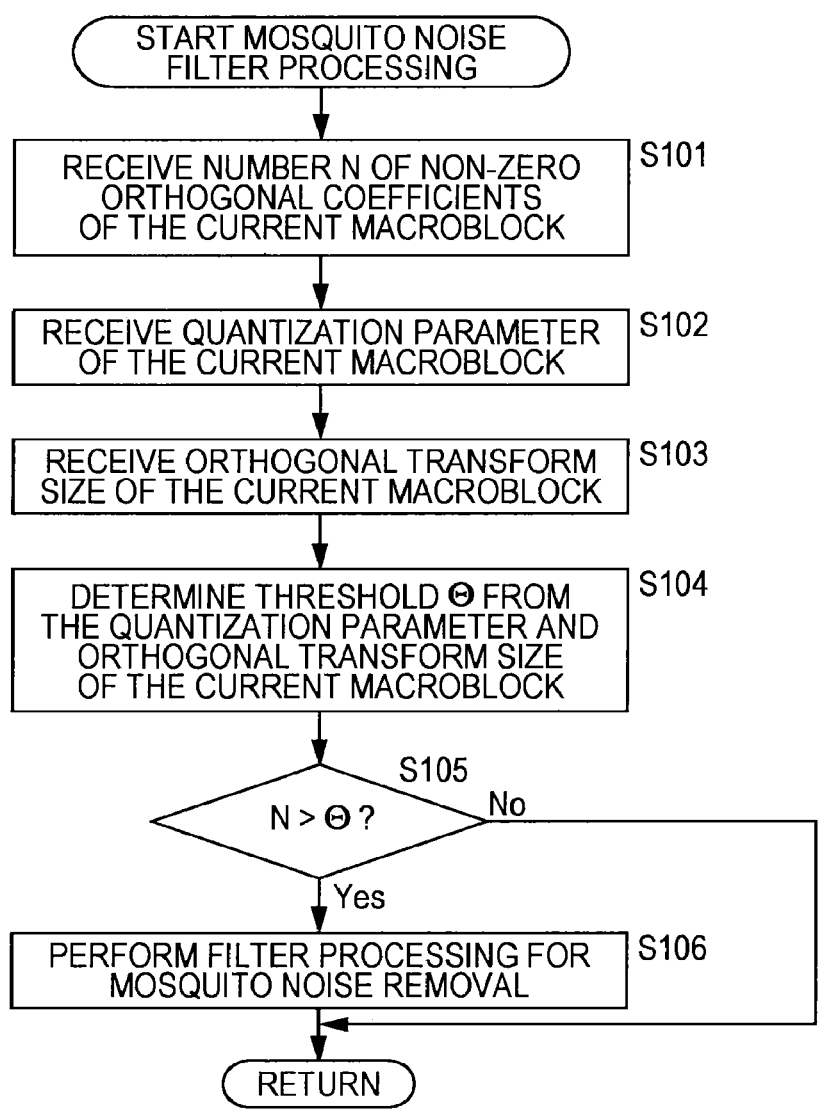
FIG. 21 is a flowchart describing another example of mosquito noise filter processing in step S20 in FIG. 17.

Further, another example of the mosquito noise filter processing in step S20 in FIG. 12 will be described with reference to the flowchart in FIG. 21. Note that the mosquito noise filter processing in FIG. 21 is processing to be performed by the mosquito noise filter 114 in FIG. 16.

Information of the number of orthogonal transform coefficients (non-zero coefficients) after quantization relating to the current macroblock is supplied from the quantization unit 112 to the non-zero coefficient number buffer 162. In step S101, the non-zero coefficient number buffer 162 receives a number N of non-zero orthogonal transform coefficients as the information of the number of orthogonal transform coefficients (non-zero coefficients) after quantization regarding the current macroblock, and stores this. The stored information of the number of non-zero coefficients number is supplied to the filter control unit 163.

The information regarding the orthogonal transform size of the current macroblock from the orthogonal transform unit 111, and the information of the quantization value regarding the current macroblock from the quantization unit 112 are supplied to the threshold determining unit 161.

In step S102, the threshold determining unit 161 receives a quantization parameter as the information of the quantization value regarding the current macroblock, and in step S103 receives the orthogonal transform size of the current macroblock as the information regarding the orthogonal transform size of the current macroblock. In step S104, the threshold determining unit 161 determines a threshold $\Theta = \Theta$ (QP, T)$+\Theta_{offset}$ for the filter processing for removing mosquito noise from the quantization parameter and orthogonal transform size of the current macroblock. Information of the determined threshold $\Theta$ is supplied to the filter control unit 163.

In step S105, the filter control unit 163 determines whether or not the number N of non-zero orthogonal transform coefficients from the non-zero coefficient number buffer 162 is greater than the threshold $\Theta$ from the threshold determining unit 161. In the event that determination is made in step S105 that the number N of non-zero orthogonal transform coefficients is greater than the threshold $\Theta$, the processing proceeds to step S106.

In step S106, the filter processing unit 164 subjects the pixel values after the deblocking filter processing to the filter processing for mosquito noise removal, for example, using the filter coefficient in the Expression (96), based on the control information from the filter control unit 163, and outputs the pixel values after the filter processing to the adaptive loop filter 71.

On the other hand, in the event that determination is made in step S105 that the number N of non-zero orthogonal transform coefficients is smaller than the threshold $\Theta$, step S106 is skipped. Specifically, based on the control information from the filter control unit 163, the filter processing unit 164 does not subject the pixel values after the deblocking filter processing to the filter processing, and outputs the pixel values after the deblocking filter processing to the adaptive loop filter 71 without change.

The encoded compressed image is transmitted via a predetermined transmission path, and decoded by an image decoding device.

[Configuration Example of Image Decoding Device]

Figure 22:
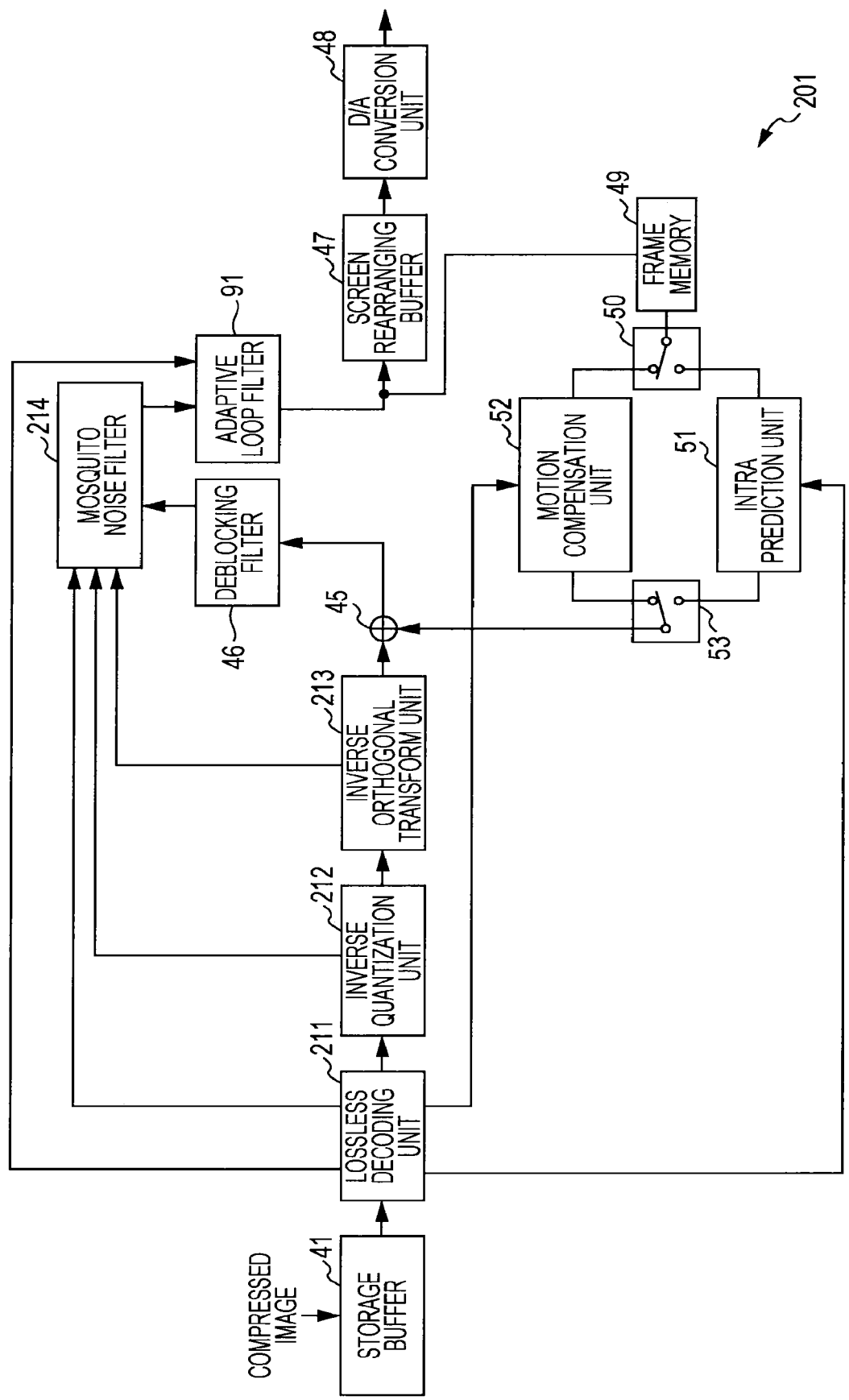
FIG. 22 is a block diagram illustrating the configuration of an embodiment of an image decoding device to which the present invention has been applied.

FIG. 22 represents the configuration of an embodiment of an image decoding device serving as the image processing device to which the present invention has been applied.

Figure 2:
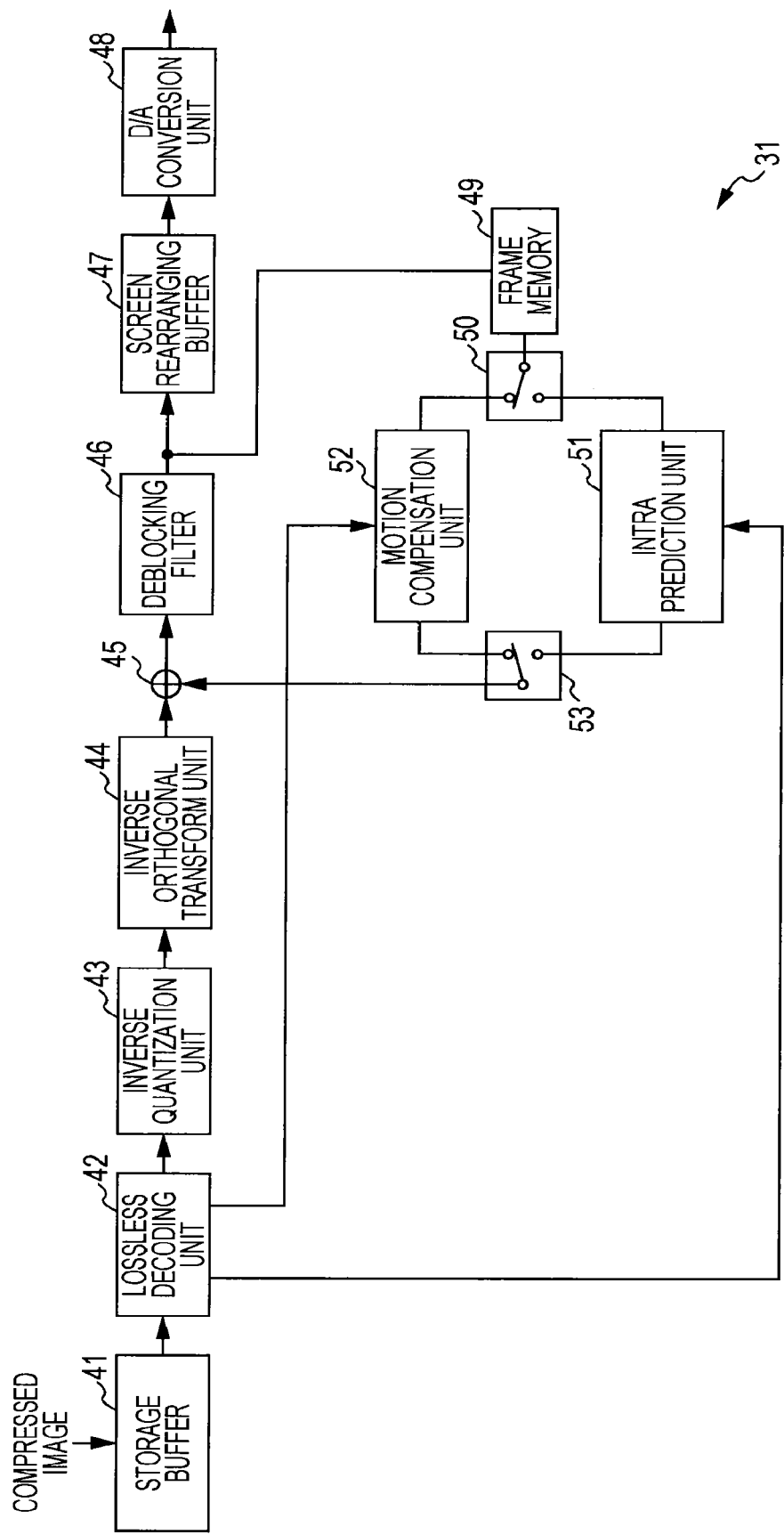
FIG. 2 is a block diagram illustrating a configuration example of an image decoding device employing the H.264/AVC format.

An image decoding device 201 in FIG. 22 is the same as the image decoding device 31 in FIG. 2 in that there are the storage buffer 41, computing unit 45, deblocking filter 46, screen rearranging buffer 47, D/A conversion unit 48, frame memory 49, switch 50, intra prediction unit 51, motion compensation unit 52, and switch 53.

Figure 4:
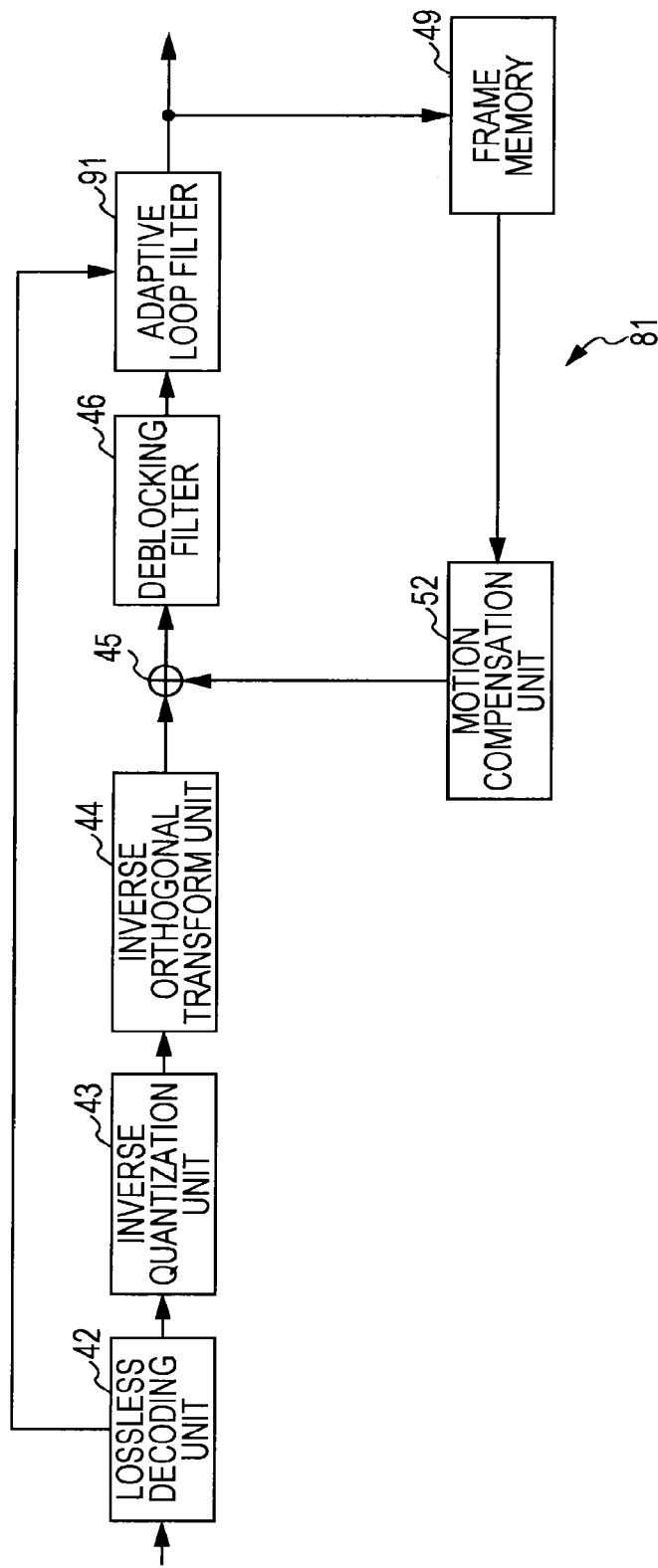
FIG. 4 is a block diagram illustrating a configuration example of a image decoding device to which an adaptive loop filter has been applied.

Also, the image decoding device 201 in FIG. 22 differs from the image decoding device 31 in FIG. 2 in that the lossless decoding unit 42, inverse quantization unit 43, and inverse orthogonal transform unit 44 are replaced with a lossless decoding unit 211, an inverse quantization unit 212, and an inverse orthogonal transform unit 213 respectively, and in that the adaptive loop filter 91 in FIG. 4, and a mosquito noise filter 214 are added.

Specifically, the lossless decoding unit 211 decodes, in the same way as with the lossless decoding unit 42 in FIG. 2, information supplied from the storage buffer 41 and encoded by the lossless encoding unit 113 in FIG. 5 using a format corresponding to the encoding format of the lossless encoding unit 113. At this time, though motion vector information, reference frame information, prediction mode information (information indicating an intra prediction mode or inter prediction mode), an adaptive loop filter coefficient, and so forth are also decoded, the lossless decoding unit 211 supplies information relating to the generated code amount of each block to the mosquito noise filter 114 in contrast to the lossless decoding unit 42 in FIG. 2.

The inverse quantization unit 212 subjects, in the same way as with the inverse quantization unit 43 in FIG. 2, the image decoded by the lossless decoding unit 211 to inverse quantization using a format corresponding to the quantization format of the quantization unit 112 in FIG. 5. Also, the inverse quantization unit 212 supplies quantization value relating to each macroblock to the mosquito noise filter 214, unlike the inverse quantization unit 43 in FIG. 2.

In the same way as with the inverse orthogonal transform unit 44 in FIG. 2, the inverse orthogonal transform unit 213 subjects the output of the inverse quantization unit 212 to inverse orthogonal transform using a format corresponding to the orthogonal transform format of the orthogonal transform unit 111 in FIG. 5. Also, the inverse orthogonal transform unit 213 supplies, unlike the orthogonal transform unit 44 in FIG. 2, information regarding which of 4×4 orthogonal transform, and 8×8 orthogonal transform has been applied to each macroblock (orthogonal transform size) to the mosquito noise filter 214.

The mosquito noise filter 214 is provided after the deblocking filter 46 before the adaptive loop filter 91. Specifically, the mosquito noise filter 214 is provided within a motion compensation loop made up of the computing unit 45, deblocking filter 46, adaptive loop filter 91, frame memory 49, switch 50, motion compensation unit 52, and switch 53. That is to say, an image is used within the motion compensation loop in a loop manner.

The mosquito noise filter 214 uses information from the lossless decoding unit 211, inverse quantization unit 212, and inverse orthogonal transform unit 213 to determine whether to perform the filter processing for mosquito noise removal.

In the event of performing the filter processing, the mosquito noise filter 214 subjects a decoded image after the deblocking filter 46 to the filter processing for mosquito noise removal, and outputs the image subjected to the filter processing to the adaptive loop filter 91. In the event of performing no filter processing, the mosquito noise filter 214 outputs the decoded image after the deblocking filter 46 to the adaptive loop filter 91 without change.

Note that the configuration example of the mosquito noise filter 214 is the same as the configuration of the mosquito noise filter 114 of the image encoding device 101 described above with reference to FIG. 15 or FIG. 16 only except that the input destination of information, and the input/output destination of an image differ, and accordingly, description thereof will be omitted.

[Description of Decoding Processing of Image Decoding Device]

Figure 23:
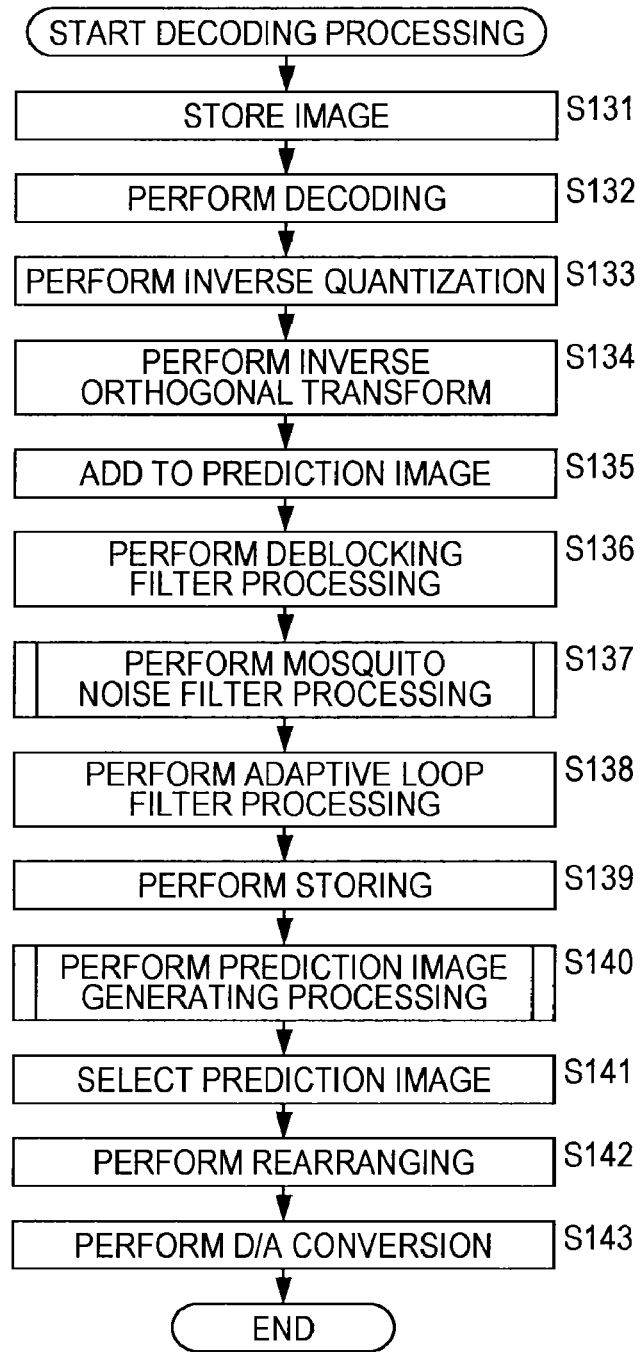
FIG. 23 is a flowchart describing decoding processing of the image decoding device in FIG. 22.

Next, decoding processing that the image decoding device 201 executes will be described with reference to the flowchart in FIG. 23.

In step S131, the storage buffer 41 stores a transmitted image. In step S132, the lossless decoding unit 211 decodes the compressed image supplied from the storage buffer 41. That is to say, the I picture, P picture, and B picture encoded by the lossless encoding unit 113 in FIG. 5 are decoded.

At this time, the motion vector information, reference frame information, prediction mode information (information indicating an intra prediction mode or inter prediction mode), an adaptive loop filter coefficient, and so forth are also decoded.

Specifically, in the event that the prediction mode information is the intra prediction mode information, the prediction mode information is supplied to the intra prediction unit 51. In the event that the prediction mode information is the inter prediction mode information, the motion vector information and reference frame information corresponding to the prediction mode information are supplied to the motion compensation unit 52. An adaptive loop filter coefficient is decoded for each slice, and supplied to the adaptive loop filter 91.

Also, at this time, the lossless decoding unit 211 supplies information relating to the generated code amount of each macroblock to the mosquito noise filter 214. This information is used for mosquito noise filter processing in later-described step S137.

In step S133, the inverse quantization unit 212 subjects the transform coefficient decoded by the lossless decoding unit 211 to inverse quantization with a property corresponding to the property of the quantization unit 112 in FIG. 5. At this time, the inverse quantization unit 212 supplies information of a quantization value regarding a macroblock to the mosquito noise filter 214. This information is used for the mosquito noise filter processing in later-described step S137.

In step S134, the inverse orthogonal transform unit 213 subjects the transform coefficient subjected to inverse quantization by the inverse quantization unit 212 to inverse orthogonal transform with a property corresponding to the property of the orthogonal transform unit 111 in FIG. 5. Thus, difference information corresponding to the input of the orthogonal transform unit 111 in FIG. 5 (output of the computing unit 13) is decoded. Note that, at this time, the inverse orthogonal transform unit 213 supplies information regarding the orthogonal transform size of the current macroblock to the mosquito noise filter 214. This information is used for the mosquito noise filter processing in later-described step S137.

In step S135, the computing unit 45 adds a prediction image to be selected at processing in later-described step S141, and to be input via the switch 53 to the difference information. Thus, the original image is decoded. In step S136, the deblocking filter 46 subjects the image output from the computing unit 45 to deblocking filter processing. Thus, block noise is removed.

In step S137, the mosquito noise filter 214 subjects the decoded image after the deblocking filter to mosquito noise filter processing using the information supplied in the above step S132, step S133, and step S134. The details of this mosquito noise filter processing is the same as the mosquito noise filter processing of the above image encoding device 101 described above with reference to FIG. 20 and FIG. 21, and accordingly, description thereof will be omitted. The image from the mosquito noise filter 214 is output to the adaptive loop filter 91.

In step S138, the adaptive loop filter 91 performs adaptive loop filter processing. Specifically, the adaptive loop filter coefficient is supplied from the lossless decoding unit 211 (i.e., image encoding device 101) to the adaptive loop filter 91 for each slice in the above step S132. The adaptive loop filter 91 uses the adaptive loop filter coefficient thereof to subject the decoded image from the mosquito noise filter 114 to the filter processing. The decoded image after the filter processing is output to the frame memory 49 and screen rearranging buffer 47.

In step S139, the frame memory 49 stores the image subjected to filtering.

In step S140, the intra prediction unit 51 or motion compensation unit 52 performs prediction image generation processing in response to the prediction mode information supplied from the lossless decoding unit 211.

Specifically, in the event that the intra prediction mode information has been supplied from the lossless decoding unit 211, the intra prediction unit 51 performs intra prediction processing of an intra prediction mode to generate an intra prediction image. In the event that the inter prediction mode information has been supplied from the lossless decoding unit 211, the motion compensation unit 52 performs motion prediction/compensation processing of an inter prediction mode to generate an inter prediction image.

Figure 24:
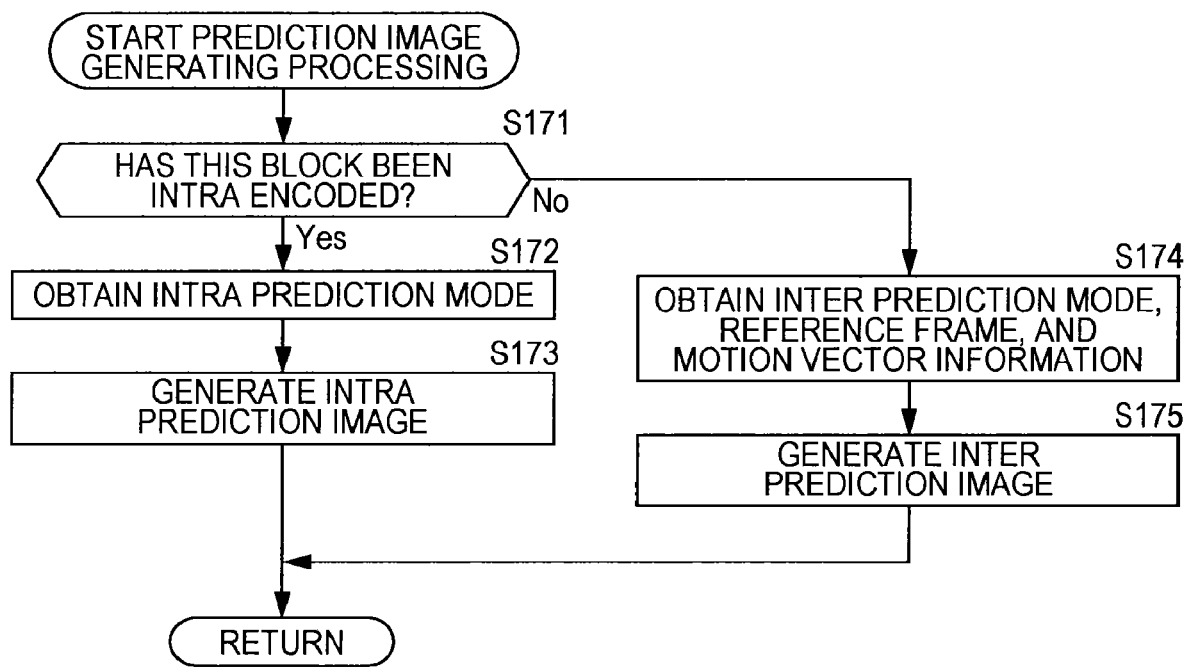
FIG. 24 is a flowchart describing the prediction processing in step S140 in FIG. 23.

Though the details of the prediction processing in step S140 will be described later with reference to FIG. 24, according to this processing, the prediction image generated by the intra prediction unit 51 (intra prediction image) or the prediction image generated by the motion compensation unit 52 (inter prediction image) is supplied to the switch 53.

In step S141, the switch 53 selects a prediction image. That is to say, the prediction image generated by the intra prediction unit 51, or the prediction image generated by the motion compensation unit 52 is supplied. Accordingly, the supplied prediction image is selected and supplied to the computing unit 45, and as described above, in step S135 added to the output of the inverse orthogonal transform unit 213.

In step S142, the screen rearranging buffer 47 performs rearranging of an image after the adaptive loop filter 91. That is to say, the order of frames rearranged for encoding by the screen rearranging buffer 12 of the image encoding device 101 is rearranged in the original display order.

In step S143, the D/A conversion unit 48 converts the image from the screen rearranging buffer 47 from digital to analog. This image is output to an unshown display, and the image is displayed thereon.

[Description of Prediction Processing of Image Decoding Device]

Next, the prediction processing in step S140 in FIG. 23 will be described with reference to the flowchart in FIG. 24.

The intra prediction unit 51 determines in step S171 whether or not a block to be processed has been subjected to intra encoding. Upon the intra prediction mode information being supplied from the lossless decoding unit 211 to the intra prediction unit 51, the intra prediction unit 51 determines in step S171 that the block to be processed has been subjected to intra encoding, and the processing proceeds to step S172, In step S172, the intra prediction unit 51 obtains the intra prediction mode information, and in step S173 performs intra prediction to generate an inter prediction image.

Specifically, in the event that the image to be processed is an image to be subjected to intra processing, a necessary image is read out from the frame memory 49, and supplied to the intra prediction unit 51 via the switch 50. In step S173, the intra prediction unit 51 performs intra prediction in accordance with the intra prediction mode information obtained in step S172 to generate a prediction image. The generated prediction image is output to the switch 53.

On the other hand, in the event that determination is made in step S171 that intra prediction has not been performed, the processing proceeds to step S174.

In the event that the image to be processed is an image to be subjected to inter prediction, the inter prediction mode information, reference frame information, and motion vector information are supplied from the lossless decoding unit 211 to the motion compensation unit 52.

In step S174, the motion compensation unit 52 obtains the prediction mode information and so forth from the lossless decoding unit 211. Specifically, the motion (inter) prediction mode information, reference frame information, and motion vector information are obtained.

In step S175, the motion compensation unit 52 subjects the reference image from the frame memory 49 to compensation using the motion vector information to generate an inter prediction image. The generated prediction image is supplied to the computing unit 45 via the switch 53, and in step S135 in FIG. 23 added to the output of the inverse orthogonal transform unit 213.

As described above, with the image encoding device 101 and image decoding device 201, the filter processing for mosquito noise removal is performed according to encoding information such as an orthogonal transform coefficient, an orthogonal transform size, a quantization value, a code amount, and so forth as to each macroblock.

Now, mosquito noise is local noise similar to block noise, but removal thereof is difficult at the deblocking filter 21 unlike block noise.

Accordingly, the filter processing for mosquito noise removal is performed according to encoding information a macroblock, and accordingly, the image quality of a decoded image improves. Further, the filter processing for mosquito noise is performed within the motion compensation loop, and accordingly, the image quality of an image to be referenced from now on also improves with motion compensation. As a result thereof, encoding efficiency is improved.

Also, as for control of mosquito noise, encoding information originally calculated for being transmitted to the decoding side is employed, and accordingly, there is no need to perform control by calculating new information.

Note that, with the above description, though an example with orthogonal transform sizes of 4×4 pixels and 8×8 pixels has been described, the orthogonal transform size is not restricted to these sizes. The present invention is also applied to a further greater orthogonal transform size.

With the above description, though the H.264/AVC format is employed as an encoding format, the present invention is not restricted to this, other encoding format/decoding format based on orthogonal transform and motion compensation may be applied.

Note that the present invention may be applied to an image encoding device and an image decoding device used at the time of receiving image information (bit streams) compressed by orthogonal transform such as discrete cosine transform or the like and motion compensation via a network medium such as satellite broadcasting, a cable television, the Internet, a cellular phone, or the like, for example, as with MPEG, H.26x, or the like. Also, the present invention may be applied to an image encoding device and an image decoding device used at the time of processing image information on storage media such as an optical disc, a magnetic disk, and flash memory. Further, the present invention may be applied to a motion prediction compensation device included in such an image encoding device and an image decoding device and so forth.

The above-mentioned series of processing may be executed by hardware, or may be executed by software. In the event of executing the series of processing by software, a program making up the software thereof is installed in a computer. Here, examples of the computer include a computer built into dedicated hardware, and a general-purpose personal computer whereby various functions can be executed by various types of programs being installed thereto.

[Configuration Example of Personal Computer]

Figure 25:
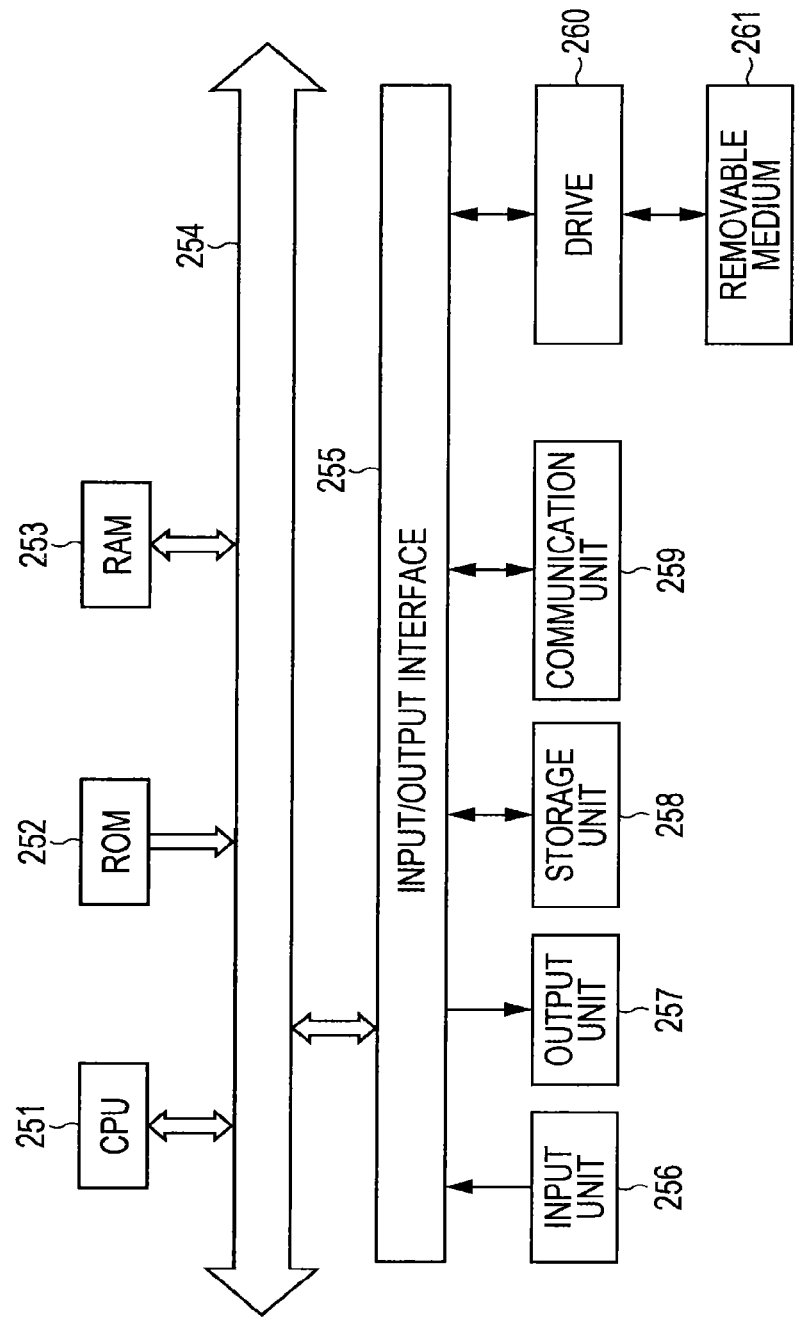
FIG. 25 is a block diagram illustrating a configuration example of the hardware of a computer.

FIG. 25 is a block diagram illustrating a configuration example of the hardware of a computer which executes the above-mentioned series of processing using a program.

With the computer, a CPU (Central Processing Unit) 251, ROM (Read Only Memory) 252, and RAM (Random Access Memory) 253 are mutually connected by a bus 254.

Further, an input/output interface 255 is connected to the bus 254. An input unit 256, an output unit 257, a storage unit 258, a communication unit 259, and a drive 260 are connected to the input/output interface 255.

The input unit 256 is made up of a keyboard, a mouse, a microphone, and so forth. The output unit 257 is made up of a display, a speaker, and so forth. The storage unit 258 is made up of a hard disk, nonvolatile memory, and so forth. The communication unit 259 is made up of a network interface and so forth. The drive 260 drives a removable medium 261 such as a magnetic disk, an optical disc, a magneto-optical disk, semiconductor memory, or the like.

With the computer thus configured, for example, the CPU 251 loads a program stored in the storage unit 258 to the RAM 253 via the input/output interface 255 and bus 254, and executes the program, and accordingly, the above-mentioned series of processing is performed.

The program that the computer (CPU 251) executes may be provided by being recorded in the removable medium 261 serving as a package medium or the like, for example. Also, the program may be provided via a cable or wireless transmission medium such as a local area network, the Internet, or digital broadcasting.

With the computer, the program may be installed in the storage unit 258 via the input/output interface 255 by mounting the removable medium 261 on the drive 260. Also, the program may be received by the communication unit 259 via a cable or wireless transmission medium, and installed in the storage unit 258. Additionally, the program may be installed in the ROM 252 or storage unit 258 beforehand.

Note that the program that the computer executes may be a program wherein the processing is performed in the time sequence along the sequence described in the present Specification, or may be a program wherein the processing is performed in parallel or at necessary timing such as when call-up is performed.

The embodiments of the present invention are not restricted to the above-mentioned embodiment, and various modifications may be made without departing from the essence of the present invention.

For example, the above image encoding device 101 and image decoding device 201 may be applied to an optional electric device. Hereafter, examples thereof will be described.

[Configuration Example of Television Receiver]

Figure 26:
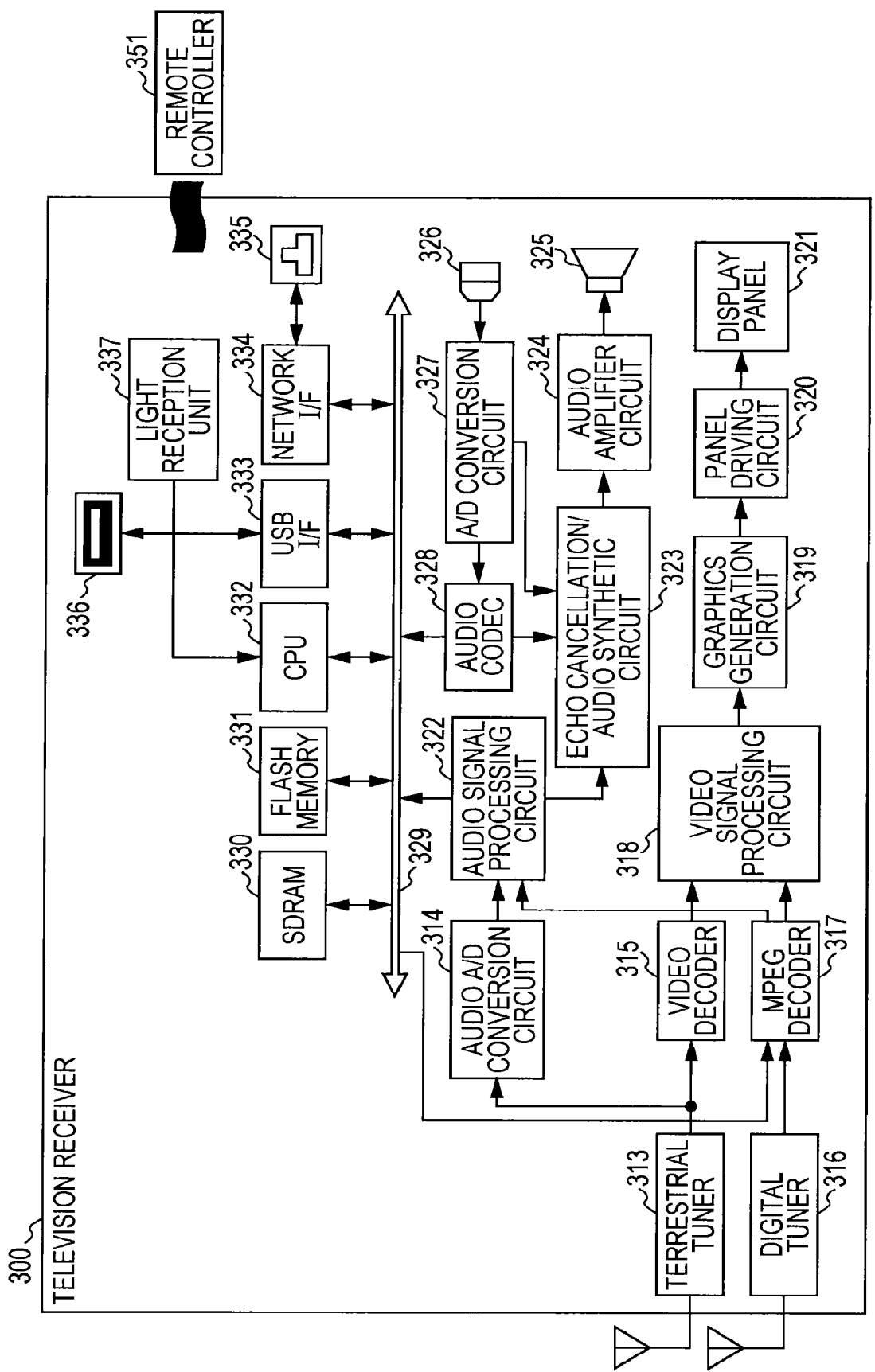
FIG. 26 is a block diagram illustrating a principal configuration example of a television receiver to which the present invention has been applied.

FIG. 26 is a block diagram illustrating a principal configuration example of a television receiver using an image decoding device to which the present invention has been applied.

A television receiver 300 shown in FIG. 26 includes a terrestrial tuner 313, a video decoder 315, a video signal processing circuit 318, a graphics generating circuit 319, a panel driving circuit 320, and a display panel 321.

The terrestrial tuner 313 receives the broadcast wave signals of a terrestrial analog broadcast via an antenna, demodulates, obtains video signals, and supplies these to the video decoder 315. The video decoder 315 subjects the video signals supplied from the terrestrial tuner 313 to decoding processing, and supplies the obtained digital component signals to the video signal processing circuit 318.

The video signal processing circuit 318 subjects the video data supplied from the video decoder 315 to predetermined processing such as noise removal or the like, and supplies the obtained video data to the graphics generating circuit 319.

The graphics generating circuit 319 generates the video data of a program to be displayed on a display panel 321, or image data due to processing based on an application to be supplied via a network, or the like, and supplies the generated video data or image data to the panel driving circuit 320. Also, the graphics generating circuit 319 also performs processing such as supplying video data obtained by generating video data (graphics) for the user displaying a screen used for selection of an item or the like, and superimposing this on the video data of a program, to the panel driving circuit 320 as appropriate.

The panel driving circuit 320 drives the display panel 321 based on the data supplied from the graphics generating circuit 319 to display the video of a program, or the above-mentioned various screens on the display panel 321.

The display panel 321 is made up of an LCD (Liquid Crystal Display) and so forth, and displays the video of a program or the like in accordance with the control by the panel driving circuit 320.

Also, the television receiver 300 also includes an audio A/D (Analog/Digital) conversion circuit 314, an audio signal processing circuit 322, an echo cancellation/audio synthesizing circuit 323, an audio amplifier circuit 324, and a speaker 325.

The terrestrial tuner 313 demodulates the received broadcast wave signal, thereby obtaining not only a video signal but also an audio signal. The terrestrial tuner 313 supplies the obtained audio signal to the audio A/D conversion circuit 314.

The audio A/D conversion circuit 314 subjects the audio signal supplied from the terrestrial tuner 313 to A/D conversion processing, and supplies the obtained digital audio signal to the audio signal processing circuit 322.

The audio signal processing circuit 322 subjects the audio data supplied from the audio A/D conversion circuit 314 to predetermined processing such as noise removal or the like, and supplies the obtained audio data to the echo cancellation/audio synthesizing circuit 323.

The echo cancellation/audio synthesizing circuit 323 supplies the audio data supplied from the audio signal processing circuit 322 to the audio amplifier circuit 324.

The audio amplifier circuit 324 subjects the audio data supplied from the echo cancellation/audio synthesizing circuit 323 to D/A conversion processing, subjects to amplifier processing to adjust to predetermined volume, and then outputs the audio from the speaker 325.

Further, the television receiver 300 also includes a digital tuner 316, and an MPEG decoder 317.

The digital tuner 316 receives the broadcast wave signals of a digital broadcast (terrestrial digital broadcast, BS (Broadcasting Satellite)/CS (Communications Satellite) digital broadcast) via the antenna, demodulates to obtain MPEG-TS (Moving Picture Experts Group-Transport Stream), and supplies this to the MPEG decoder 317.

The MPEG decoder 317 descrambles the scrambling given to the MPEG-TS supplied from the digital tuner 316, and extracts a stream including the data of a program serving as a playing object (viewing object). The MPEG decoder 317 decodes an audio packet making up the extracted stream, supplies the obtained audio data to the audio signal processing circuit 322, and also decodes a video packet making up the stream, and supplies the obtained video data to the video signal processing circuit 318. Also, the MPEG decoder 317 supplies EPG (Electronic Program Guide) data extracted from the MPEG-TS to a CPU 332 via an unshown path.

The television receiver 300 uses the above-mentioned image decoding device 201 as the MPEG decoder 317 for decoding video packets in this way. Accordingly, the MPEG decoder 317 can improve, in the same way as with the case of the image decoding device 201, the image quality of decoded images, and further improve the image quality of images to be referenced from now on with motion compensation. As a result thereof, encoding efficiency is improved.

The video data supplied from the MPEG decoder 317 is, in the same way as with the case of the video data supplied from the video decoder 315, subjected to predetermined processing at the video signal processing circuit 318. The video data subjected to predetermined processing is then superimposed on the generated video data and so forth at the graphics generating circuit 319 as appropriate, supplied to the display panel 321 via the panel driving circuit 320, and the image thereof is displayed thereon.

The audio data supplied from the MPEG decoder 317 is, in the same way as with the case of the audio data supplied from the audio A/D conversion circuit 314, subjected to predetermined processing at the audio signal processing circuit 322, supplied to the audio amplifier circuit 324 via the echo cancellation/audio synthesizing circuit 323, and subjected to D/A conversion processing and amplifier processing. As a result thereof, the audio adjusted in predetermined volume is output from the speaker 325.

Also, the television receiver 300 also includes a microphone 326, and an A/D conversion circuit 327.

The A/D conversion circuit 327 receives the user's audio signals collected by the microphone 326 provided to the television receiver 300 serving as for audio conversation, subjects the received audio signal to A/D conversion processing, and supplies the obtained digital audio data to the echo cancellation/audio synthesizing circuit 323.

In the event that the user (user A)'s audio data of the television receiver 300 has been supplied from the A/D conversion circuit 327, the echo cancellation/audio synthesizing circuit 323 performs echo cancellation with the user (user A)'s audio data taken as a object, and outputs audio data obtained by synthesizing with other audio data, or the like from the speaker 325 via the audio amplifier circuit 324.

Further, the television receiver 300 also includes an audio codec 328, an internal bus 329, SDRAM (Synchronous Dynamic Random Access Memory) 330, flash memory 331, a CPU 332, a USB (Universal Serial Bus) I/F 333, and a network I/F 334.

The A/D conversion circuit 327 receives the user's audio signal collected by the microphone 326 provided to the television receiver 300 serving as for audio conversation, subjects the received audio signal to A/D conversion processing, and supplies the obtained digital audio data to the audio codec 328.

The audio codec 328 converts the audio data supplied from the A/D conversion circuit 327 into the data of a predetermined format for transmission via a network, and supplies to the network I/F 334 via the internal bus 329.

The network I/F 334 is connected to the network via a cable mounted on a network terminal 335. The network I/F 334 transmits the audio data supplied from the audio codec 328 to another device connected to the network thereof, for example. Also, the network I/F 334 receives, via the network terminal 335, the audio data transmitted from another device connected thereto via the network, and supplies this to the audio codec 328 via the internal bus 329, for example.

The audio codec 328 converts the audio data supplied from the network I/F 334 into the data of a predetermined format, and supplies this to the echo cancellation/audio synthesizing circuit 323.

The echo cancellation/audio synthesizing circuit 323 performs echo cancellation with the audio data supplied from the audio codec 328 taken as a object, and outputs the data of audio obtained by synthesizing the audio data and other audio data, or the like, from the speaker 325 via the audio amplifier circuit 324.

The SDRAM 330 stores various types of data necessary for the CPU 332 performing processing.

The flash memory 331 stores a program to be executed by the CPU 332. The program stored in the flash memory 331 is read out by the CPU 332 at predetermined timing such as when activating the television receiver 300, or the like. EPG data obtained via a digital broadcast, data obtained from a predetermined server via the network, and so forth are also stored in the flash memory 331.

For example, MPEG-TS including the content data obtained from a predetermined server via the network by the control of the CPU 332 is stored in the flash memory 331. The flash memory 331 supplies the MPEG-TS thereof to the MPEG decoder 317 via the internal bus 329 by the control of the CPU 332, for example.

The MPEG decoder 317 processes the MPEG-TS thereof in the same way as with the case of the MPEG-TS supplied from the digital tuner 316. In this way, the television receiver 300 receives the content data made up of video, audio, and so forth via the network, decodes using the MPEG decoder 317, whereby video thereof can be displayed, and audio thereof can be output.

Also, the television receiver 300 also includes a light reception unit 337 for receiving the infrared signal transmitted from a remote controller 351.

The light reception unit 337 receives infrared rays from the remote controller 351, and outputs a control code representing the content of the user's operation obtained by demodulation, to the CPU 332.

The CPU 332 executes the program stored in the flash memory 331 to control the entire operation of the television receiver 300 according to the control code supplied from the light reception unit 337, and so forth. The CPU 332, and the units of the television receiver 300 are connected via an unshown path.

The USB I/F 333 performs transmission/reception of data as to an external device of the television receiver 300 which is connected via a USB cable mounted on a USB terminal 336. The network I/F 334 connects to the network via a cable mounted on the network terminal 335, also performs transmission/reception of data other than audio data as to various devices connected to the network.

The television receiver 300 can improve encoding efficiency by using the image decoding device 201 as the MPEG decoder 317. As a result thereof, the television receiver 300 can obtain and display higher image quality decoded images from broadcast signals received via an antenna or content data obtained via a network.

[Configuration Example of Cellular Telephone]

Figure 27:
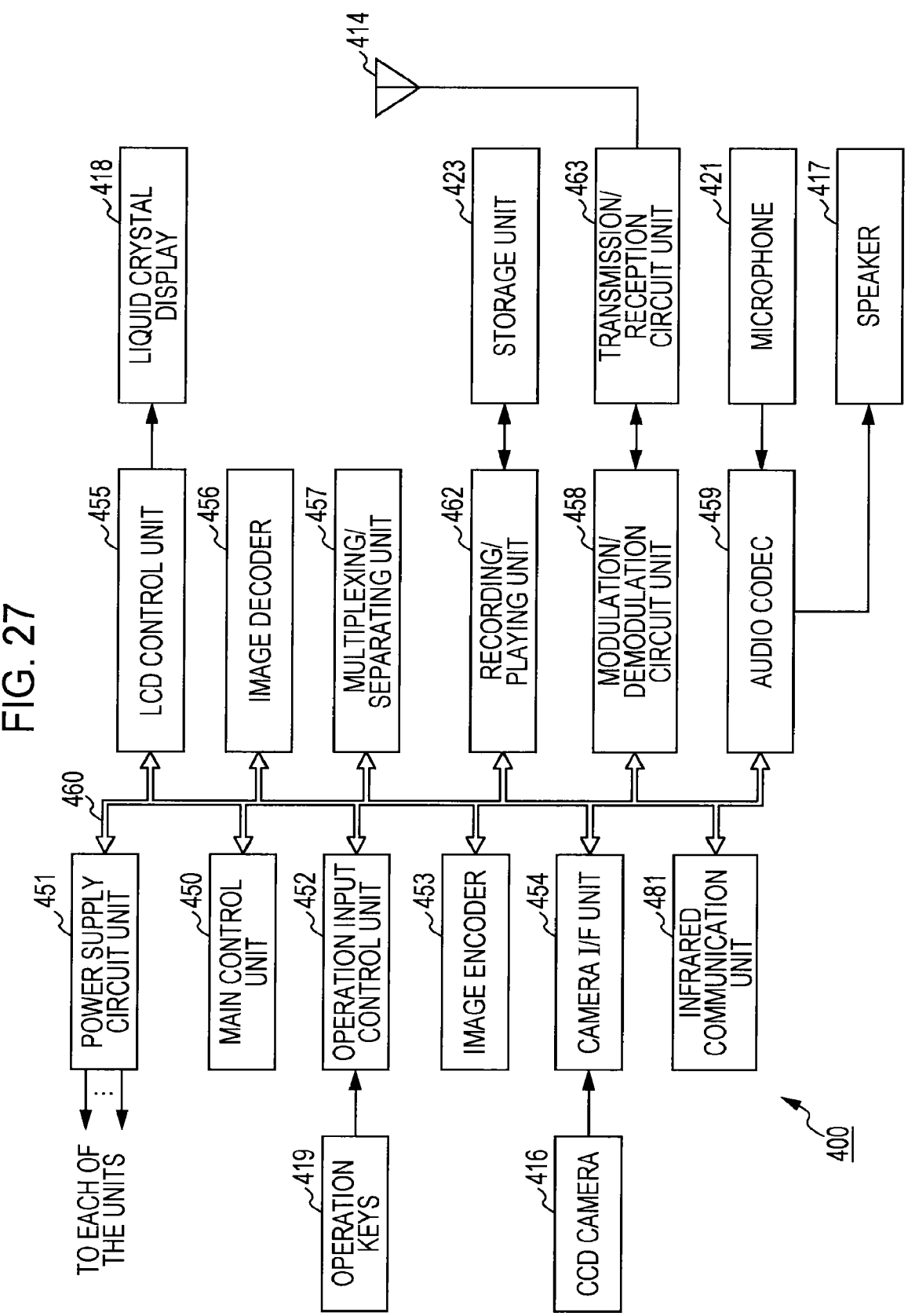
FIG. 27 is a block diagram illustrating a principal configuration example of a cellular telephone to which the present invention has been applied.

FIG. 27 is a block diagram illustrating a principal configuration example of a cellular telephone using the image encoding device and image decoding device to which the present invention has been applied.

A cellular telephone 400 shown in FIG. 27 includes a main control unit 450 configured so as to integrally control the units, a power supply circuit unit 451, an operation input control unit 452, an image encoder 453, a camera I/F unit 454, an LCD control unit 455, an image decoder 456, a multiplexing/separating unit 457, a recording/playing unit 462, a modulation/demodulation circuit unit 458, and an audio codec 459. These are mutually connected via a bus 460.

Also, the cellular telephone 400 includes operation keys 419, a CCD (Charge Coupled Devices) camera 416, a liquid crystal display 418, a storage unit 423, a transmission/reception circuit unit 463, an antenna 414, a microphone (MIC) 421, and a speaker 417.

Upon a call end and power key being turned on by the user's operation, the power supply circuit unit 451 activates the cellular telephone 400 in an operational state by supplying power to the units from a battery pack.

The cellular telephone 400 performs various operations, such as transmission/reception of an audio signal, transmission/reception of an e-mail and image data, image shooting, data recoding, and so forth, in various modes such as a voice call mode, a data communication mode, and so forth, based on the control of the main control unit 450 made up of a CPU, ROM, RAM, and so forth.

For example, in the voice call mode, the cellular telephone 400 converts the audio signal collected by the microphone (mike) 421 into digital audio data by the audio codec 459, subjects this to spectrum spread processing at the modulation/demodulation circuit unit 458, and subjects this to digital/analog conversion processing and frequency conversion processing at the transmission/reception circuit unit 463. The cellular telephone 400 transmits the signal for transmission obtained by the conversion processing thereof to an unshown base station via the antenna 414. The signal for transmission (audio signal) transmitted to the base station is supplied to the cellular telephone of the other party via the public telephone network.

Also, for example, in the voice call mode, the cellular telephone 400 amplifies the reception signal received at the antenna 414, at the transmission/reception circuit unit 463, further subjects to frequency conversion processing and analog/digital conversion processing, subjects to spectrum inverse spread processing at the modulation/demodulation circuit unit 458, and converts into an analog audio signal by the audio codec 459. The cellular telephone 400 outputs the converted and obtained analog audio signal thereof from the speaker 417.

Further, for example, in the event of transmitting an e-mail in the data communication mode, the cellular telephone 400 accepts the text data of the e-mail input by the operation of the operation keys 419 at the operation input control unit 452. The cellular telephone 400 processes the text data thereof at the main control unit 450, and displays on the liquid crystal display 418 via the LCD control unit 455 as an image.

Also, the cellular telephone 400 generates e-mail data at the main control unit 450 based on the text data accepted by the operation input control unit 452, the user's instructions, and so forth. The cellular telephone 400 subjects the e-mail data thereof to spectrum spread processing at the modulation/demodulation circuit unit 458, and subjects to digital/analog conversion processing and frequency conversion processing at the transmission/reception circuit unit 463. The cellular telephone 400 transmits the signal for transmission obtained by the conversion processing thereof to an unshown base station via the antenna 414. The signal for transmission (e-mail) transmitted to the base station is supplied to a predetermined destination via the network, mail server, and so forth.

Also, for example, in the event of receiving an e-mail in the data communication mode, the cellular telephone 400 receives the signal transmitted from the base station via the antenna 414 with the transmission/reception circuit unit 463, amplifies, and further subjects to frequency conversion processing and analog/digital conversion processing. The cellular telephone 400 subjects the reception signal thereof to spectrum inverse spread processing at the modulation/demodulation circuit unit 458 to restore the original e-mail data. The cellular telephone 400 displays the restored e-mail data on the liquid crystal display 418 via the LCD control unit 455.

Note that the cellular telephone 400 may record (store) the received e-mail data in the storage unit 423 via the recording/playing unit 462.

This storage unit 423 is an optional rewritable recording medium. The storage unit 423 may be semiconductor memory such as RAM, built-in flash memory, or the like, may be a hard disk, or may be a removable medium such as a magnetic disk, a magneto-optical disk, an optical disc, USB memory, a memory card, or the like. It goes without saying that the storage unit 423 may be other than these.

Further, for example, in the event of transmitting image data in the data communication mode, the cellular telephone 400 generates image data by imaging at the CCD camera 416. The CCD camera 416 includes a CCD serving as an optical device such as a lens, diaphragm, and so forth, and serving as a photoelectric conversion device, which images a subject, converts the intensity of received light into an electrical signal, and generates the image data of an image of the subject. The CCD camera 416 performs compression encoding of the image data at the image encoder 453 via the camera I/F unit 454, and converts into encoded image data.

The cellular telephone 400 employs the above-mentioned image encoding device 101 as the image encoder 453 for performing such processing. Accordingly, in the same way as with the image encoding device 101, the image encoder 453 can improve the image quality of decoded images, and further improve the image quality of an image to be referenced from now on with motion compensation. As a result thereof, encoding efficiency is improved.

Note that, at this time simultaneously, the cellular telephone 400 converts the audio collected at the microphone (mike) 421, while shooting with the CCD camera 416, from analog to digital at the audio codec 459, and further encodes this.

The cellular telephone 400 multiplexes the encoded image data supplied from the image encoder 453, and the digital audio data supplied from the audio codec 459 at the multiplexing/separating unit 457 using a predetermined method. The cellular telephone 400 subjects the multiplexed data obtained as a result thereof to spectrum spread processing at the modulation/demodulation circuit unit 458, and subjects to digital/analog conversion processing and frequency conversion processing at the transmission/reception circuit unit 463. The cellular telephone 400 transmits the signal for transmission obtained by the conversion processing thereof to an unshown base station via the antenna 414. The signal for transmission (image data) transmitted to the base station is supplied to the other party via the network or the like.

Note that in the event that image data is not transmitted, the cellular telephone 400 may also display the image data generated at the CCD camera 416 on the liquid crystal display 418 via the LCD control unit 455 instead of the image encoder 453.

Also, for example, in the event of receiving the data of a moving image file linked to a simple website or the like in the data communication mode, the cellular telephone 400 receives the signal transmitted from the base station at the transmission/reception circuit unit 463 via the antenna 414, amplifies, and further subjects to frequency conversion processing and analog/digital conversion processing. The cellular telephone 400 subjects the received signal to spectrum inverse spread processing at the modulation/demodulation circuit unit 458 to restore the original multiplexed data. The cellular telephone 400 separates the multiplexed data thereof at the multiplexing/separating unit 457 into encoded image data and audio data.

The cellular telephone 400 decodes the encoded image data at the image decoder 456, thereby generating playing moving image data, and displays this on the liquid crystal display 418 via the LCD control unit 455. Thus, moving image data included in a moving image file linked to a simple website is displayed on the liquid crystal display 418, for example.

The cellular telephone 400 employs the above-mentioned image decoding device 201 as the image decoder 456 for performing such processing. Accordingly, in the same way as with the image decoding device 201, the image decoder 456 can improve the image quality of decoded images, and further improve the image quality of an image to be referenced from now on with motion compensation. As a result thereof, encoding efficiency is improved.

At this time, simultaneously, the cellular telephone 400 converts the digital audio data into an analog audio signal at the audio codec 459, and outputs this from the speaker 417. Thus, audio data included in a moving image file linked to a simple website is played, for example.

Note that, in the same way as with the case of e-mail, the cellular telephone 400 may record (store) the received data linked to a simple website or the like in the storage unit 423 via the recording/playing unit 462.

Also, the cellular telephone 400 analyzes the imaged two-dimensional code obtained by the CCD camera 416 at the main control unit 450, whereby information recorded in the two-dimensional code can be obtained.

Further, the cellular telephone 400 can communicate with an external device at the infrared communication unit 481 using infrared rays.

The cellular telephone 400 employs the image encoding device 101 as the image encoder 453, whereby encoding efficiency can be improved. As a result, the cellular telephone 400 can provide encoded data (image data) with good encoding efficiency to another device.

Also, the cellular telephone 400 employs the image decoding device 201 as the image decoder 456, whereby encoding efficiency can be improved. As a result thereof, the cellular telephone 400 can obtain and display higher definition decoded images from a moving image file linked to at a simple website or the like, for example.

Note that description has been made so far wherein the cellular telephone 400 employs the CCD camera 416, but the cellular telephone 400 may employ an image sensor (CMOS image sensor) using CMOS (Complementary Metal Oxide Semiconductor) instead of this CCD camera 416. In this case as well, the cellular telephone 400 can image a subject and generate the image data of an image of the subject in the same way as with the case of employing the CCD camera 416.

Also, description has been made so far regarding the cellular telephone 400, but the image encoding device 101 and the image decoding device 201 may be applied to any kind of device in the same way as with the case of the cellular telephone 400 as long as it is a device having the same imaging function and communication function as those of the cellular telephone 400, for example, such as a PDA (Personal Digital Assistants), smart phone, UMPC (Ultra Mobile Personal Computer), net book, notebook-sized personal computer, or the like.

[Configuration Example of Hard Disk Recorder]

Figure 28:
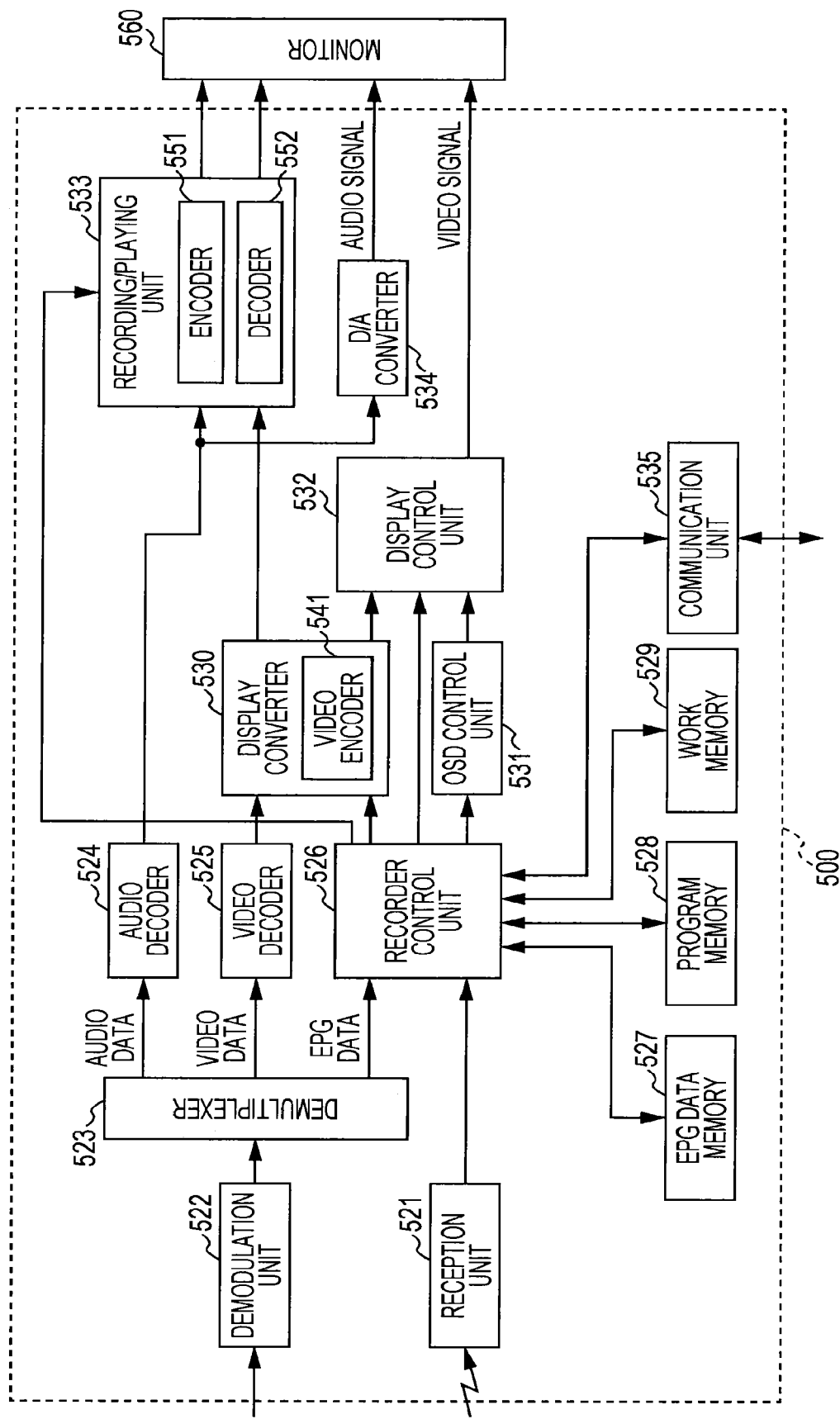
FIG. 28 is a block diagram illustrating a principal configuration example of a hard disk recorder to which the present invention has been applied.

FIG. 28 is a block diagram illustrating a principal configuration example of a hard disk recorder which employs the image encoding device and image decoding device to which the present invention has been applied.

A hard disk recorder (HDD recorder) 500 shown in FIG. 28 is a device which stores, in a built-in hard disk, audio data and video data of a broadcast program included in broadcast wave signals (television signals) received by a tuner and transmitted from a satellite or a terrestrial antenna or the like, and provides the stored data to the user at timing according to the user's instructions.

The hard disk recorder 500 can extract audio data and video data from broadcast wave signals, decode these as appropriate, and store in the built-in hard disk, for example. Also, the hard disk recorder 500 can also obtain audio data and video data from another device via the network, decode these as appropriate, and store in the built-in hard disk, for example.

Further, the hard disk recorder 500 can decode audio data and video data recorded in the built-in hard disk, supply this to a monitor 560, display an image thereof on the screen of the monitor 560, and output audio thereof from the speaker of the monitor 560, for example.

The hard disk recorder 500 can decode audio data and video data extracted from broadcast signals obtained via a tuner, or audio data and video data obtained from another device via a network, supply this to the monitor 560, display an image thereof on the screen of the monitor 560, and output audio thereof from the speaker of the monitor 560, for example.

Of course, operations other than these may be performed. As shown in FIG. 28, the hard disk recorder 500 includes a reception unit 521, a demodulation unit 522, a demultiplexer 523, an audio decoder 524, a video decoder 525, and a recorder control unit 526. The hard disk recorder 500 further includes EPG data memory 527, program memory 528, work memory 529, a display converter 530, an OSD (On Screen Display) control unit 531, a display control unit 532, a recording/playing unit 533, a D/A converter 534, and a communication unit 535.

Also, the display converter 530 includes a video encoder 541. The recording/playing unit 533 includes an encoder 551 and a decoder 552.

The reception unit 521 receives the infrared signal from the remote controller (not shown), converts into an electrical signal, and outputs to the recorder control unit 526. The recorder control unit 526 is configured of, for example, a microprocessor and so forth, and executes various types of processing in accordance with the program stored in the program memory 528. At this time, the recorder control unit 526 uses the work memory 529 according to need.

The communication unit 535, which is connected to the network, performs communication processing with another device via the network. For example, the communication unit 535 is controlled by the recorder control unit 526 to communicate with a tuner (not shown), and to principally output a channel selection control signal to the tuner.

The demodulation unit 522 demodulates the signal supplied from the tuner, and outputs to the demultiplexer 523. The demultiplexer 523 separates the data supplied from the demodulation unit 522 into audio data, video data, and EPG data, and outputs to the audio decoder 524, video decoder 525, and recorder control unit 526, respectively.

The audio decoder 524 decodes the input audio data, for example, with the MPEG format, and outputs to the recording/playing unit 533. The video decoder 525 decodes the input video data, for example, with the MPEG format, and outputs to the display converter 530. The recorder control unit 526 supplies the input EPG data to the EPG data memory 527 for storing.

The display converter 530 encodes the video data supplied from the video decoder 525 or recorder control unit 526 into, for example, the video data conforming to the NTSC (National Television Standards Committee) format using the video encoder 541, and outputs to the recording/playing unit 533. Also, the display converter 530 converts the size of the screen of the video data supplied from the video decoder 525 or recorder control unit 526 into the size corresponding to the size of the monitor 560, converts the video data of which the screen size has been converted into the video data conforming to the NTSC format using the video encoder 541, converts into an analog signal, and outputs to the display control unit 532.

The display control unit 532 superimposes, under the control of the recorder control unit 526, the OSD signal output from the OSD (On Screen Display) control unit 531 on the video signal input from the display converter 530, and outputs to the display of the monitor 560 for displaying.

Also, the audio data output from the audio decoder 524 has been converted into an analog signal using the D/A converter 534, and supplied to the monitor 560. The monitor 560 outputs this audio signal from the built-in speaker.

The recording/playing unit 533 includes a hard disk as a recording medium in which video data, audio data, and so forth are recorded.

The recording/playing unit 533 encodes the audio data supplied from the audio decoder 524 with the MPEG format by the encoder 551. Also, the recording/playing unit 533 encodes the video data supplied from the video encoder 541 of the display converter 530 with the MPEG format by the encoder 551. The recording/playing unit 533 synthesizes the encoded data of the audio data thereof, and the encoded data of the video data thereof using the multiplexer. The recording/playing unit 533 amplifies the synthesized data thereof by channel coding, and writes the data thereof in the hard disk via a recording head.

The recording/playing unit 533 plays the data recorded in the hard disk via a playing head, amplifies, and separates into audio data and video data using the demultiplexer. The recording/playing unit 533 decodes the audio data and video data by the decoder 552 using the MPEG format. The recording/playing unit 533 converts the decoded audio data from digital to analog, and outputs to the speaker of the monitor 560. Also, the recording/playing unit 533 converts the decoded video data from digital to analog, and outputs to the display of the monitor 560.

The recorder control unit 526 reads out the latest EPG data from the EPG data memory 527 based on the user's instructions indicated by the infrared signal from the remote controller which is received via the reception unit 521, and supplies to the OSD control unit 531. The OSD control unit 531 generates image data corresponding to the input EPG data, and outputs to the display control unit 532. The display control unit 532 outputs the video data input from the OSD control unit 531 to the display of the monitor 560 for displaying. Thus, EPG (Electronic Program Guide) is displayed on the display of the monitor 560.

Also, the hard disk recorder 500 can obtain various types of data such as video data, audio data, EPG data, and so forth supplied from another device via the network such as the Internet or the like.

The communication unit 535 is controlled by the recorder control unit 526 to obtain encoded data such as video data, audio data, EPG data, and so forth transmitted from another device via the network, and to supply this to the recorder control unit 526. The recorder control unit 526 supplies the encoded data of the obtained video data and audio data to the recording/playing unit 533, and stores in the hard disk, for example. At this time, the recorder control unit 526 and recording/playing unit 533 may perform processing such as re-encoding or the like according to need.

Also, the recorder control unit 526 decodes the encoded data of the obtained video data and audio data, and supplies the obtained video data to the display converter 530. The display converter 530 processes, in the same way as the video data supplied from the video decoder 525, the video data supplied from the recorder control unit 526, supplies to the monitor 560 via the display control unit 532 for displaying an image thereof.

Alternatively, an arrangement may be made wherein in accordance with this image display, the recorder control unit 526 supplies the decoded audio data to the monitor 560 via the D/A converter 534, and outputs audio thereof from the speaker.

Further, the recorder control unit 526 decodes the encoded data of the obtained EPG data, and supplies the decoded EPG data to the EPG data memory 527.

The hard disk recorder 500 thus configured employs the image decoding device 201 as the video decoder 525, decoder 552, and decoder housed in the recorder control unit 526. Accordingly, in the same way as with the image decoding device 201, the video decoder 525, decoder 552, and decoder housed in the recorder control unit 526 can improve the image quality of decoded images, and further improve the image quality of an image to be referenced from now on with motion compensation. As a result thereof, encoding efficiency is improved.

Accordingly, the hard disk recorder 500 can realize increase in processing speed, and also generate higher definition prediction images. As a result thereof, the hard disk recorder 500 can obtain higher definition decoded images from encoded data of video data received via the tuner, from encoded data of video data read out from the hard disk of the recording/playing unit 533, and encoded data of video data obtained via the network, and display on the monitor 560, for example.

Also, the hard disk recorder 500 employs the image encoding device 101 as the encoder 551. Accordingly, in the same way as with the case of the image encoding device 101, the encoder 551 can improve the image quality of decoded images, and further improve the image quality of an image to be referenced from now on with motion compensation. As a result thereof, encoding efficiency is improved.

Accordingly, the hard disk recorder 500 can realize increase in processing speed, and also improve encoding efficiency of encoded data to be recorded in the hard disk, for example. As a result thereof, the hard disk recorder 500 can more effectively use the storage region of the hard disk.

Note that description has been made so far regarding the hard disk recorder 500 for recording video data and audio data in the hard disk, but it goes without saying that any kind of recording medium may be employed. For example, even with a recorder to which a recording medium other than a hard disk, such as flash memory, optical disc, video tape, or the like, is applied, the image encoding device 101 and image decoding device 201 can be applied thereto in the same way as with the case of the above hard disk recorder 500. [Configuration Example of Camera]

FIG. 29 is a block diagram illustrating a principal configuration example of a camera employing the image encoding device and image decoding device to which the present invention has been applied.

A camera 600 shown in FIG. 29 images a subject, displays an image of the subject on an LCD 616, and records this in a recording medium 633 as image data.

A lens block 611 inputs light (i.e., picture of a subject) to a CCD/CMOS 612. The CCD/CMOS 612 is an image sensor employing a CCD or CMOS, which converts the intensity of received light into an electrical signal, and supplies to a camera signal processing unit 613.

The camera signal processing unit 613 converts the electrical signal supplied from the CCD/CMOS 612 into color difference signals of Y, Cr, and Cb, and supplies to an image signal processing unit 614. The image signal processing unit 614 subjects, under the control of a controller 621, the image signal supplied from the camera signal processing unit 613 to predetermined image processing, or encodes the image signal thereof by an encoder 641 using the MPEG format for example. The image signal processing unit 614 supplies encoded data generated by encoding an image signal, to a decoder 615. Further, the image signal processing unit 614 obtains data for display generated at an on-screen display (OSD) 620, and supplies this to the decoder 615.

With the above-mentioned processing, the camera signal processing unit 613 appropriately takes advantage of DRAM (Dynamic Random Access Memory) 618 connected via a bus 617 to hold image data, encoded data encoded from the image data thereof, and so forth in the DRAM 618 thereof according to need.

The decoder 615 decodes the encoded data supplied from the image signal processing unit 614, and supplies obtained image data (decoded image data) to the LCD 616. Also, the decoder 615 supplies the data for display supplied from the image signal processing unit 614 to the LCD 616. The LCD 616 synthesizes the image of the decoded image data, and the image of the data for display, supplied from the decoder 615 as appropriate, and displays a synthesizing image thereof.

The on-screen display 620 outputs, under the control of the controller 621, data for display such as a menu screen or icon or the like made up of a symbol, characters, or a figure to the image signal processing unit 614 via the bus 617.

Based on a signal indicating the content commanded by the user using an operating unit 622, the controller 621 executes various types of processing, and also controls the image signal processing unit 614, DRAM 618, external interface 619, on-screen display 620, media drive 623, and so forth via the bus 617. Programs, data, and so forth necessary for the controller 621 executing various types of processing are stored in FLASH ROM 624.

For example, the controller 621 can encode image data stored in the DRAM 618, or decode encoded data stored in the DRAM 618 instead of the image signal processing unit 614 and decoder 615. At this time, the controller 621 may perform encoding/decoding processing using the same format as the encoding/decoding format of the image signal processing unit 614 and decoder 615, or may perform encoding/decoding processing using a format that neither the image signal processing unit 614 nor the decoder 615 can handle.

Also, for example, in the event that start of image printing has been instructed from the operating unit 622, the controller 621 reads out image data from the DRAM 618, and supplies this to a printer 634 connected to the external interface 619 via the bus 617 for printing.

Further, for example, in the event that image recording has been instructed from the operating unit 622, the controller 621 reads out encoded data from the DRAM 618, and supplies this to a recording medium 633 mounted on the media drive 623 via the bus 617 for storing.

The recording medium 633 is an optional readable/writable removable medium, for example, such as a magnetic disk, a magneto-optical disk, an optical disc, semiconductor memory, or the like. It goes without saying that the recording medium 633 is also optional regarding the type of a removable medium, and accordingly may be a tape device, or may be a disc, or may be a memory card. It goes without saying that the recoding medium 633 may be a non-contact IC card or the like.

Alternatively, the media drive 623 and the recording medium 633 may be configured so as to be integrated into a non-transportable recording medium, for example, such as a built-in hard disk drive, SSD (Solid State Drive), or the like.

The external interface 619 is configured of, for example, a USB input/output terminal and so forth, and is connected to the printer 634 in the event of performing printing of an image. Also, a drive 631 is connected to the external interface 619 according to need, on which the removable medium 632 such as a magnetic disk, optical disc, or magneto-optical disk is mounted as appropriate, and a computer program read out therefrom is installed in the FLASH ROM 624 according to need.

Further, the external interface 619 includes a network interface to be connected to a predetermined network such as a LAN, the Internet, or the like. For example, in accordance with the instructions from the operating unit 622, the controller 621 can read out encoded data from the DRAM 618, and supply this from the external interface 619 to another device connected via the network. Also, the controller 621 can obtain, via the external interface 619, encoded data or image data supplied from another device via the network, and hold this in the DRAM 618, or supply this to the image signal processing unit 614.

The camera 600 thus configured employs the image decoding device 201 as the decoder 615. Accordingly, in the same way as with the image decoding device 201, the decoder 615 can improve the image quality of decoded images, and further improve the image quality of an image to be referenced from now on with motion compensation. As a result thereof, encoding efficiency is improved.

Accordingly, the camera 600 can generate a prediction image with high precision. As a result thereof, the camera 600 can obtain higher definition decoded images at higher speed from, for example, image data generated at the CCD/CMOS 612, encoded data of video data read out from the DRAM 618 or recording medium 633, and encoded data of video data obtained via a network, and display on the LCD 616.

Also, the camera 600 employs the image encoding device 101 as the encoder 641. Accordingly, in the same way as with the case of the image encoding device 101, the encoder 641 can improve the image quality of decoded images, and further improve the image quality of an image to be referenced from now on with motion compensation. As a result thereof, encoding efficiency is improved.

Accordingly, the camera 600 can improve encoding efficiency of encoded data to be recorded in the hard disk, for example. As a result thereof, the camera 600 can more effectively use the storage region of the DRAM 618 or recording medium 633 at higher speed.

Note that the decoding method of the image decoding device 201 may be applied to the decoding processing which the controller 621 performs. In the same way, the encoding method of the image encoding device 101 may be applied to the encoding processing which the controller 621 performs.

Also, the image data which the camera 600 takes may be moving images or may be still images.

As a matter of course, the image encoding device 101 and image decoding device 201 may be applied to devices or systems other than the above-described devices.

REFERENCE SIGNS LIST

101 image encoding device, 111 orthogonal transform unit, 112 quantization unit, 113 lossless encoding unit, 114 mosquito noise filter, 151 threshold determining unit, 152 Complexity calculating unit, 153 filter control unit, 154 filter processing unit, 161 threshold determining unit, 162 non-zero coefficient number buffer, 163 filter control unit, 164 filter processing unit, 201 image decoding device, 211 lossless decoding unit, 212 inverse quantization unit, 213 inverse orthogonal transform unit, 214 mosquito noise filter

The invention claimed is:

1. An encoding device comprising:
   circuitry configured to
   perform filter processing to a block of image data with a filter strength set based on a threshold determined based on an orthogonal transform size of the block, wherein the threshold decreases as the orthogonal transform size increases; and
   encode the image data filtered by the filter processing.

2. The encoding device of claim 1, wherein
   the filter strength is set according to a parameter based on a quantization scale and a generated code amount in the block.

3. The encoding device of claim 2, wherein
   the filter strength is set based on the parameter and the threshold.

4. The encoding device of claim 3, wherein
   the threshold includes an offset value configured to be set by a user.

5. The encoding device of claim 2, wherein
   at least one generation bit provides information relating to the generated code amount.

6. The encoding device of claim 1, wherein
   the circuitry is configured to perform smoothing processing to a pixel value included in the block.

7. The encoding device of claim 1, wherein
   the filter processing is mosquito noise filter processing.

8. The encoding device of claim 1, wherein, for a same orthogonal transform size, the threshold decreases as a quantization parameter increases.

9. An encoding method comprising:

performing, by circuitry, filter processing to a block of image data with a filter strength set based on a threshold determined based on an orthogonal transform size of the block at a boundary of the block, wherein the threshold decreases as the orthogonal transform size increases; and encoding, by the circuitry, the image data filtered by the filter processing.

10. The encoding method of claim 9, wherein the filter strength is set according to a parameter based on a quantization scale and a generated code amount in the block.

11. The encoding method of claim 10, wherein the filter strength is set based on the parameter and the threshold.

12. The encoding method of claim 11, wherein the threshold includes an offset value configured to be set by a user.

13. The encoding method of claim 10, wherein at least one generation bit provides information relating to the generated code amount.

14. The encoding method of claim 9, further comprising:

performing smoothing processing to a pixel value included in the block.

15. The encoding method of claim 9, wherein the filter processing is mosquito noise filter processing.

16. The encoding method of claim 9, wherein for a same orthogonal transform size, the threshold decreases as a quantization parameter increases.

17. A non-transitory computer-readable medium including computer program instructions, which when executed by circuitry, cause the circuitry to:

perform filter processing to a block of image data with a filter strength set based on a threshold determined based on an orthogonal transform size of the block at a boundary of the block, wherein the threshold decreases as the orthogonal transform size increases; and encode the image data filtered by the filter processing.

18. The non-transitory computer-readable medium of claim 17, wherein the filter processing is mosquito noise filter processing.

19. The non-transitory computer-readable medium of claim 17, wherein, for a same orthogonal transform size, the threshold decreases as a quantization parameter increases.

* * * * *